(12) United States Patent
Miura

(10) Patent No.: US 8,624,799 B2
(45) Date of Patent: Jan. 7, 2014

(54) ILLUMINATION UNIT, PROJECTION DISPLAY UNIT, AND DIRECT VIEW DISPLAY UNIT

(75) Inventor: Koji Miura, Tokyo (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 13/410,402

(22) Filed: Mar. 2, 2012

(65) Prior Publication Data
US 2012/0249621 A1 Oct. 4, 2012

(30) Foreign Application Priority Data

Mar. 28, 2011 (JP) ................................. 2011-071152

(51) Int. Cl.
*G09G 3/00* (2006.01)
(52) U.S. Cl.
USPC ............................................. 345/32; 353/38
(58) Field of Classification Search
USPC ............ 345/204, 690, 32, 76, 82, 83; 353/38
See application file for complete search history.

(56) References Cited

U.S. PATENT DOCUMENTS

| 2012/0133900 A1* | 5/2012 | Miura | 353/31 |
| 2012/0133901 A1* | 5/2012 | Miura | 353/31 |
| 2012/0249973 A1* | 10/2012 | Miura | 353/38 |

FOREIGN PATENT DOCUMENTS

JP 2008-134324 6/2008

* cited by examiner

*Primary Examiner* — Ricardo L Osorio
(74) *Attorney, Agent, or Firm* — Dentons US LLP

(57) ABSTRACT

An illumination unit includes: one or more light sources, an optical member, and an optical device. The optical member includes an integrator having a first fly-eye lens on which light from a solid-state light-emitting device is incident and a second fly-eye lens on which the light from the first fly-eye lens is incident. The integrator uniformalizes an illuminance distribution of light in a predetermined illumination region illuminated by the light incident from the solid-state light-emitting device. The optical device is disposed on an optical path between the first fly-eye lens and one or more light sources including one or more chips configured by the laser diode, and allows a shape of a luminance distribution of incidence light on an incidence plane of the first fly-eye lens to be expanded along a minor axis direction of the shape of the luminance distribution.

16 Claims, 35 Drawing Sheets

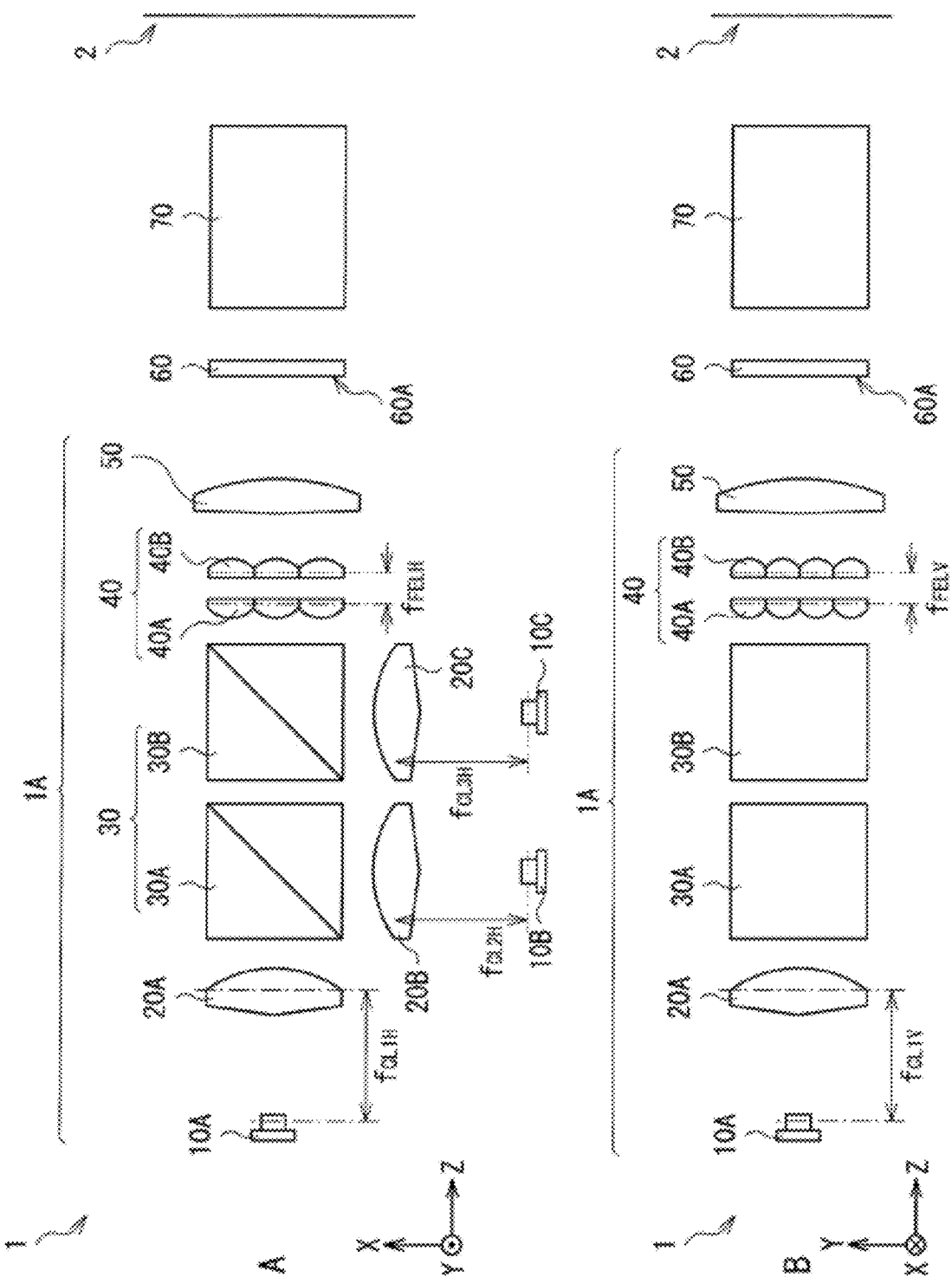

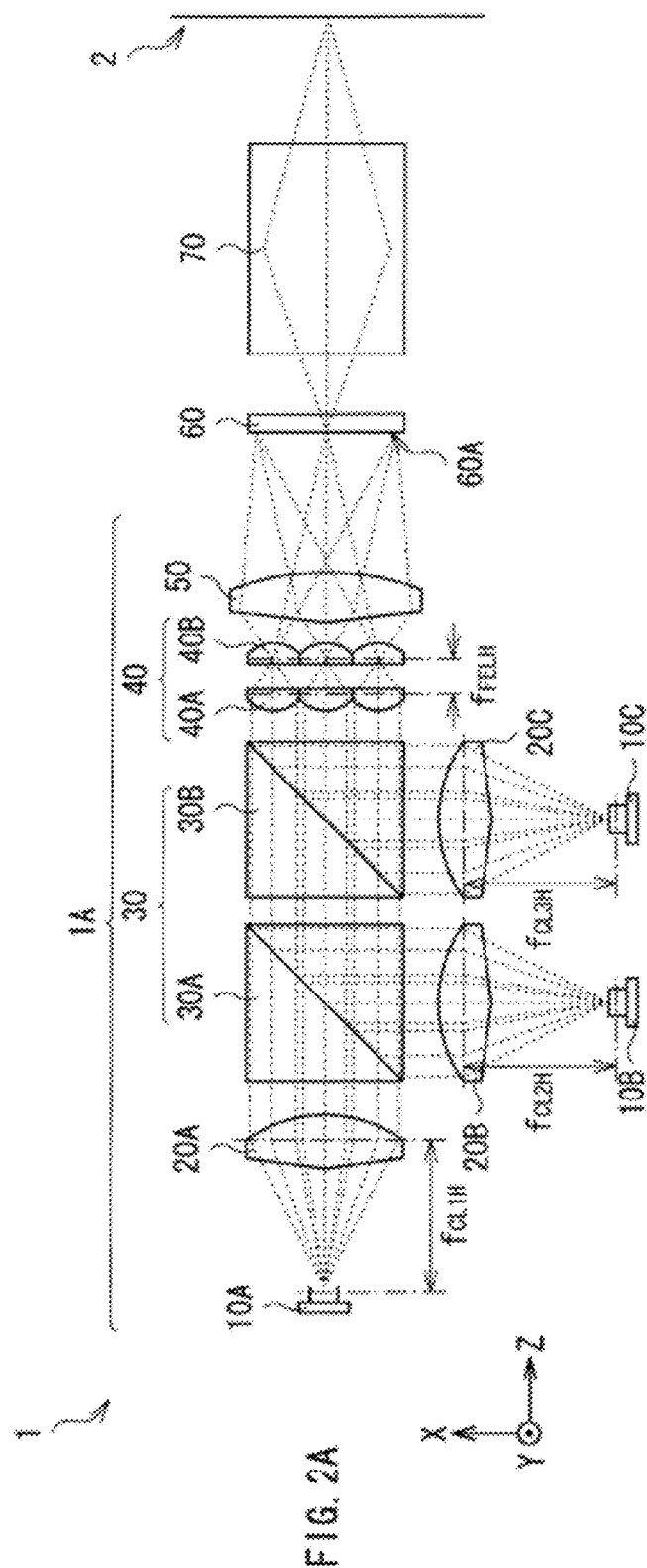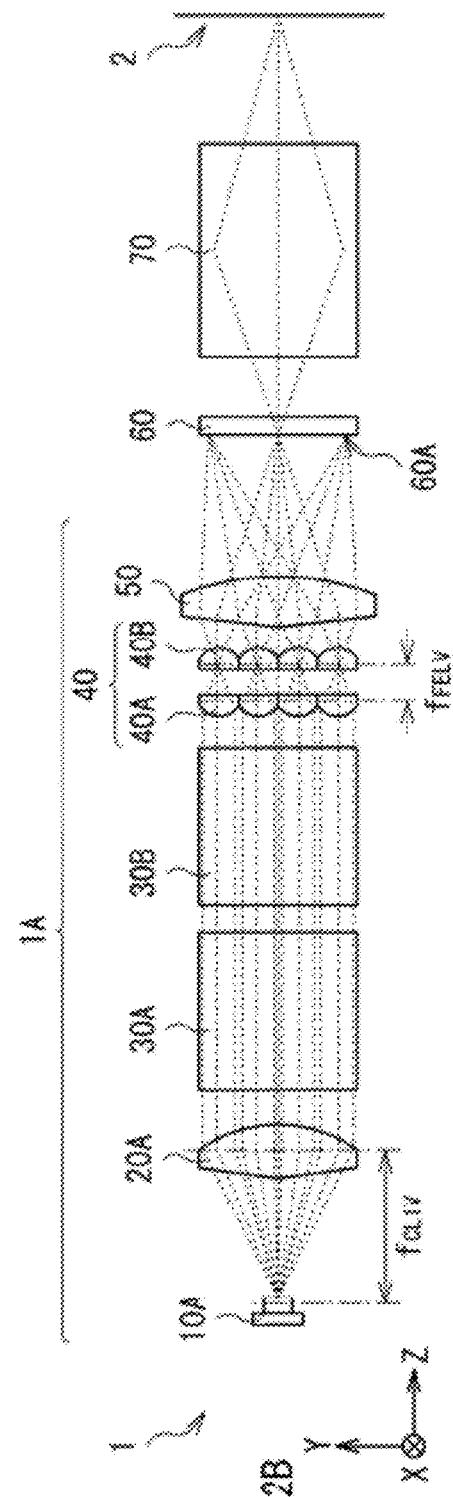

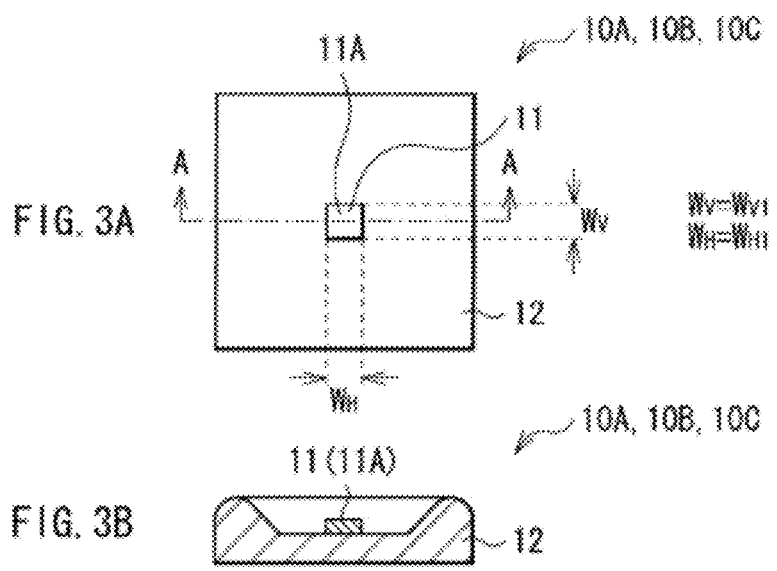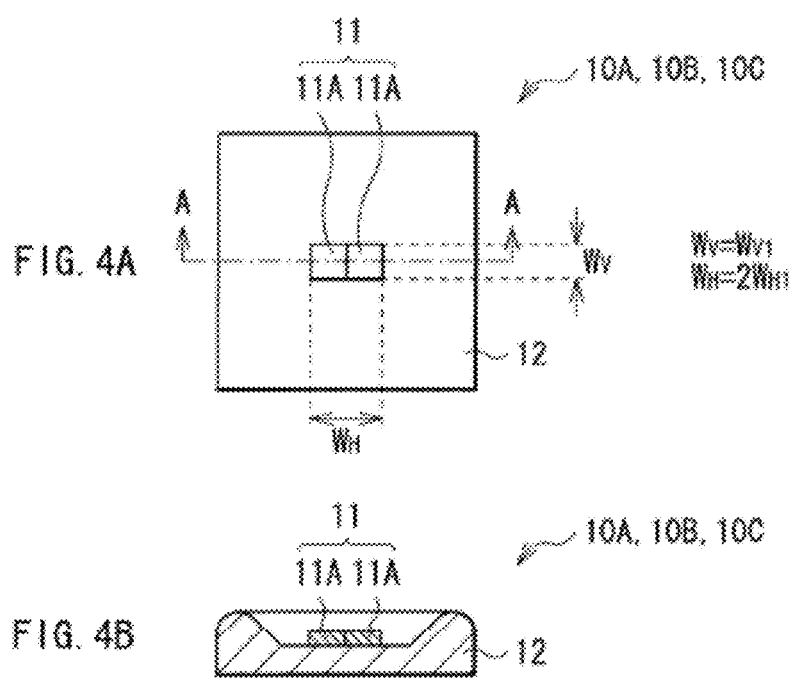

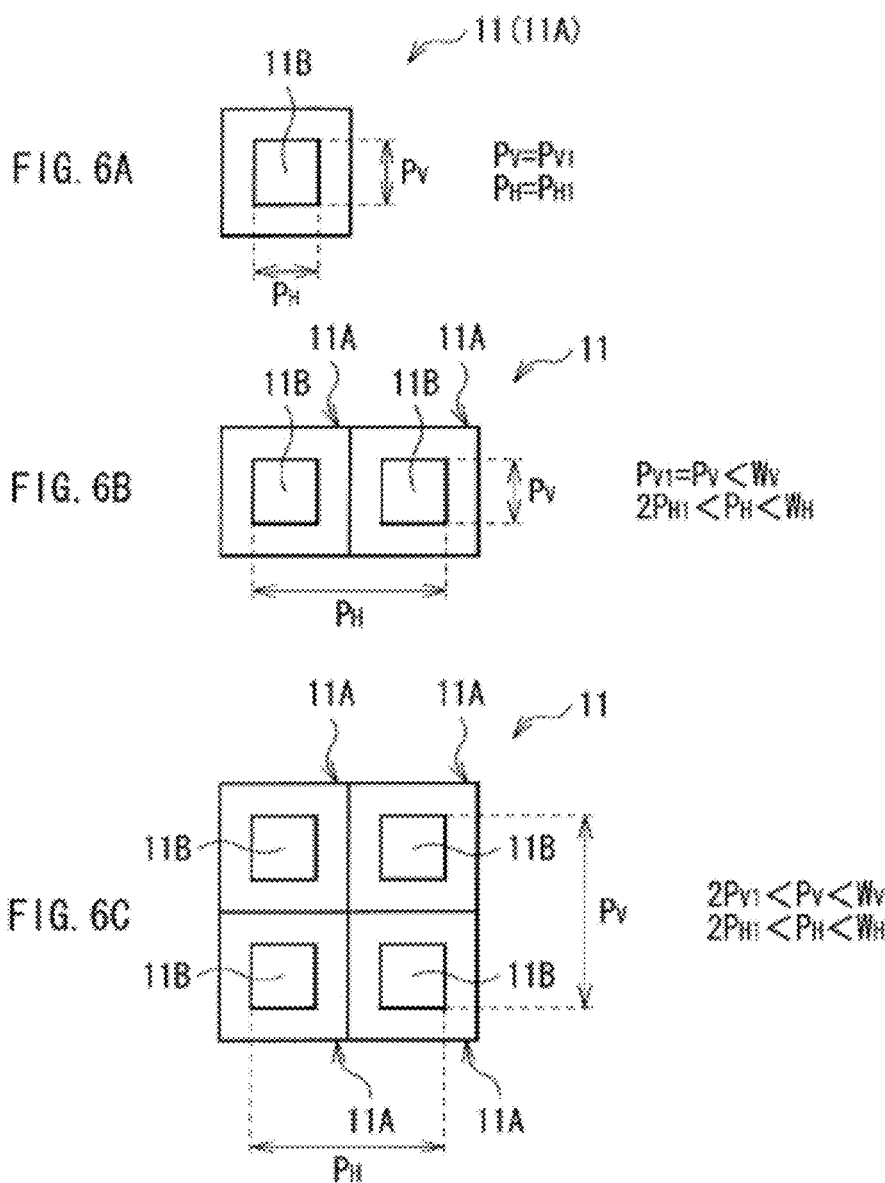

$W_V \geq 3W_H$
$W_H = W_H$

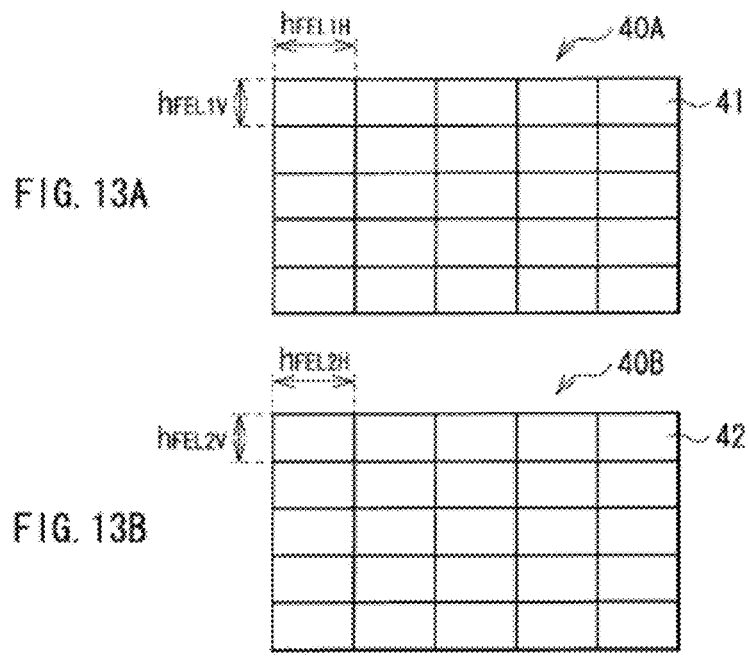
FIG. 13A
FIG. 13B
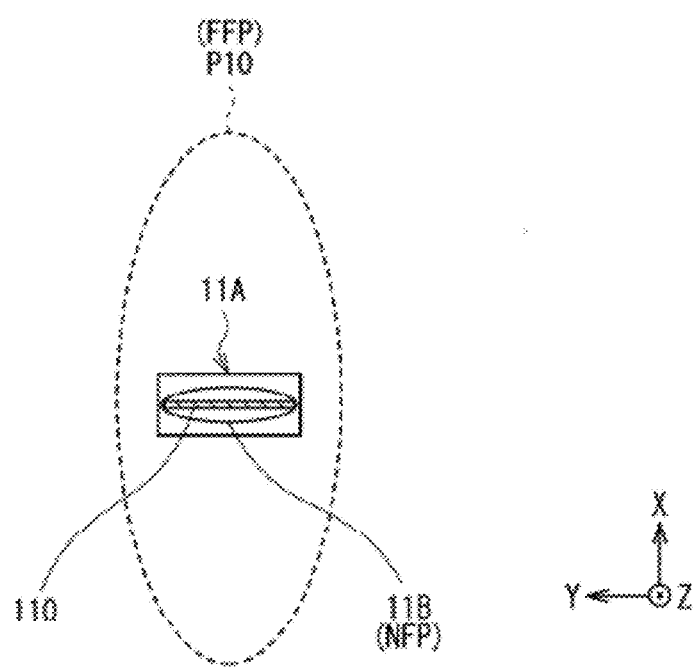
FIG. 14

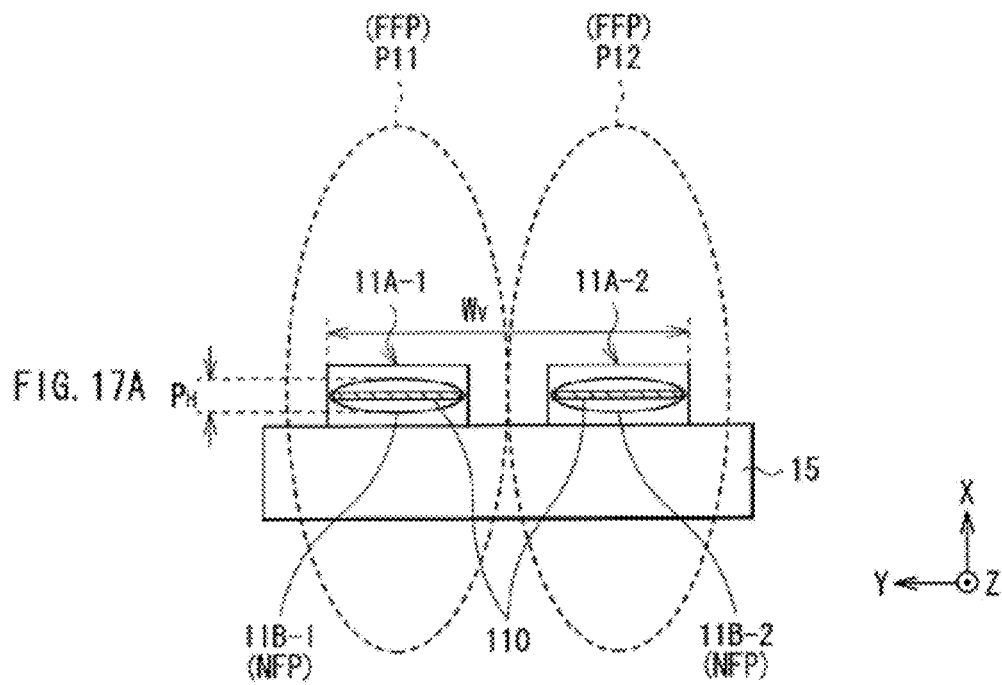
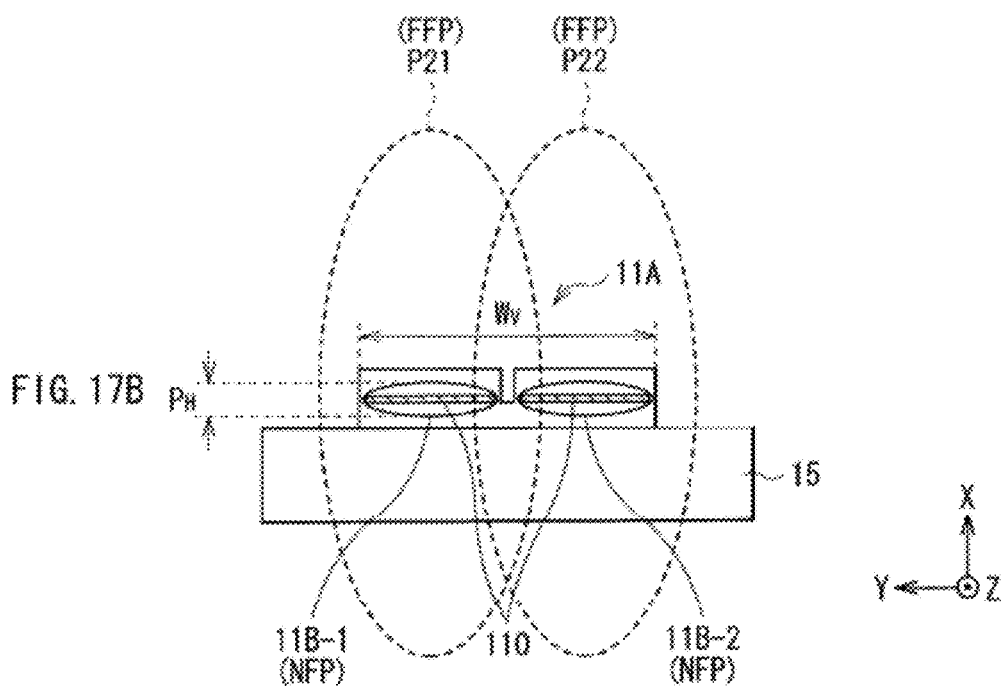

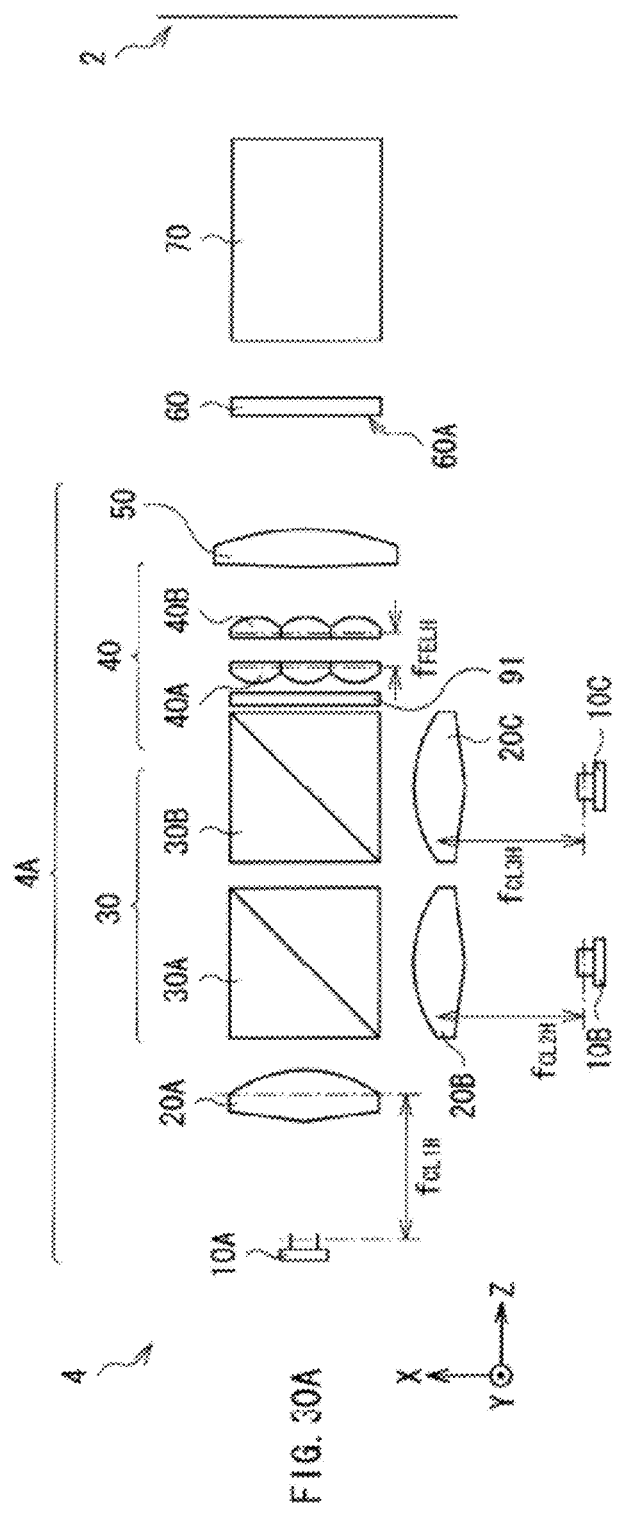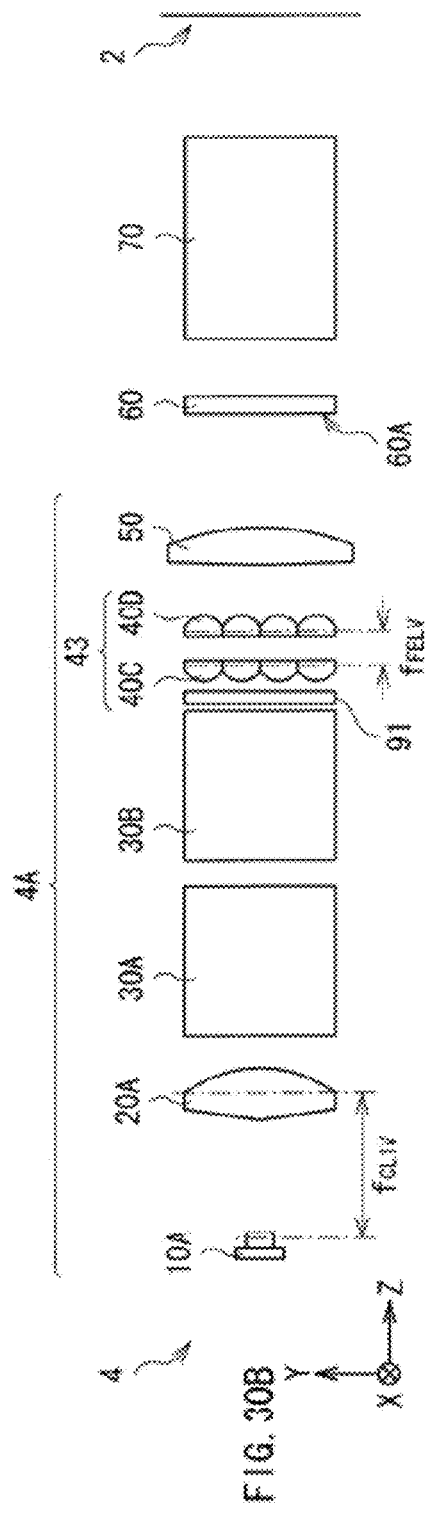

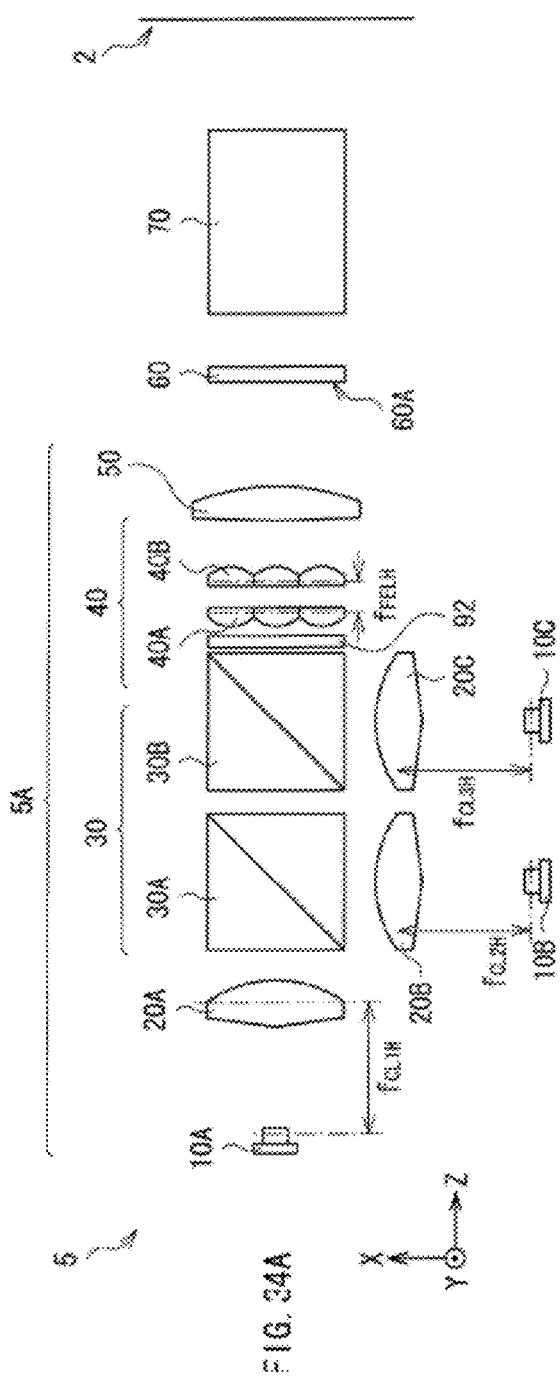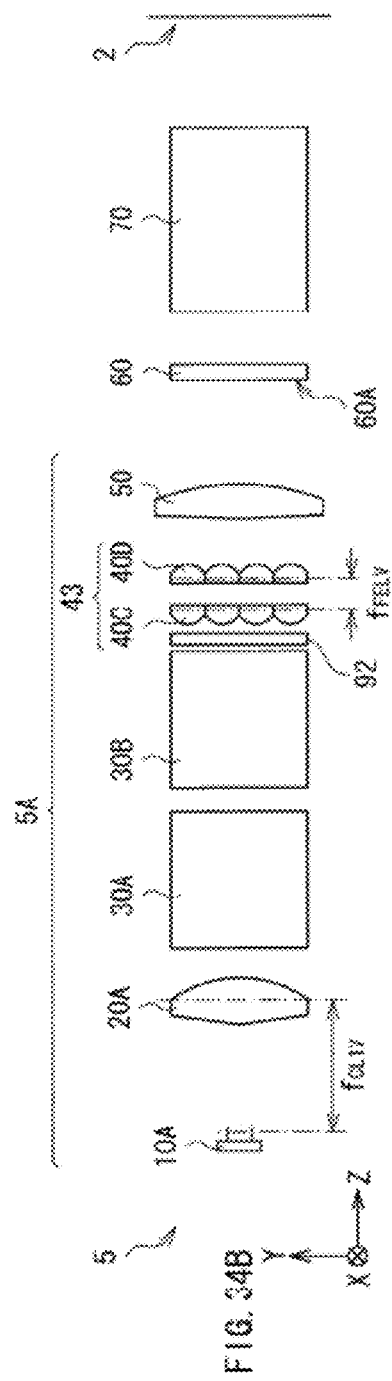

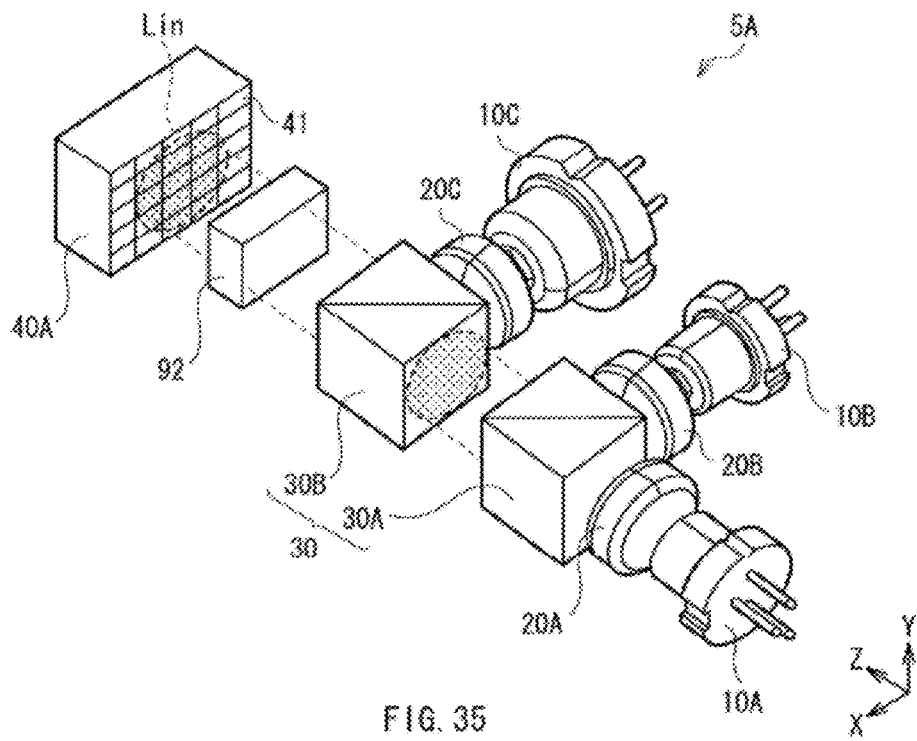
FIG. 35
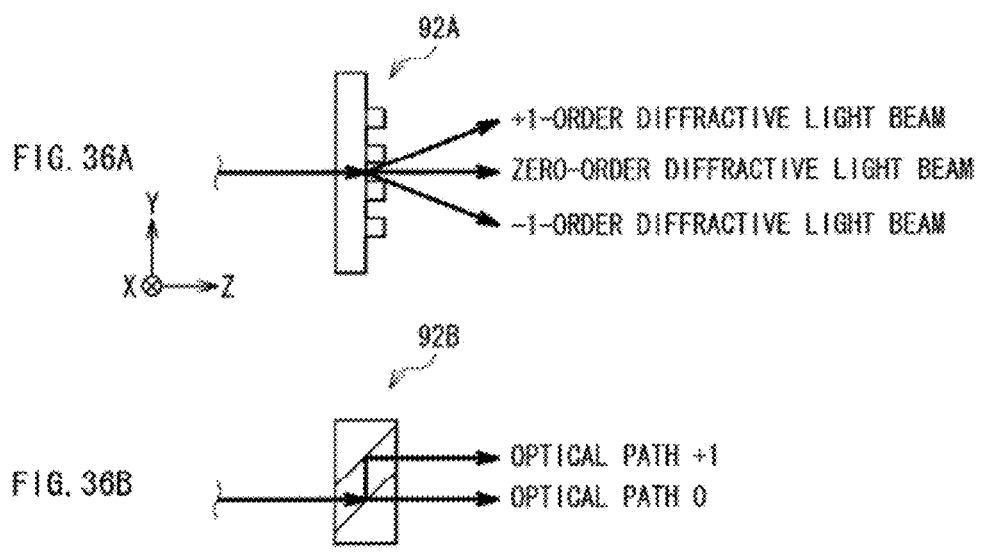
FIG. 36A
FIG. 36B

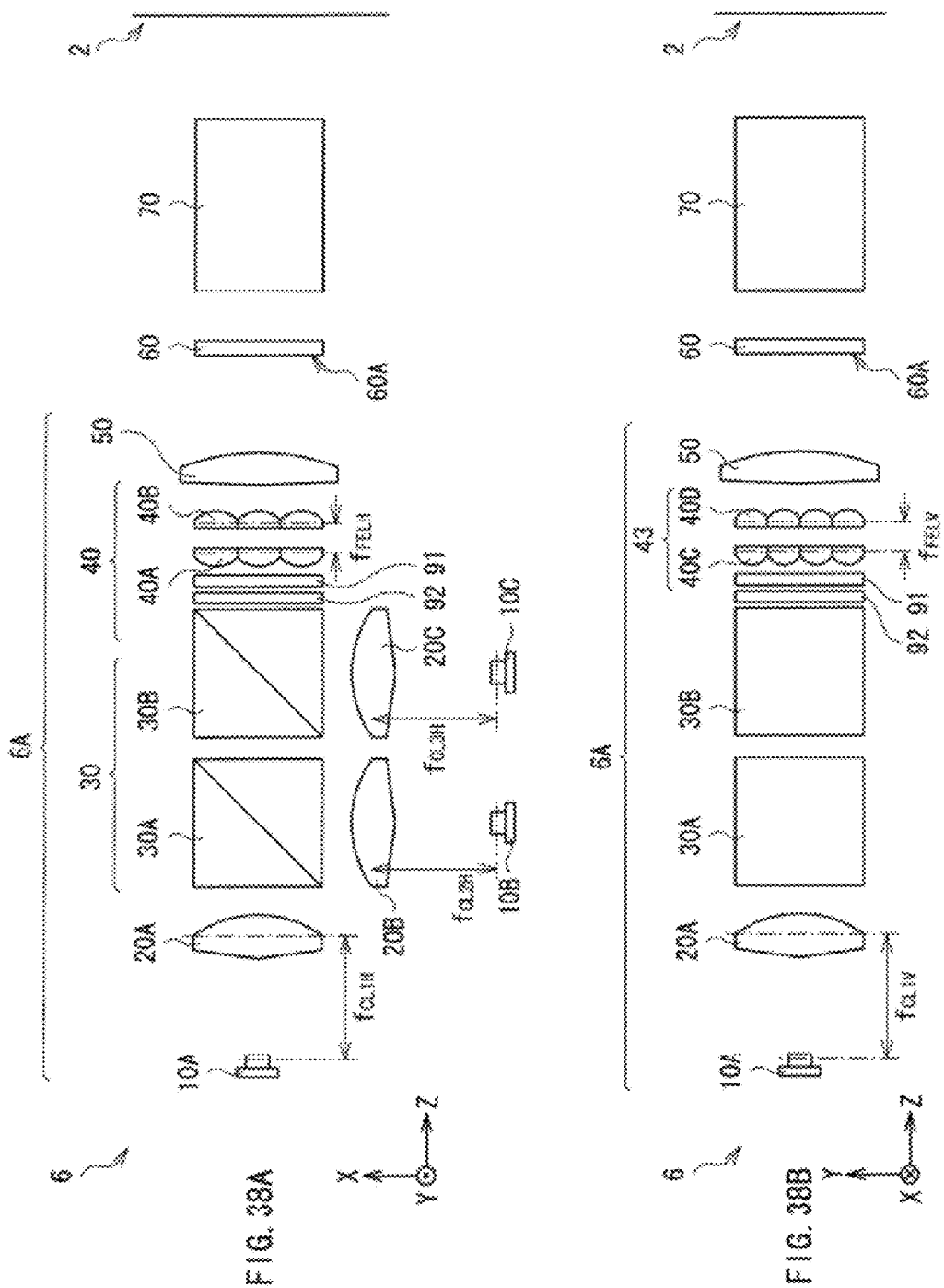

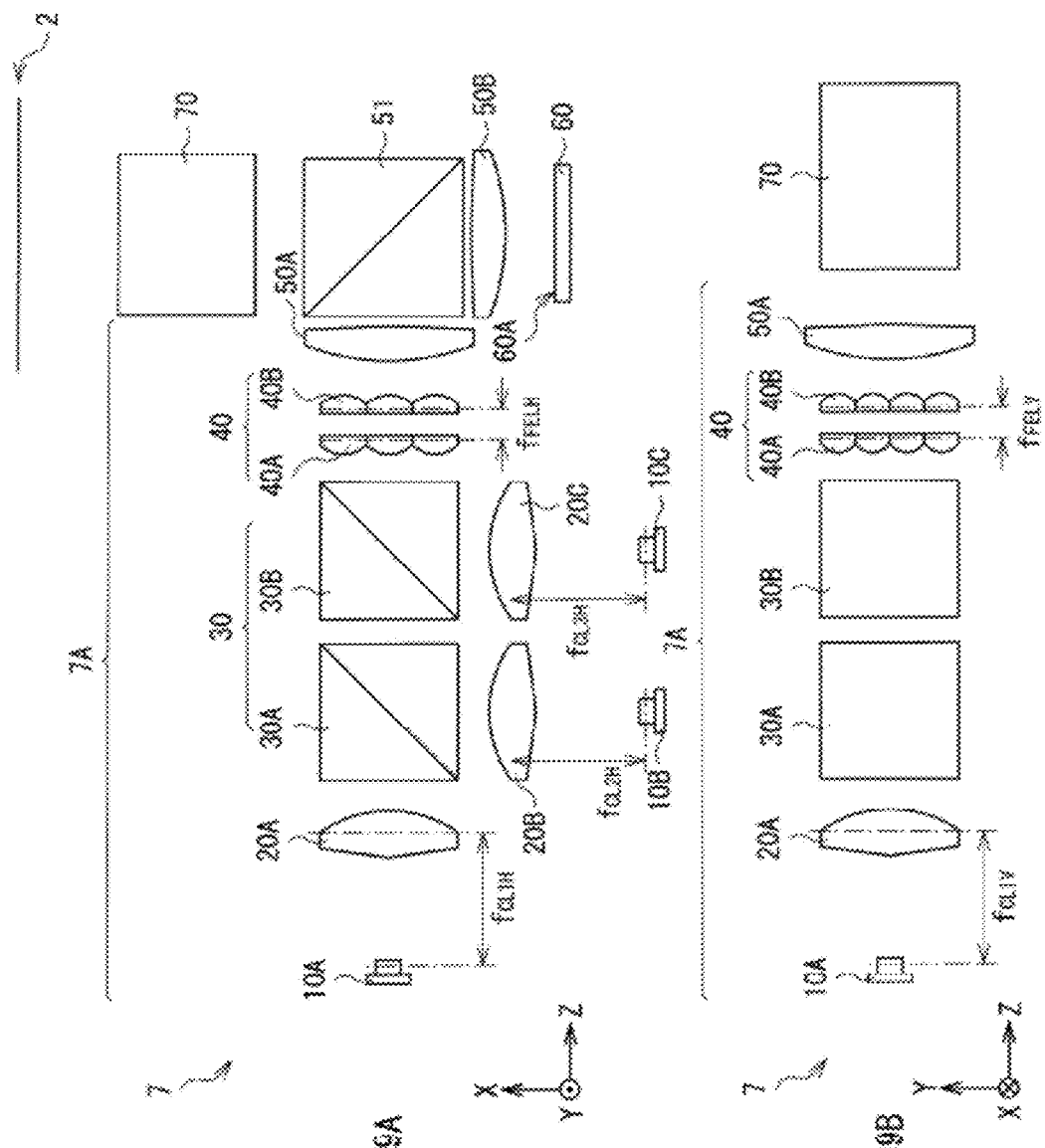

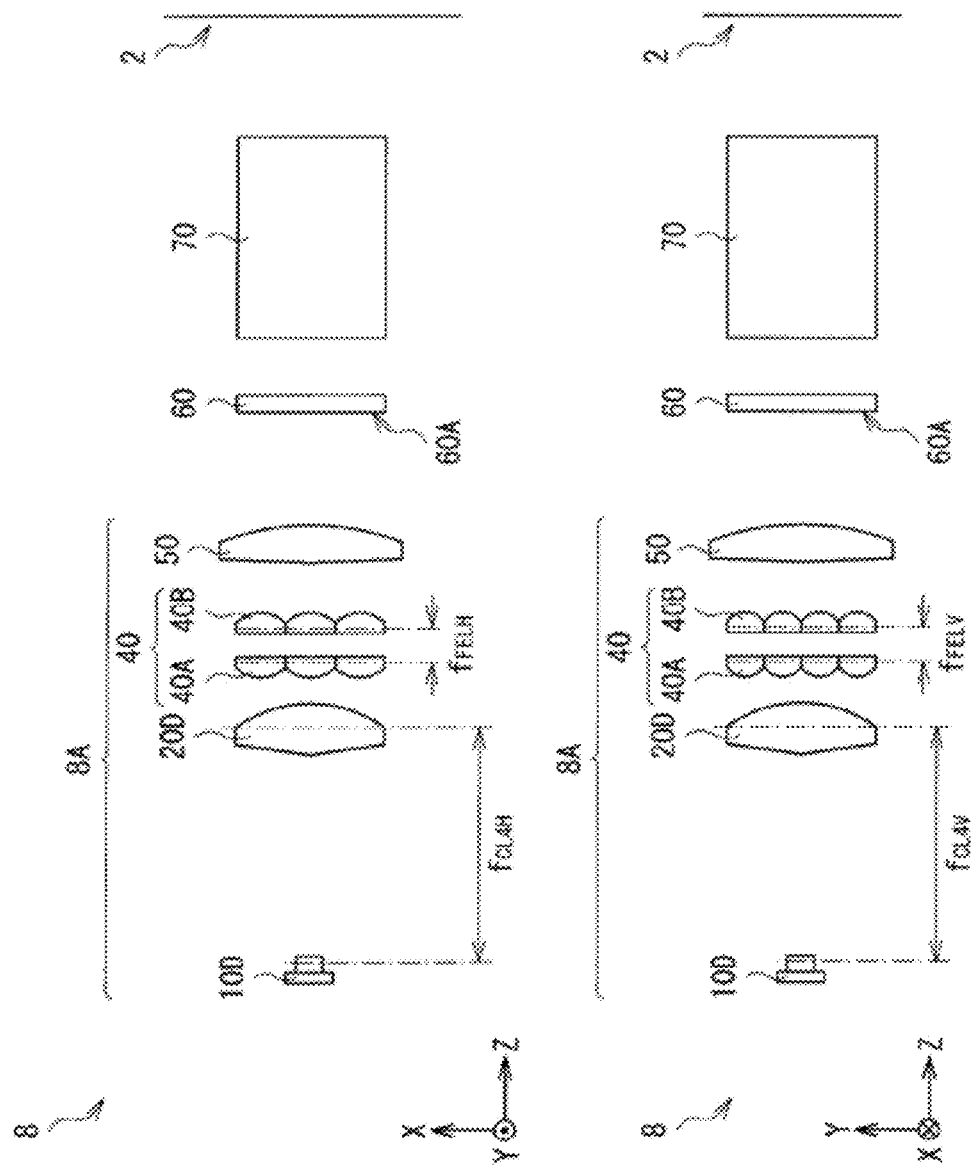

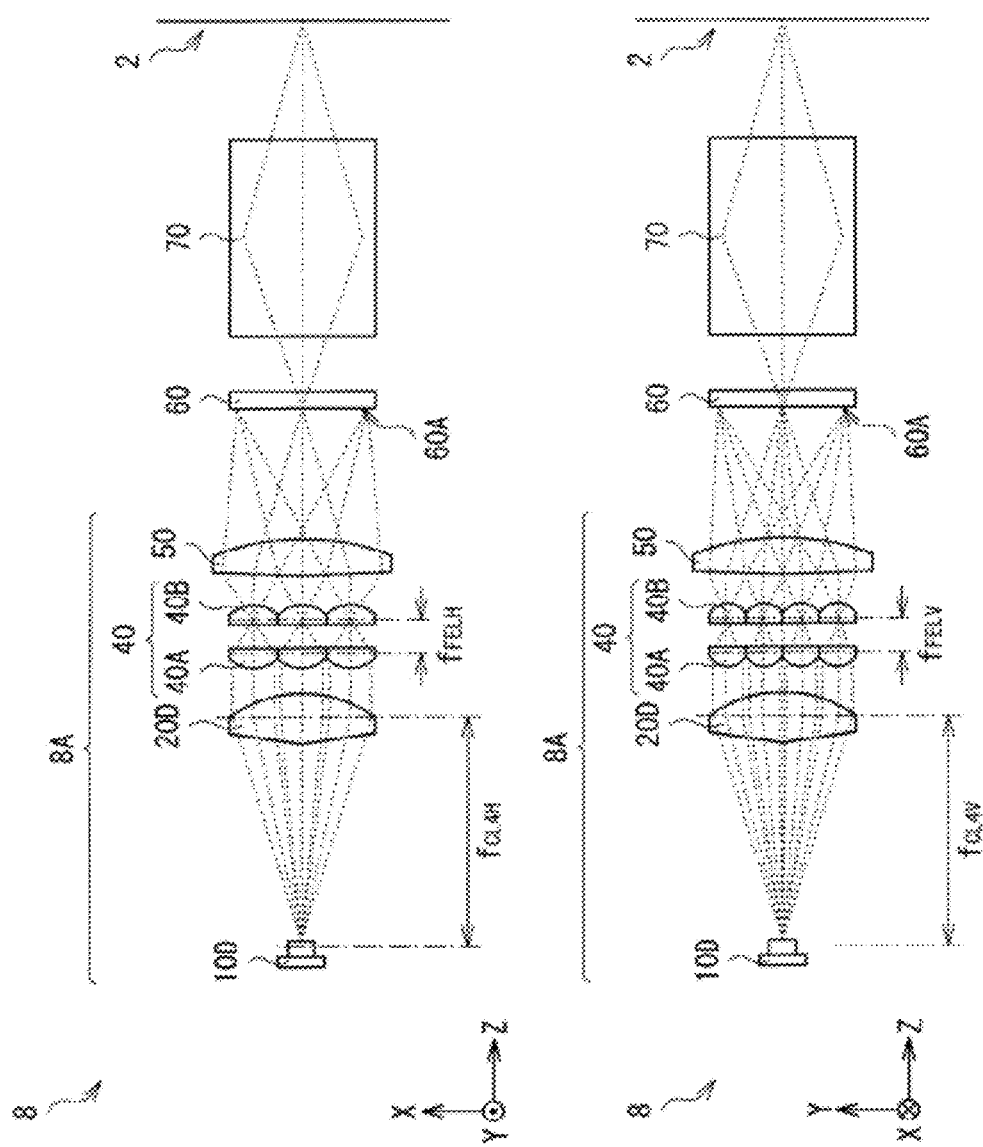

ILLUMINATION UNIT, PROJECTION DISPLAY UNIT, AND DIRECT VIEW DISPLAY UNIT

BACKGROUND

The disclosure relates to an illumination unit that uses a solid-state light-emitting device such as a laser diode (LD), and to a projection display unit and a direct view display unit each of which includes the same.

In recent years, a projector which projects a picture onto a screen has been used widely not only in offices but also in households. The projector modulates, using a light bulb, light derived from a light source to generate image light, and project the thus-generated image light onto the screen to perform displaying (for reference, see Japanese Unexamined Patent Application Publication No. 2008-134324). Nowadays, a palm-size microprojector, a mobile phone incorporating the microprojector, etc., have gradually been in widespread use.

SUMMARY

As a light source used in a projector, a high-luminance discharge lamp is the mainstream. The discharge lamp, however, has a comparatively large size and a large power consumption. Hence, a solid-state light-emitting device such as a light-emitting diode (LED), a laser diode (LD), and an organic EL (OLED) attracts attention recently as a light source substitute for the discharge lamp. These solid-state light-emitting devices are more advantageous over the discharge lamp not only in size and power consumption but also in high reliability.

Such a projector generally uses an integrator including such as a fly-eye lens to achieve reduction in luminance non-uniformity of illumination light (i.e., to uniformalize the luminance of the illumination light). In some cases, however, the luminance non-uniformity of the illumination light may not be reduced enough even when the integrator is used. Further improvement is thus desired.

It is desirable to provide an illumination unit capable of reducing luminance non-uniformity of illumination light, and a projection display unit and a direct view display unit each of which uses the illumination light.

An illumination unit according to an embodiment of the technology includes: one or more light sources each including a solid-state light-emitting device configured to emit light from a light emission region including a single or a plurality of light-emitting spots; an optical member allowing the light incident from the solid-state light-emitting device to pass therethrough and exit therefrom; and an optical device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

A projection display unit according to an embodiment of the technology includes: an illumination optical system; a spatial modulation device modulates, based on a picture signal inputted, light from the illumination optical system to thereby generate image light; and a projection optical system projecting the image light generated by the spatial modulation device, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

A direct view display unit according to an embodiment of the technology includes: an illumination optical system; a spatial modulation device modulates, based on a picture signal inputted, light from the illumination optical system to thereby generate image light; a projection optical system projecting the image light generated by the spatial modulation device; and a transmissive screen on which the image light projected from the projection optical system is displayed, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

In the illumination unit, the projection display unit, and the direct view display unit according to the embodiments of the technology, the optical device, that expands the shape of the luminance distribution of the incidence light on the incidence plane of the first fly-eye lens along the minor axis direction of the shape of the luminance distribution, is disposed on the optical path between the first fly-eye lens and the one or more light sources including the one or more chips configured by the laser diode. This makes it easier to reduce luminance non-uniformity of the incidence light in the integrator, even when the light emitted from the one or more light sources including the one or more chips configured by the laser diode shows a sharp luminance distribution shape (for example, even when a shape of a far-field pattern (FFP) is not a circle (isotropic) such as a shape of oval).

An illumination unit according to another embodiment of the technology includes: one or more light sources each including a solid-state light-emitting device configured to emit light from a light emission region including a single or a plurality of light-emitting spots; an optical member allowing the light incident from the solid-state light-emitting device to pass therethrough and exit therefrom; and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

A projection display unit according to another embodiment of the technology includes: an illumination optical system; a spatial modulation device modulates, based on a picture signal inputted, light from the illumination optical system to thereby generate image light; and a projection optical system projecting the image light generated by the spatial modulation device, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

A direct view display unit according to another embodiment of the technology includes: an illumination optical system; a spatial modulation device modulates, based on a picture signal inputted, light from the illumination optical system to thereby generate image light; a projection optical system projecting the image light generated by the spatial modulation device; and a transmissive screen on which the image light projected from the projection optical system is displayed, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

In the illumination unit, the projection display unit, and the direct view display unit according to other embodiments of the technology, the optical path branching device, that branches the optical path of the incidence light on the incidence plane of the first fly-eye lens into the plurality of optical paths along the minor axis direction of the shape of the luminance distribution of the incidence light, is provided on the optical path between the first fly-eye lens and the one or more light sources including the one or more chips configured by the laser diode. This makes it easier to reduce luminance non-uniformity of the incidence light in the integrator, even when the light emitted from the one or more light sources including the one or more chips configured by the laser diode shows a sharp luminance distribution shape (for example, even when a shape of a far-field pattern (FFP) is not a circle (isotropic) such as a shape of oval).

According to the illumination unit, the projection display unit, and the direct view display unit of the embodiments of the technology, the optical device is disposed on the optical path between the first fly-eye lens and the one or more light sources including the one or more chips configured by the laser diode, and the optical device allows the shape of the luminance distribution of the incidence light on the incidence plane of the first fly-eye lens to be expanded along the minor axis direction of the shape of the luminance distribution. This makes it easier to reduce luminance non-uniformity of the incidence light in the integrator. Hence, it is possible to reduce the luminance non-uniformity in the illumination light, and to improve displaying quality.

According to the illumination unit, the projection display unit, and the direct view display unit of other embodiments of the technology, the optical path branching device is provided on the optical path between the first fly-eye lens and the one or more light sources including the one or more chips configured by the laser diode, and the optical path branching device branches the optical path of the incidence light on the incidence plane of the first fly-eye lens into the plurality of optical paths along the minor axis direction of the shape of the luminance distribution of the incidence light. This makes it easier to reduce luminance non-uniformity of the incidence light in the integrator. Hence, it is possible to reduce the luminance non-uniformity in the illumination light, and to improve displaying quality.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 1A and 1B each illustrate a schematic configuration of a projector according to a first embodiment of the technology.

FIGS. 2A and 2B each illustrate an example of an optical path within the projector in FIGS. 1A and 1B.

FIGS. 3A and 3B illustrate examples of a top surface configuration and a cross-sectional configuration of a light source in FIGS. 1A and 1B, respectively, when a chip in the light source is a top surface light-emitting device.

FIGS. 4A and 4B illustrate other examples of the top surface configuration and the cross-sectional configuration of the light source in FIGS. 1A and 1B, respectively, when the chip in the light source is the top surface light-emitting device.

FIGS. 6A to 6C each illustrate an example of a light-emitting spot when the chip is the top surface light-emitting device in the light source in FIGS. 1A and 1B.

FIGS. 13A and 13B each illustrate a schematic configuration of a fly-eye lens in FIGS. 1A and 1B.

FIG. 14 schematically illustrates configuration examples of the light-emitting spot in the light source in FIGS. 1A and 1B and a far-field pattern (FFP).

FIGS. 17A and 17B schematically illustrate other configuration examples of the light-emitting spot in the light source in FIGS. 1A and 1B and the FFP.

FIGS. 29A to 29D schematically illustrate other configuration examples of the upstream fly-eye lens according to the second embodiment.

FIGS. 30A and 30B each illustrate a schematic configuration of a projector according to a third embodiment of the technology.

FIGS. 34A and 34B each illustrate a schematic configuration of a projector according to a fourth embodiment of the technology.

FIG. 35 is a perspective view illustrating a detailed configuration example of major parts of an illumination optical system in FIGS. 34A and 34B.

FIGS. 36A and 36B are each schematic illustrations for describing a concrete example and an effect thereof of an optical path branching device illustrated in FIG. 35.

FIGS. 38A and 38B each illustrate a schematic configuration of a projector according to a fifth embodiment of the technology.

FIGS. 39A and 39B each illustrate a schematic configuration of a projector according to a first modification of any one of the first to the fifth embodiments of the technology.

FIGS. 40A and 40B each illustrate a schematic configuration of a projector according to a second modification of any one of the first to the fifth embodiments of the technology.

FIGS. 41A and 41B each illustrate an example of an optical path within the projector in FIGS. 40A and 40B.

DETAILED DESCRIPTION

Figures 5A, 5B:
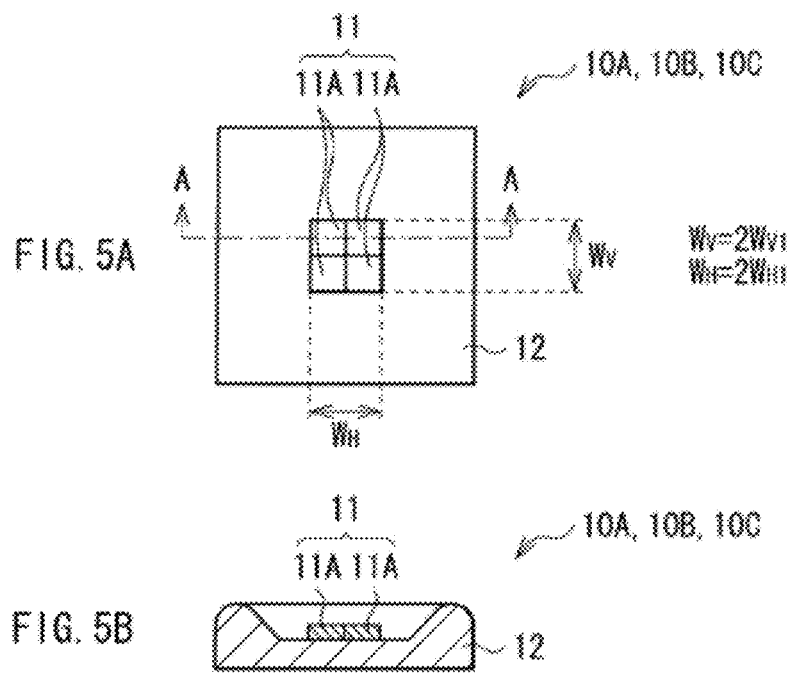
FIGS. 5A and 5B illustrate yet other examples of the top surface configuration and the cross-sectional configuration of the light source in FIGS. 1A and 1B, respectively, when the chip in the light source is the top surface light-emitting device.
Figure 7A:
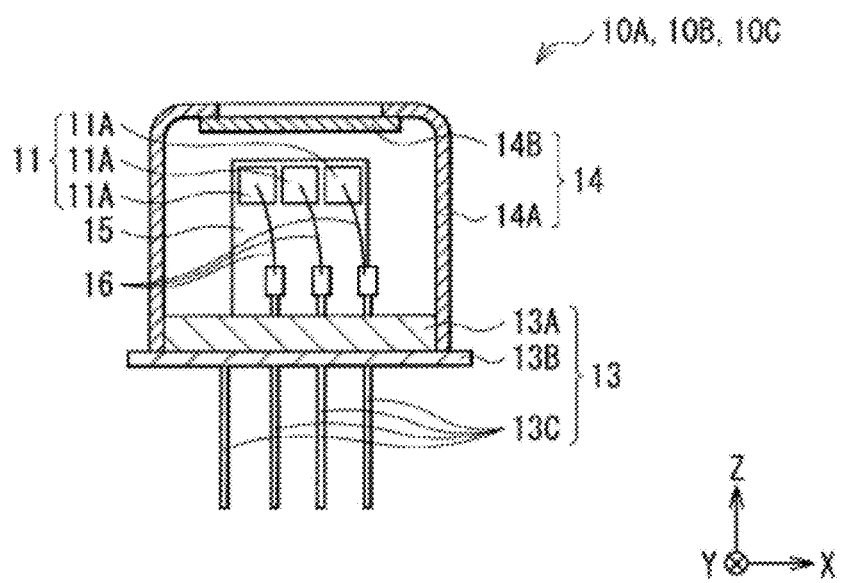
FIG. 7A illustrates an example of the cross-sectional configuration of the light source in FIGS. 1A and 1B.
Figure 7B:
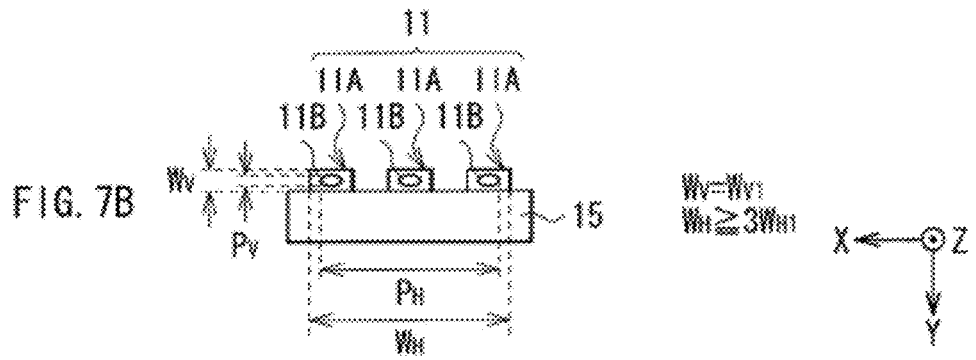
FIG. 7B illustrates an example of a configuration of a solid-state light-emitting device as viewed from a light emission surface thereof, when the chip is an end face light-emitting device.
Figure 8A:
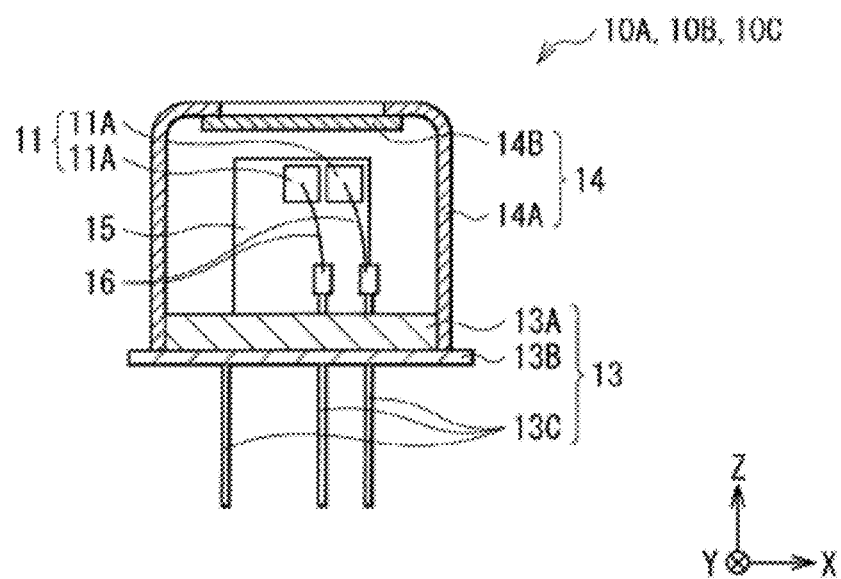
FIG. 8A illustrates another example of the cross-sectional configuration of the light source in FIGS. 1A and 1B.
Figure 8B:
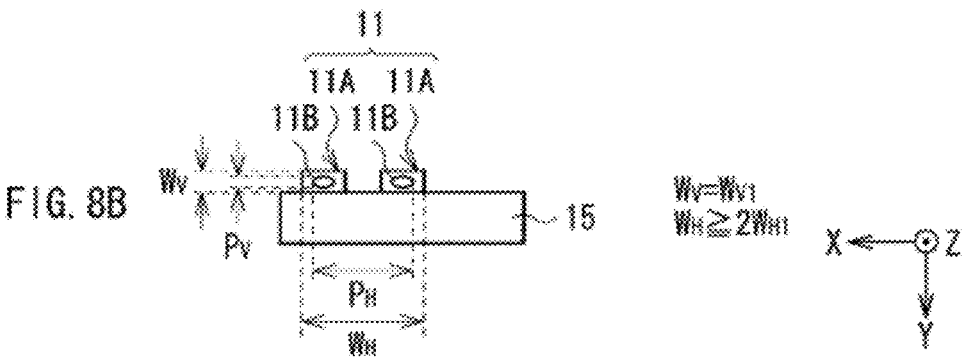
FIG. 8B illustrates another example of the configuration of the solid-state light-emitting device as viewed from the light emission surface thereof, when the chip is the end face light-emitting device.

In the following, some embodiments of the technology will be described in detail with reference to the accompanying drawings. The description is given in the following order.
1. First Embodiment (an example in which a luminance distribution of incident light entering an upstream fly-eye lens is inclined)
2. Second Embodiment (an example in which arrangement of cells in the upstream fly-eye lens is shifted)
3. Third Embodiment (an example in which an anamorphic lens is provided in an illumination optical system)
4. Fourth Embodiment (an example in which an optical path branching device is provided in the illumination optical system)
5. Fifth Embodiment (an example in which both of the anamorphic lens and the optical path branching device are provided in the illumination optical system)
6. Modifications Common to First to Fifth Embodiments
   First Modification (an example in which a reflective device is used as a spatial modulation device)
   Second Modification (an example in which only a single light source is provided in the illumination optical system)
   Third Modification (an example in which a chip in the light source is so arranged as to be inclined relative to an optical axis)
   Other Modifications (a combination of respective embodiments etc., and an application example to a rear projection display unit)

First Embodiment

[General Configuration of Projector 1]

FIGS. 1A and 1B each illustrate a schematic configuration of a projector (a projector 1) according to a first embodiment of the technology. It is to be noted that the projector 1 corresponds to a concrete (but not limitative) example of a "projection display unit" in one embodiment of the technology. FIG. 1A illustrates a configuration example in which the projector 1 is viewed from above (in a y-axis direction), and FIG. 1B illustrates a configuration example in which the projector 1 is viewed from a lateral side (in an x-axis direction). FIGS. 2A and 2B each illustrate an example of an optical path in the projector 1 illustrated in FIGS. 1A and 1B. FIG. 2A illustrates an example of the optical path in which the projector 1 is viewed from above (in the y-axis direction), and FIG. 2B illustrates an example of the optical path in which the projector 1 is viewed from the lateral side (in the x-axis direction).

Generally, the y-axis faces in a vertical direction and the x-axis faces in a horizontal direction. Conversely, the y-axis may face in the horizontal direction and the x-axis may face in the vertical direction. In the following, description is given on the premise that the y-axis faces in the vertical direction and the x-axis faces in the horizontal direction for the sake of convenience. Also, in the following, the "horizontal direction" refers to the x-axis direction and the "vertical direction" refers to the y-axis direction.

The projector 1 includes, for example, an illumination optical system 1A, a spatial modulation device 60, and a projection optical system 70. The spatial modulation device 60 modulates, based on a picture signal inputted, light derived from the illumination optical system 1A to thereby generate image light. The projection optical system 70 projects the image light generated in the spatial modulation device 60 onto a reflective screen 2.

It is to be noted that the illumination optical system 1A corresponds to a concrete (but not limitative) example of an "illumination unit" in one embodiment of the technology.

[Configuration of Illumination Optical System 1A]

The illumination optical system 1A supplies a light flux with which an illumination region 60A (a surface to be irradiated or "irradiated surface") of the spatial modulation device 60 is irradiated. Optionally, any optical device may be provided on a region through which light of the illumination optical system 1A passes. For example, a member such as a filter that attenuates light other than visible light in the light derived from the illumination optical system 1A may be provided on the region through which the light of the illumination optical system 1A passes.

As illustrated in FIGS. 1A and 1B, the illumination optical system 1A may include: light sources 10A, 10B, and 10C; coupling lenses (traveling-direction angle conversion devices) 20A, 20B, and 20C; an optical path unifying device 30; an integrator 40; and a condenser lens 50, for example. The optical path unifying device 30 unifies light derived from each of the light sources 10A, 10B, and 10C, and may include two dichroic mirrors 30A and 30B, for example. The integrator 40 uniformizes an illuminance distribution of light in the illumination region 60A, and may include a pair of fly-eye lenses 40A and 40B, for example. The coupling lens 20A, the optical path unifying device 30, the integrator 40, and the condenser lens 50 are arranged on an optical axis of the light source 10A in this order from the light source 10A. An optical axis of the light source 10B intersects the optical axis of the light source 10A at the dichroic mirror 30A. The coupling lens 20B and the dichroic mirror 30A are arranged on the optical axis of the light source 10B in this order from the light source 10B. An optical axis of the light source 10C intersects the optical axis of the light source 10A at the dichroic mirror 30B. The coupling lens 20C and the dichroic mirror 30B are arranged on the optical axis of the light source 10C in this order from the light source 10C.

Among these, the coupling lenses (the traveling-direction angle conversion devices) 20A, 20B, and 20C and the integrator 40 correspond to a concrete (but not limitative)

example of an "optical member (an optical member through which light incident from a later-described solid-state light-emitting device passes and exits therefrom) in one embodiment of the technology.

It is to be noted that FIGS. 1A and 1B each illustrate an embodiment where the respective elements (excluding the light sources 10B and 10C and the coupling lenses 20B and 20C) of the projector 1 are arranged on a line segment which is parallel to the z-axis. However, a part of the elements of the projector 1 may be arranged on a line segment which is not parallel to the z-axis. For example, although not illustrated, the illumination optical system 1A may be so laid out that the illumination optical system 1A as a whole is rotated by 90 degrees from the state illustrated in FIGS. 1A and 1B to allow the optical axis of the illumination optical system 1A to face in a direction perpendicular to the z-axis. In this embodiment, an optical device (such as a mirror, for example) may be provided that guides the light outputted from the illumination optical system 1A to the spatial modulation device 60. Also, for example, the light source 10A, the coupling lens 20A, and the optical path unifying device 30 may be so laid out that the light source 10A, the coupling lens 20A, and the optical path unifying device 30 are rotated by 90 degrees from the state illustrated in FIGS. 1A and 1B to allow the optical axes thereof to face in a direction perpendicular to the z-axis. In this embodiment, an optical device (such as a mirror, for example) may also be provided that guides the light outputted from the optical path unifying device 30 to the integrator 40.

[Light Sources 10A, 10B, and 10C: When Chip 11A is Top Surface Light-Emitting Device]

Referring to FIGS. 3A and 3B to FIGS. 5A and 5B, the light sources 10A, 10B, and 10C each may have a solid-state light-emitting device 11 and a package 12 (a substrate by which the solid-state light-emitting device 11 is mounted) by which the solid-state light-emitting device 11 is supported, for example. In other words, each of the light sources 10A, 10B, and 10C serves as a package to support the solid-state light-emitting device 11 on the substrate. The solid-state light-emitting device 11 emits light from a light emission region that includes a single or a plurality of light-emitting spots in a shape of a dot or in a non-dot shape. As illustrated in FIGS. 3A and 3B, the solid-state light-emitting device 11 may include a single chip 11A that emits a light beam having a predetermined wavelength band, for example. Alternatively, as illustrated in FIGS. 4A and 4B and FIGS. 5A and 5B, the solid-state light-emitting device 11 may include a plurality of the chips 11A that emit light beams having the same wavelength band or having the wavelength bands different from one another, for example. In one embodiment where the solid-state light-emitting device 11 includes the plurality of chips 11A, these chips 11A may be arranged, for example, in a line in the horizontal direction as illustrated in FIGS. 4A and 4B. Alternatively, these chips 11A may be arranged, for example, in a form of a lattice in the horizontal direction and in the vertical direction as illustrated in FIGS. 5A and 5B. The number of chips 11 included in the solid-state light-emitting device 11 may be different for each of the light sources 10A, 10B, and 10C, or may be the same for all of the light sources 10A, 10B, and 10C.

In one embodiment where the solid-state light-emitting device 11 includes the single chip 11A, a size ($W_V \times W_H$) of the solid-state light-emitting device 11 may be, for example, equal to a size ($W_{V1} \times W_{H1}$) of the single chip 11A as illustrated in FIG. 3A. In one embodiment where the solid-state light-emitting device 11 includes the plurality of chips 11A, the size of the solid-state light-emitting device 11 may be, for example, equal to a size when all of the chips 11A are gathered into one as illustrated in FIG. 4A and FIG. 5A. When the plurality of chips 11A are arranged in a line in the horizontal direction, the size ($W_V \times W_H$) of the solid-state light-emitting device 11 is defined as $W_{V1} \times 2W_{H1}$ in the embodiment illustrated in FIG. 4A. When the plurality of chips 11A are arranged in the form of the lattice in the horizontal and vertical directions, the size ($W_V \times W_H$) of the solid-state light-emitting device 11 is defined as $2W_{V1} \times 2W_{H1}$ in the embodiment illustrated in FIG. 5A.

The chip 11A may include a light-emitting diode (LED), an organic EL light-emitting device (OLED), a laser diode (LD), or other suitable light emitting device. In the first embodiment, at least one of the chips 11A in the light sources 10A, 10B, and 10C as a whole is configured by the LD. Other chips 11A, excluding the chip 11A configured by the LD described previously, may be configured by any combination of LED, OLED, LD, and other suitable light emitting device.

The chip 11A included in each of the light sources 10A, 10B, and 10C may be configured to, for example, emit a light beam having a wavelength band which is different for each of the light sources 10A, 10B, and 10C. The chip 11A included in the light source 10A may emit a light beam having a wavelength of, for example, about 400 nm to 500 nm (for example, blue light). The chip 11A included in the light source 10B may emit a light beam having a wavelength of, for example, about 500 nm to 600 nm (for example, green light). The chip 11A included in the light source 10C may emit a light beam having a wavelength of, for example, about 600 nm to 700 nm (for example, red light). Note that the chip 11A included in the light source 10A may emit light other than the blue light (for example, the green light or the red light). Also, the chip 11A included in the light source 10B may emit light other than the green light (for example, the blue light or the red light). Further, the chip 11A included in the light source 10C may emit light other than the red light (for example, the green light or the blue light).

As illustrated in FIGS. 3A and 3B to FIGS. 6A, 6B, and 6C, the chip 11A may have, for example, a light-emitting spot 11B having a size ($P_{V1} \times P_{H1}$) smaller than the size ($W_V \times W_H$) of the chip 11A. The light-emitting spot 11B corresponds to a region (a light emission region) where the light is emitted from the chip 11A when an electric current is injected into the chip 11A to drive the chip 11A. In one embodiment where the chip 11A includes LED or OLED, the light-emitting spot 11B has the non-dot shape (for example, has a planar shape). In one embodiment where the chip 11A includes LD, the light-emitting spot 11B has the shape of a dot smaller than the light-emitting spot 11B of the LED or the OLED.

In one embodiment where the solid-state light-emitting device 11 includes the single chip 11A, the number of light-emitting spots 11B may be, for example, one as illustrated in FIG. 6A. In one embodiment where the solid-state light-emitting device 11 has a monolithic structure as will be described later, the number of light-emitting spots 11B is two or more, and this applies to the description given in the following as well. On the other hand, in one embodiment where the solid-state light-emitting device 11 includes the plurality of chips 11A, the number of light-emitting spots 11B may be, for example, equal to the number of chips 11A as illustrated in FIGS. 6B and 6C (note that the number of light-emitting spots 11B is greater than the number of chips 11A in one embodiment where the solid-state light-emitting device 11 has the monolithic structure as described above). Here, in one embodiment where the solid-state light-emitting device 11 includes the single chip 11A, the size ($P_V \times P_H$) of the light emission region of the solid-state light-emitting device 11 is equal to the size ($P_{V1} \times P_{H1}$) of the light-emitting spot 11B (excluding the embodiment where the solid-state light-emitting device 11 has the monolithic structure as described above). On the other hand, in one embodiment where the solid-state light-emitting device 11 includes the plurality of chips 11A, the size ($P_V \times P_H$) of the light emission region of the solid-state light-emitting device 11 is equal to, when the light-emitting spots 11B of all of the chips 11A are enclosed with minimum area, a size of that enclosure. When the plurality of chips 11A are arranged in a line in the horizontal direction, the size ($P_V \times P_H$) of the light emission region is larger than $P_{V1} \times 2P_{H1}$ and smaller than $W_V \times W_H$ in the embodiment illustrated in FIG. 6B. Also, when the plurality of chips 11A are arranged in the form of the lattice in the horizontal and the vertical directions, the size ($P_V \times P_H$) of the light emission region is larger than $2P_{V1} \times 2P_{H1}$ and smaller than $W_V \times W_H$ in the embodiment illustrated in FIG. 6C.

[Light Sources 10A, 10B, and 10C: When Chip 11A is End Face Light-Emitting Device]

FIGS. 3A and 3B to FIGS. 6A and 6B illustrate the exemplary embodiments where the chip 11A is the top surface light-emitting device. Alternatively, a configuration may be employed in which the chip 11A is an end face light-emitting device as will be described below. Referring to FIGS. 7A and 7B to FIGS. 12A, 12B, and 12C, each of the light sources 10A, 10B, and 10C in this embodiment may have, for example, a can-type configuration in which the solid-state light-emitting device 11 including one or more end face light-emitting chips 11A are accommodated in inner space surrounded by a stem 13 and a cap 14. In other words, each of the light sources 10A, 10B, and 10C here is a package accommodating therein the solid-state light-emitting device 11.

The stem 13 structures, together with the cap 14, the package of each of the light sources 10A, 10B, and 10C. The stem 13 may have, for example: a support substrate 13A which supports a submount 15; an outer frame substrate 13B arranged on the back surface of the support substrate 13A; and a plurality of connection terminals 13C.

The submount 15 may be made of a material having conductivity and heat dissipation properties. Each of the support substrate 13A and the outer frame substrate 13B has a configuration in which one or more insulating through-holes and one or more conductive through-holes are formed on a substrate having conductivity and heat dissipation properties. The support substrate 13A and the outer frame substrate 13B may have a shape of, for example, a circular plate, and are so stacked as to allow unillustrated center axes thereof to overlap with each other. A diameter of the outer frame substrate 13B is greater than a diameter of the support substrate 13A. An outer edge of the outer frame substrate 13B may form an annular flange that bulges outward radially from the center axis of the outer frame substrate 13B within a plane in which the center axis of the outer frame substrate 13B is defined as the normal. The flange serves to define a reference position when inserting and fitting the cap 14 into the support substrate 13A in a manufacturing process.

The plurality of connection terminals 13C penetrate through at least the support substrate 13A. The terminals (hereinafter referred to as "terminals α" for the sake of convenience) of the plurality of connection terminals 13C, from which at least one terminal is excluded, is electrically connected in a one-by-one fashion to unillustrated electrodes of the respective chips 11A. For example, the terminal a protrudes considerably (longer) on the outer frame substrate 13B side, and protrudes slightly (shorter) on the support substrate 13A side. The terminal (hereinafter referred to as a "terminal β" for the sake of convenience) other than the terminals α of the plurality of connection terminals 13C is electrically connected to unillustrated the other electrodes of all of the chips 11A. For example, the terminal βprotrudes considerably (longer) on the outer frame substrate 13B side, and an end edge on the support substrate 13A side of the terminal βmay be embedded within, for example, the support substrate 13A. A part of each of the connection terminals 13C that protrudes considerably (longer) on the outer frame substrate 13B side corresponds to a part to be inserted into, for example, a substrate or the like. On the other hand, parts of the plurality of connection terminals 13C that protrude slightly (shorter) on the support substrate 13A side correspond to parts to be electrically connected in a one-by-one fashion to the respective chips 11A through wires 16. Parts of the plurality of connection terminals 13C that are embedded in the support substrate 13A correspond to parts to be electrically connected with all of the chips 11A through the support substrate 13A and the submount 15, for example. The terminal a is supported by the insulating through-hole provided in the support substrate 13A and the outer frame substrate 13B, and is insulated and isolated from the support substrate 13A and the outer frame substrate 13B by that through-hole. Further, each of the terminals α is insulated and isolated from one another by the insulating member described above. On the other hand, the terminal β is supported by the conductive through-hole provided in the support substrate 13A and the outer frame substrate 13B, and is electrically connected with that through-hole.

The cap 14 serves to seal the solid-state light-emitting device 11. The cap 14 may have, for example, a cylinder section 14A whose upper end and lower end are each provided with an opening. The lower end of the cylinder section 14A comes into contact with a side face of the support substrate 13A, and the solid-state light-emitting device 11 is located in inner space of the cylinder section 14A. The cap 14 has a light transmission window 14B so disposed as to block the opening on the upper end of the cylinder section 14A. The light transmission window 14B is disposed at a position facing the light emission surface of the solid-state light-emitting device 11, and has a function of transmitting therethrough light outputted from the solid-state light-emitting device 11.

Thus, in the embodiments where the chip 11A is the end face light-emitting device, the solid-state light-emitting device 11 also emits light from the light emission region that includes the single or the plurality of light-emitting spots in the shape of a dot or in the non-dot shape. The solid-state light-emitting device 11 may include the single chip 11A that emits the light beam having a predetermined wavelength band, for example. Alternatively, the solid-state light-emitting device 11 may include the plurality of chips 11A that emit the light beams having the same wavelength band or having the wavelength bands different from one another, for example. In one embodiment where the solid-state light-emitting device 11 includes the plurality of chips 11A, these chips 11A may be arranged, for example, in a line in the horizontal direction as illustrated in FIGS. 7A and 7B and FIGS. 8A and 8B. Alternatively, these chips 11A may be arranged, for example, in a line in the vertical direction as illustrated in FIGS. 10A and 10B and FIGS. 11A and 11B. The number of chips 11A included in the solid-state light-emitting device 11 may be different for each of the light sources 10A, 10B, and 10C, or may be the same for all of the light sources 10A, 10B, and 10C.

Figure 9A:
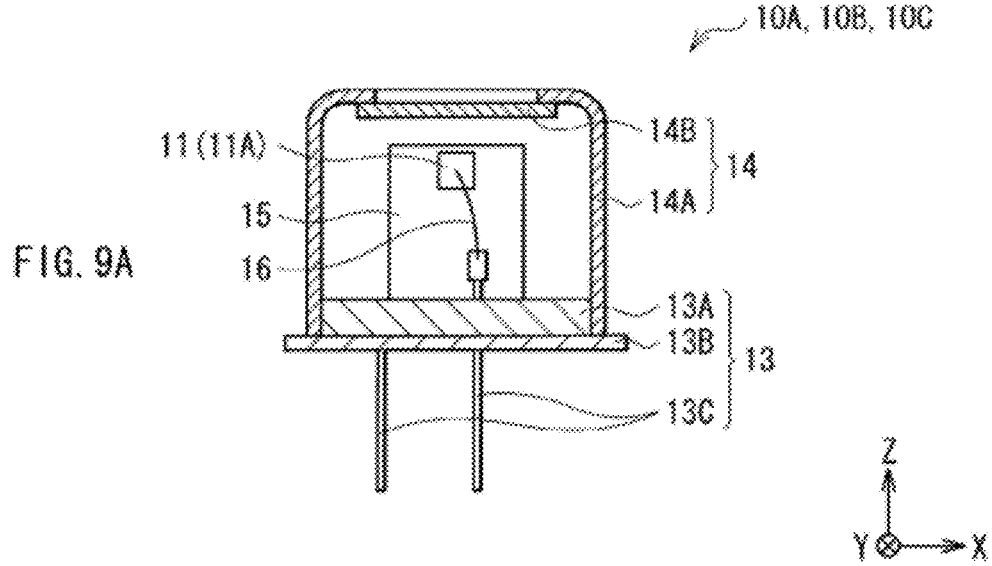
FIG. 9A illustrates yet another example of the cross-sectional configuration of the light source in FIGS. 1A and 1B, and FIGS. 9B and 9C each illustrate yet another example of the configuration of the solid-state light-emitting device as viewed from the light emission surface thereof, when the chip is the end face light-emitting device.
Figure 9B:
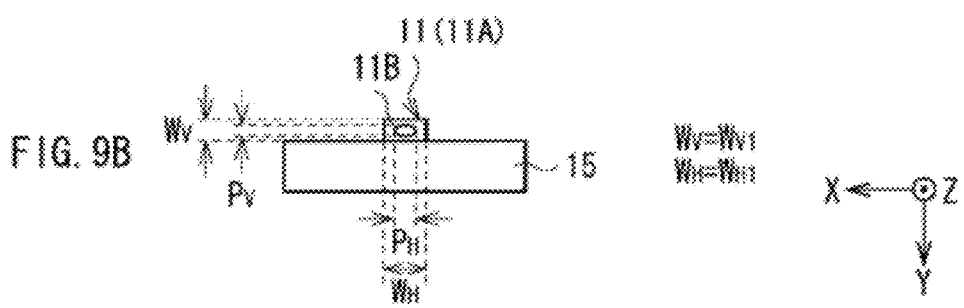
Figure 9C:
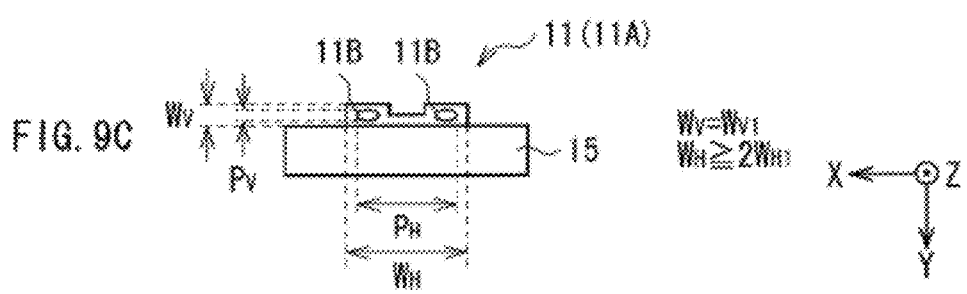
Figure 10A:
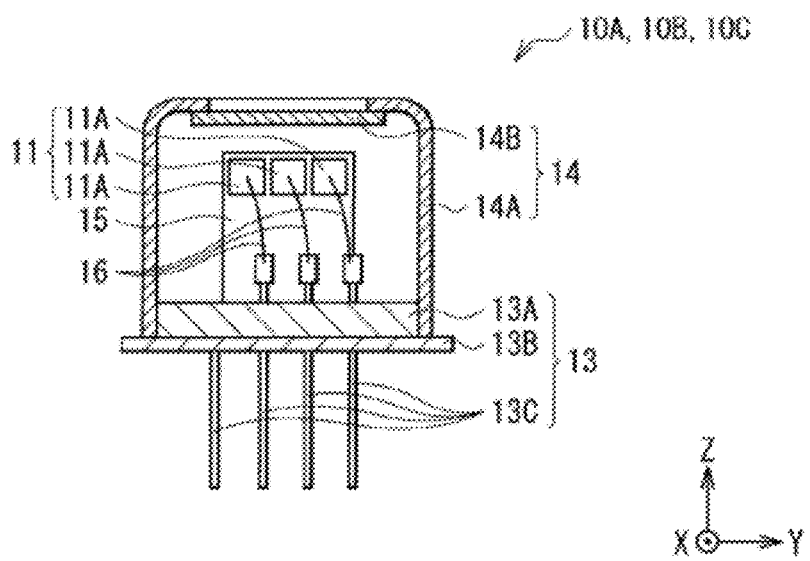
FIGS. 10A and 10B each illustrate a configuration example when the light source in FIGS. 7A and 7B is rotated by 90 degrees in an XY plane.
Figure 10B:
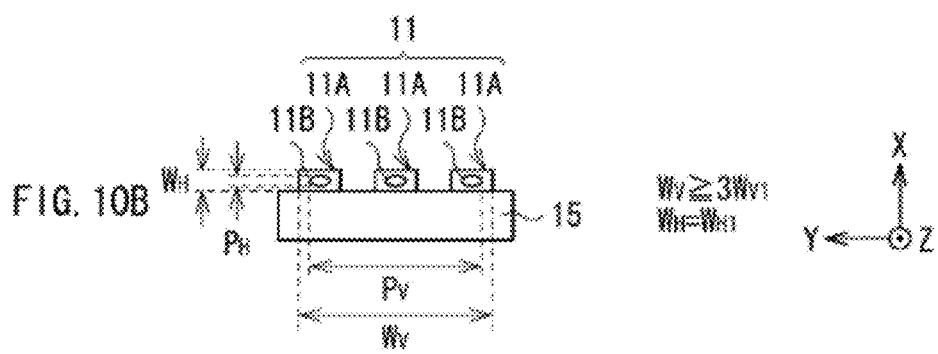
Figure 11A:
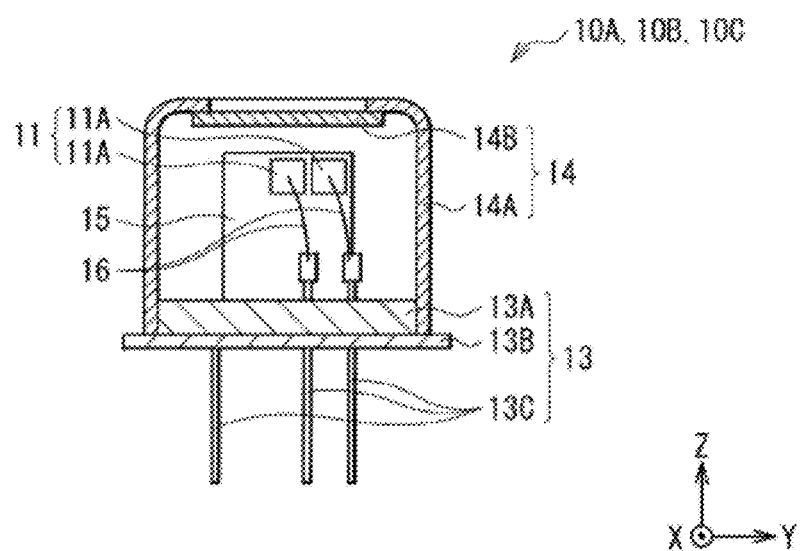
FIGS. 11A and 11B each illustrate a configuration example when the light source in FIGS. 8A and 8B is rotated by 90 degrees in the XY plane.
Figure 11B:
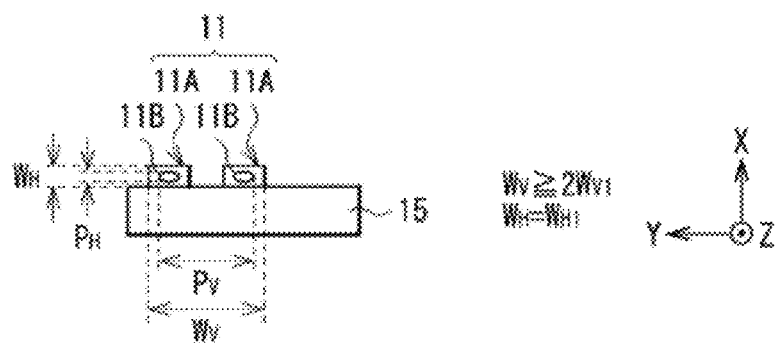
Figure 12A:
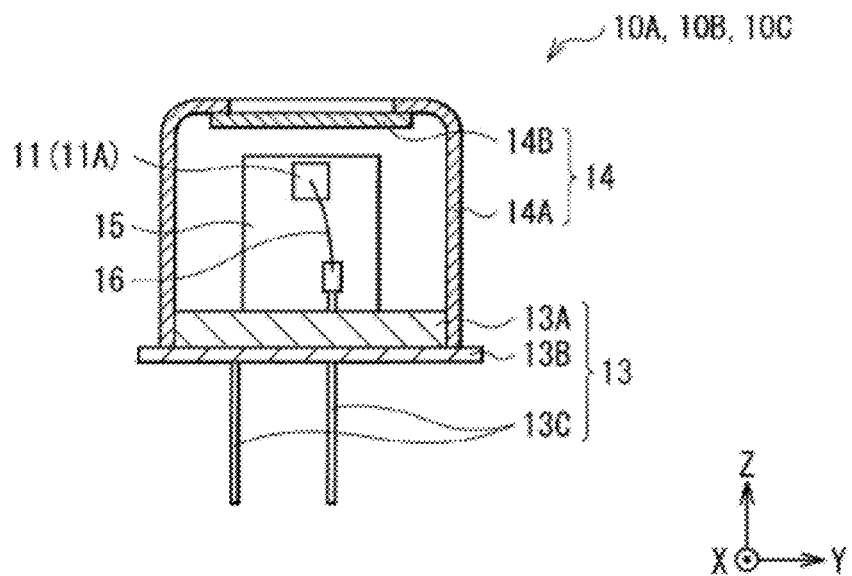
FIGS. 12A to 12C each illustrate a configuration example when the light source in FIGS. 9A to 9C is rotated by 90 degrees in the XY plane.
Figure 12B:
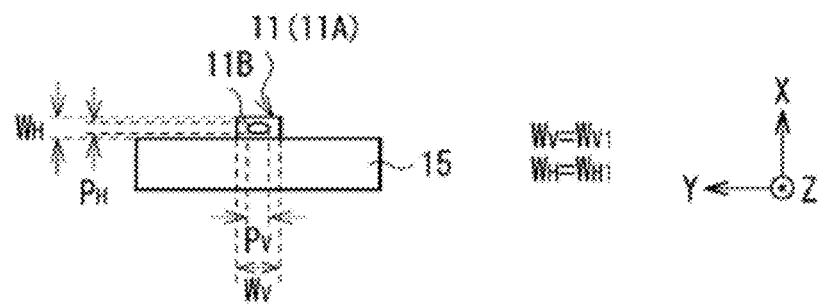
Figure 12C:
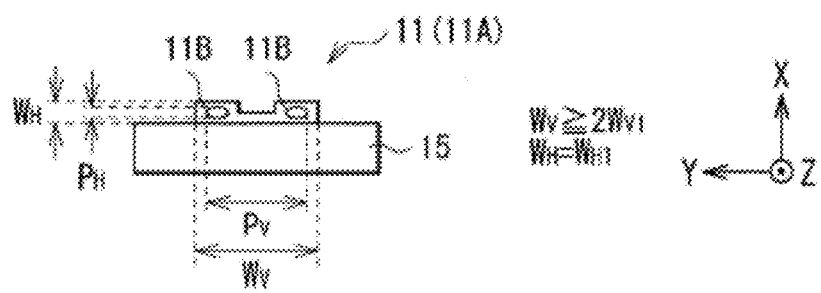

In one embodiment where the solid-state light-emitting device 11 includes the single chip 11A, the size ($W_V \times W_H$) of the solid-state light-emitting device 11 may be, for example, equal to the size ($W_{V1} \times W_{H1}$) of the single chip 11A as illustrated in FIGS. 9B and 12B. Note that configurations described below are employed in one embodiment where the solid-state light-emitting device 11 has the monolithic structure as illustrated in FIGS. 9C and 12C, and this applies to the description given in the following as well. Namely, the size ($W_V \times W_H$) of the solid-state light-emitting device 11 is larger than $W_{V1} \times 2W_{H1}$ in the embodiment illustrated FIG. 9C, and the size ($W_V \times W_H$) of the solid-state light-emitting device 11 is larger than $2W_{V1} \times W_{H1}$ in the embodiment illustrated FIG. 12C. On the other hand, in one embodiment where the solid-state light-emitting device 11 includes the plurality of chips 11A, the size of the solid-state light-emitting device 11 may be, for example, equal to the size when all of the chips 11A are gathered into one as illustrated in FIGS. 7B, 8B, 10B, and 11B. When the plurality of chips 11A are arranged in a line in the horizontal direction, the size ($W_V \times W_H$) of the solid-state light-emitting device 11 is larger than $W_{V1} \times 3W_{H1}$ in the embodiment illustrated in FIG. 7B, and is larger than $W_{V1} \times 2W_{H1}$ in the embodiment illustrated in FIG. 8B. Also, when the plurality of chips 11A are arranged in a line in the vertical direction, the size ($W_V \times W_H$) of the solid-state light-emitting device 11 is larger than $3W_{V1} \times W_{H1}$ in the embodiment illustrated in FIG. 10B, and is larger than $2W_{V1} \times W_{H1}$ in the embodiment illustrated in FIG. 11B.

The chip 11A may include a laser diode (LD), for example. As described in the foregoing, at least one of the chips 11A in the light sources 10A, 10B, and 10C as a whole is configured by the LD. Other chips 11A, excluding the chip 11A configured by the LD described previously, may be configured by any combination of LED, OLED, LD, and other suitable light emitting device.

As illustrated in FIGS. 7A and 7B to FIGS. 15A, 15B, and 15C, the chip 11A may have, for example, the light-emitting spot 11B having the size ($P_{V1} \times P_{H1}$) smaller than the size ($W_V \times W_H$) of the chip 11A. The light-emitting spot 11B corresponds to the region (the light emission region) where the light is emitted from the chip 11A when an electric current is injected into the chip 11A to drive the chip 11A. In one embodiment where the chip 11A includes LD, the light-emitting spot 11B has the shape of a dot smaller than the light-emitting spot 11B of the LED or the OLED.

In one embodiment where the solid-state light-emitting device 11 includes the single chip 11A, the number of light-emitting spots 11B may be, for example, one as illustrated in FIGS. 9B and 12B. In one embodiment where the solid-state light-emitting device 11 has the monolithic structure, the number of light-emitting spots 11B is two or more (here, two light-emitting spots 11B), and this applies to the description given in the following as well. On the other hand, in one embodiment where the solid-state light-emitting device 11 includes the plurality of chips 11A, the number of light-emitting spots 11B may be, for example, equal to the number of chips 11A as illustrated in FIGS. 7B, 8B, 10B, and 11B. Here, in one embodiment where the solid-state light-emitting device 11 includes the single chip 11A, the size ($P_V \times P_H$) of the light emission region of the solid-state light-emitting device 11 is equal to the size ($P_{V1} \times P_{H1}$) of the light-emitting spot 11B. Note that configurations described below are employed in one embodiment where the solid-state light-emitting device 11 has the monolithic structure as illustrated in FIGS. 9C and 12C, and this applies to the description given in the following as well. Namely, the size ($P_V \times P_H$) of the light emission region of the solid-state light-emitting device 11 is larger than $P_{V1} \times 2P_{H1}$ and smaller than $W_V \times W_H$ in the embodiment illustrated FIG. 9C. Also, the size ($P_V \times P_H$) of the light emission region of the solid-state light-emitting device 11 is larger than $2P_{V1} \times P_{H1}$ and smaller than $W_V \times W_H$ in the embodiment illustrated in FIG. 12C. On the other hand, in one embodiment where the solid-state light-emitting device 11 includes the plurality of chips 11A, the size ($P_V \times P_H$) of the light emission region of the solid-state light-emitting device 11 is equal to, when the light-emitting spots 11B of all of the chips 11A are enclosed with minimum area, a size of that enclosure. When the plurality of chips 11A are arranged in a line in the horizontal direction, the size ($P_V \times P_H$) of the light emission region is larger than $P_{V1} \times 3P_{H1}$ and smaller than $W_V \times W_H$ in the embodiment illustrated in FIG. 7B, and similarly, the size ($P_V \times P_H$) of the light emission region is larger than $P_{V1} \times 2P_{H1}$ and smaller than $W_V \times W_H$ in the embodiment illustrated in FIG. 8B. Also, when the plurality of chips 11A are arranged in a line in the vertical direction, the size ($P_V \times P_H$) of the light emission region is larger than $3P_{V1} \times P_{H1}$ and smaller than $W_V \times W_H$ in the embodiment illustrated in FIG. 10B, and similarly, the size ($P_V \times P_H$) of the light emission region is larger than $2P_{V1} \times P_{H1}$ and smaller than $W_V \times W_H$ in the embodiment illustrated in FIG. 11B.

Referring to FIGS. 2A and 2B, the coupling lens 20A, for example, may turn the light emitted from the light source 10A into substantially parallel light, and may convert a traveling-direction-angle ($\theta_H$, $\theta_V$) of the light emitted from the light source 10A to be equal to a traveling-direction-angle of the parallel light, or to allow the traveling-direction-angle ($\theta_H$, $\theta_V$) of the light emitted from the light source 10A to be approximate to the traveling-direction-angle of the parallel light. The coupling lens 20A is disposed at a position where light within the traveling-direction-angle of the light emitted from the light source 10A is incident. As illustrated in FIGS. 2A and 2B, the coupling lens 20B, for example, may turn the light emitted from the light source 10B into substantially parallel light, and may convert a traveling-direction-angle ($\theta_H$, $\theta_V$) of the light emitted from the light source 10B to be equal to a traveling-direction-angle of the parallel light, or to allow the traveling-direction-angle ($\theta_H$, $\theta_V$) of the light emitted from the light source 10B to be approximate to the traveling-direction-angle of the parallel light. The coupling lens 20B is disposed at a position where light within the traveling-direction-angle of the light emitted from the light source 10B is incident. The coupling lens 20C, for example, may turn the light emitted from the light source 10C into substantially parallel light, and may convert a traveling-direction-angle ($\theta_H$, $\theta_V$) of the light emitted from the light source 10C to be equal to a traveling-direction-angle of the parallel light, or to allow the traveling-direction-angle ($\theta_H$, $\theta_V$) of the light emitted from the light source 10C to be approximate to the traveling-direction-angle of the parallel light, as illustrated in FIGS. 2A and 2B. The coupling lens 20C is disposed at a position where light within the traveling-direction-angle of the light emitted from the light source 10C is incident. In other words, the coupling lenses 20A, 20B, and 20C are arranged for the light sources 10A, 10B, and 10C, respectively, in a one by one fashion (i.e., arranged for the packages, respectively). It is to be noted that each of the coupling lenses 20A, 20B, and 20C may include a single lens, or may include a plurality of lenses.

Each of the dichroic mirrors 30A and 30B may include one mirror having a wavelength selective property. This mirror may be configured by, for example, depositing plural layers of interference films. As illustrated in FIGS. 2A and 2B, the dichroic mirror 30A may allow light incident from a back surface of the mirror (the light entered from the light source 10A) to transmit toward a front surface of the mirror, and may allow light incident from the front surface of the mirror (the light entered from the light source 10B) to be reflected from the mirror, for example. On the other hand, as illustrated in FIGS. 2A and 2B, the dichroic mirror 30B may allow light incident from a back surface of the mirror (the light of each of the light sources 10A and 10B entered from the dichroic mirror 30A) to transmit toward a front surface of the mirror, and may allow light incident from the front surface of the mirror (the light entered from the light source 10C) to be reflected from the mirror, for example. Thus, the optical path unifying device 30 unifies each individual light flux emitted from the light sources 10A, 10B, and 10C into a single light flux.

Referring to FIGS. 13A and 13B, each of the fly-eye lens 40A and the fly-eye lens 40B is configured by a plurality of lenses (for example, cells) arranged in a predetermined array state (in one embodiment, in a form of a matrix having five rows and five columns). In other words, the cells in each of the fly-eye lenses 40A and 40B are arranged along each direction (array directions) of the horizontal direction (for example, the x-axis direction or a first direction) and the vertical direction (for example, the y-axis direction or a second direction) which intersect (or are orthogonal to) each other. The plurality of cells 42 included in the fly-eye lens 40B are disposed to face, in one-by-one fashion, the plurality of cells 41 included in the fly-eye lens 40B. The fly-eye lens 40A (for example, a first fly-eye lens) is disposed at a focal position (or disposed in the focal position substantially) of the fly-eye lens 40B, and the fly-eye lens 40B (for example, a second fly-eye lens) is disposed at a focal position (or disposed in the focal position substantially) of the fly-eye lens 40A. Thus, the integrator 40 allows the light fluxes divided and formed in the fly-eye lens 40A to be focused on locations near a lens face of the fly-eye lens 10B on an image side thereof, and forms a secondary light source face (a light source image) thereat. This secondary light source face is located at a position of a face which is conjugate with an entrance pupil of the projection optical system 70. However, it is not necessary for the secondary light source face to be located strictly at the position of the face conjugate with the entrance pupil of the projection optical system 70. The secondary light source face may be located at a position within an allowable range of design. Also, the fly-eye lens 40A and the fly-eye lens 40B may be formed integrally (for example, may be an integrated member).

In general, a light flux exited from each of light sources 10A, 10B, and 10C has an intensity distribution (for example, a luminance distribution) which is non-uniform in a plane perpendicular to a direction of travel thereof. Thus, an illuminance distribution (for example, a luminance distribution) in the illumination region 60A (the irradiated surface) is non-uniform when those light fluxes are directed as they are to the illumination region 60A. However, dividing each of the light fluxes exited from the light sources 10A, 10B, and 10C into the plurality of light fluxes with the integrator 40 as described above and guiding those thus-divided plurality of light fluxes in a superimposed fashion to the illumination region 60A allow the illuminance distribution on the illumination region 60A to be uniform (for example, make it possible to reduce non-uniformity of the illuminance distribution).

The condenser lens 50 condenses the light fluxes, derived from multiple light sources (such as the light sources 10A, 10B, and 10C) and generated by the integrator 40, to illuminate in a superimposed fashion the illumination region 60A.

The spatial modulation device 60 two-dimensionally modulates, based on a color image signal corresponding to a wavelength component of each of the light sources 10A, 10B, and 10C, the light flux derived from the illumination optical system 1A, to thereby generate the image light. As illustrated in FIGS. 2A and 2B, the spatial modulation device 60 in one embodiment may be a device of a transmission type, and may be configured by a transmissive liquid crystal panel, for example.

[Detailed Configuration of Projector 1]

A detailed configuration of the projector 1 according to the first embodiment will be described.

[First Part]

In the first embodiment, at least one of the chips 11A in the light sources 10A, 10B, and 10C as a whole is configured by the LD (such as a semiconductor laser, for example). Hence, as illustrated in FIG. 14, a laser beam emitted from the light-emitting spots 11B of the chip 11A configured such as by the LD, shows a luminance distribution shape in which a far-field pattern (FFP) is sharp, for example. In other words, a shape of the FFP in the laser beam is anisotropic (for example, oval in one embodiment) rather than circle (for example, isotropic), as denoted by P10 in FIG. 14.

Figure 15A:
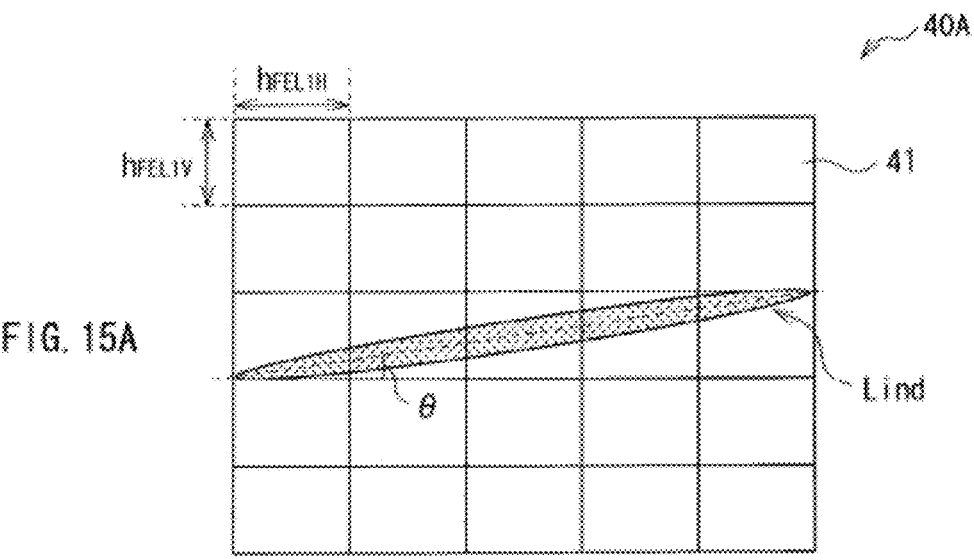
FIGS. 15A and 15B each schematically illustrate a luminance distribution of incident light that enters the upstream fly-eye lens in FIGS. 1A and 1B.
Figure 15B:
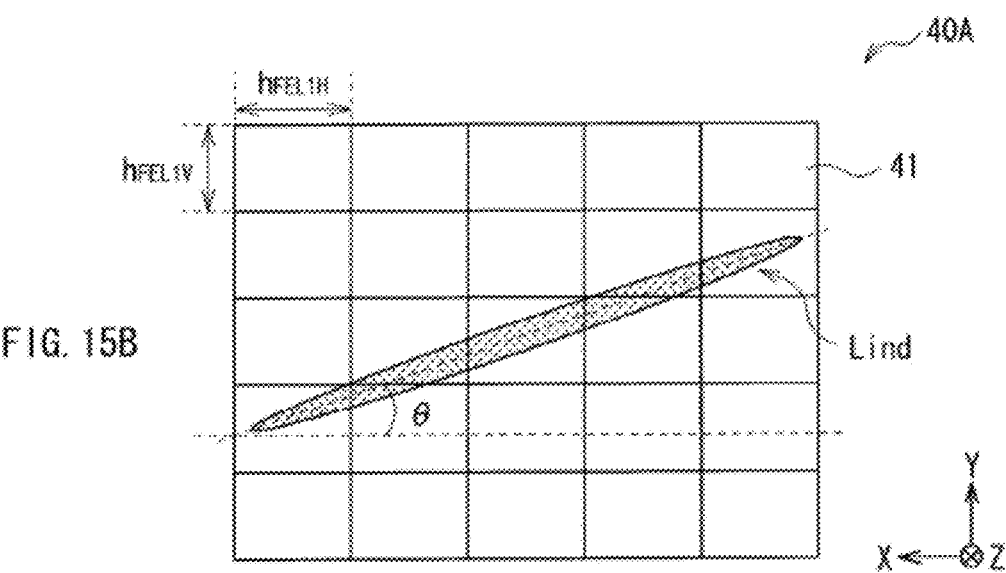
Figure 21A:
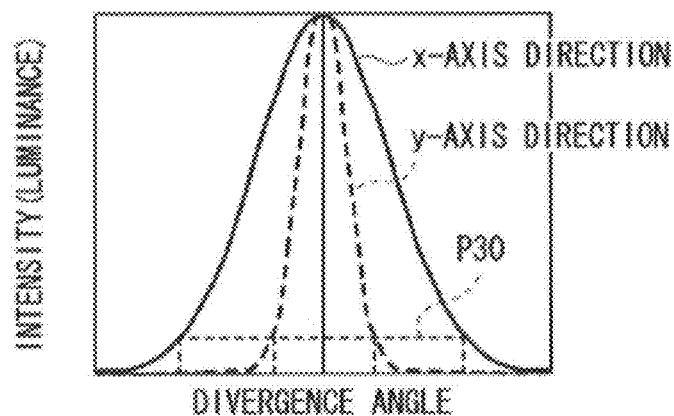
FIGS. 21A and 21B are characteristic diagrams for describing a detail of the luminance distribution illustrated in FIG. 20.
Figure 21B:
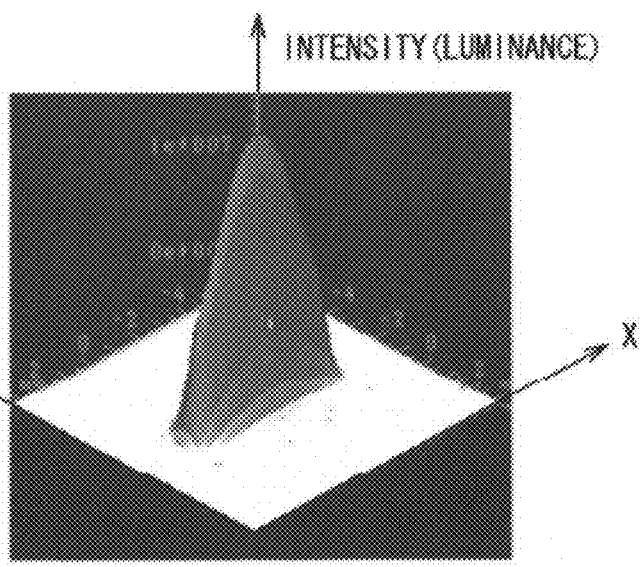

Further, in the first embodiment, a major axis direction of a shape of a luminance distribution "Lind" (the luminance distribution shape) of the incidence light in an incidence face (a light incidence face) of the fly-eye lens 40A differs from the array direction of the respective cells 41 in the fly-eye lens 40A, as illustrated in FIGS. 15A and 15B, for example. More specifically, the major axis direction and a minor axis direction of the luminance distribution "Lind" in the incidence light differ from both the array directions (for example, the horizontal direction (the x-axis direction) and the vertical direction (the y-axis direction)) of the respective cells 41. In other words, as illustrated in FIGS. 15A and 15B, the major axis direction in the luminance distribution "Lind" and the array directions of the respective cells 41 (here, the x-axis direction of the array directions, for example) do not coincide with each other, and form a predetermined angle θ (such as an inclination angle and a rotation angle, for example) relative to each other. As will be described later in detail, this thereby makes it easier to reduce a luminance non-uniformity of the incidence light in the integrator 40. Also, it is preferable that the angle θ be an angle by which a length (a pitch) in the horizontal direction as a whole of the fly-eye lens 40A coincides substantially (or preferably coincides) with a size $h_{FEL1V}$ of the cells in the vertical direction. That is, it is preferable that a relational expression as follows be satisfied for the angle θ. One reason is that this thereby makes it easier to reduce the luminance non-uniformity of the incidence light in the integrator 40, as will be described later in detail. Note that the shape of the luminance distribution "Lind" (the luminance distribution shape) of the incidence light described above with reference to FIGS. 15A and 15B, etc. refers to a shape of a contour line (an isoluminance line) that shows a predetermined intensity value (a luminance value), as will be described later in detail with reference to FIGS. 21A and 21B, which applies to the description given in the following as well.

$$\theta = \tan^{-1}[h_{FEL1V}/(h_{FEL1H} \times n_H)]$$

where $h_{FEL1H}$: a size in the first direction of the single cell 41 in the fly-eye lens 40A.

$h_{FEL1V}$: a size in the second direction of the single cell 41 in the fly-eye lens 40A.

$n_H$: the number of cells 41 along the first direction in the fly-eye lens 40A.

In one embodiment, an inclined arrangement (a rotated arrangement) between the major axis direction of the luminance distribution "Lind" and the array directions of the respective cells 41 described above may be achieved by an inclined arrangement (a rotated arrangement) of such as the light sources 10A, 10B, and 10C. In other words, in one embodiment, the inclination (or the rotation) between the major axis direction of the luminance distribution "Lind" and the array directions of the respective cells 41 may be achieved by rotating the chip 11A configured by the LD itself, by rotating such as the solid-state light-emitting device 11 (which includes the chip 11A configured by the LD) and the light sources 10A, 10B, and 10C. More specifically, in these cases, the chip 11A configured by the LD is so arranged to be inclined or rotated as to allow the major axis direction (and the minor axis direction) of the FFP in the laser beam emitted from the light-emitting spot 11B of the chip 11A configured by the LD differs from both the horizontal and the vertical directions (for example, the first and the second directions) of the fly-eye lens 40A. This is, however, not limitative, and other optical member (such as the coupling lenses 20A, 20B and 20C and the dichroic mirrors 30A and 30B, for example) in the illumination optical system 1A may be inclined or rotated to achieve the inclined arrangement (the rotated arrangement) between the major axis direction of the luminance distribution "Lind" and the array directions of the respective cells 41.

[Second Part]

Also, in the first embodiment, it is preferable that a configuration as follows be employed when a plurality of the light-emitting spots 11B are provided in the chip 11A configured by the LD in at least one (a first light source) of the light sources 10A, 10B, and 10C. That is, first, it is preferable that each of the minor axis directions of the FFPs in light beams emitted from the respective light-emitting spots 11B coincide substantially (or preferably coincide) with a minor axis direction (here, in the y-axis direction, for example) in a plane (here, in an x-y plane, for example) which intersects (or is orthogonal to) an optical axis (here, in the z-axis direction) of the optical member described above (here, the integrator 40, for example). In other words, it is preferable that, in the first light source described above, each of the minor axis directions of the FFPs in the light beams emitted from the respective light-emitting spots 11B coincide substantially (or preferably coincide) with a minor axis direction of an outer shape of the projector 1 (for example, a housing which may be rectangular in shape). Also, in one embodiment where the first light source described above is the light source that emits the light beams having two or more wavelength bands different from one another, it is preferable that each of the major axis directions of the FFPs in light beams emitted from the respective light-emitting spots 11B coincide substantially (or preferably coincide) with one another between those two or more wavelength bands.

More specifically, in one embodiment illustrated in FIG. 17A, two chips 11A-1 and 11A-2 each including the LD are provided in the first light source described above, and light-emitting spots (near field pattern: NFP) 11B-1 and 11B-2 each including an active layer 110 are provided accordingly. On the other hand, in one embodiment illustrated in FIG. 17B (an embodiment of the monolithic structure described before), the single chip 11A including the LD is provided in the first light source described above, and the two light-emitting spots 11B-1 and 11B-2 are provided in that chip 11A. Further, the light-emitting spots 11B-1 and 11B-2 here emit the light beams having the same wavelength band or having two wavelength bands different from one another. Each of the minor axis directions (here, in the y-axis direction, for example) of the FFPs (denoted by P11 and P12 in FIG. 17A) in the light beams emitted from the respective light-emitting spots 11B-1 and 11B-2 in this case coincide substantially (or preferably coincide) with the minor axis direction (here, in the y-axis direction, for example) in the plane which intersects (or orthogonal to) the optical axis of the integrator 40. Also, each of the major axis directions (here, in the x-axis direction, for example) of the FFPs in the light beams emitted from the respective light-emitting spots 11B-1 and 11B-2 coincide substantially (or preferably coincide) with one another between those light-emitting spots 11B-1 and 11B-2.

[Third Part]

Figure 18:
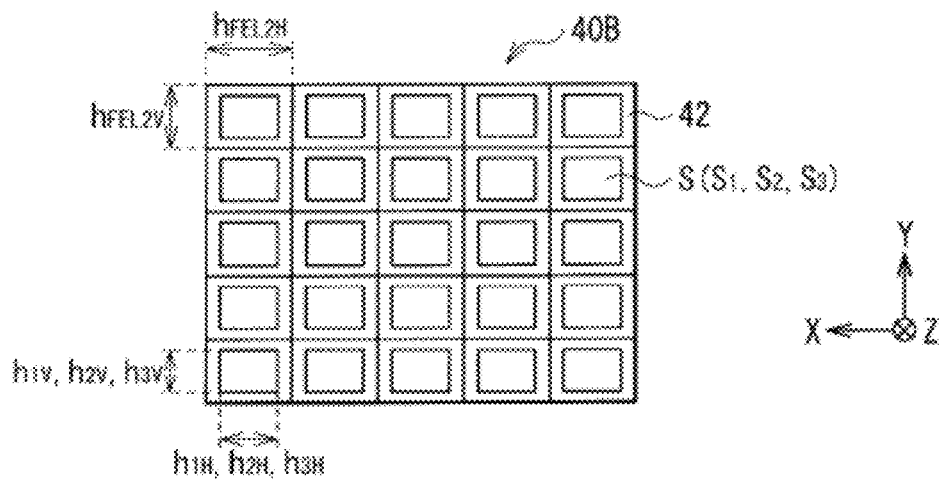
FIG. 18 schematically illustrates an example of a light source image that appears on the downstream fly-eye lens in the projector in FIGS. 1A and 1B.

Moreover, in the first embodiment, it is preferable that focal distances of the coupling lenses 20A, 20B, and 20C as well as focal distances of the fly-eye lenses 40A and 40B be so set as to allow each of the light source images S, formed on the fly-eye lens 40B by the respective cells 41 of the fly-eye lens 40A, to have a size not exceeding a size of the single cell 42 in the fly-eye lens 40B, which may be expressed by the following expressions (1) to (3). Also, the expressions (1) to (3) may be schematically depicted as illustrated in FIG. 18. FIG. 18 illustrates one embodiment where each of the cells in the fly-eye lenses 40A and 40B has a lateral-vertical length ratio (an aspect ratio) other than 1 (one). Description with reference to FIG. 18 will be given in detail later.

$$h_1 = P_1 \times (f_{FEL}/f_{CL1}) \leq h_{FEL2} \quad (1)$$

$$h_2 = P_2 \times (f_{FEL}/f_{CL2}) \leq h_{FEL2} \quad (2)$$

$$h_3 = P_3 \times (f_{FEL}/f_{CL3}) \leq h_{FEL2} \quad (3)$$

where $h_1$: a size of the light source image S (a light source image $S_1$) formed by the light of the light source 10A.
$h_2$: a size of the light source image S (a light source image $S_2$) formed by the light of the light source 10B.
$h_3$: a size of the light source image S (a light source image $S_3$) formed by the light of the light source 10C.
$P_1$: a size of the light emission region of the solid-state light-emitting device 11 included in the light source 10A.
$P_2$: a size of the light emission region of the solid-state light-emitting device 11 included in the light source 10B.
$P_3$: a size of the light emission region of the solid-state light-emitting device 11 included in the light source 10C.
$f_{FEL}$: a focal distance of the fly-eye lenses 40A and 40B.
$f_{CL1}$: a focal distance of the coupling lens 20A.
$f_{CL2}$: a focal distance of the coupling lens 20B.
$f_{CL3}$: a focal distance of the coupling lens 20C.
$h_{FEL2}$: a size of the single cell 42 of the fly-eye lens 40B.

In one embodiment where the solid-state light-emitting device 11 included in the light source 10A includes the single chip 11A, $P_1$ is equal to the size of the light-emitting spot 11B of that chip 11A. Likewise, in one embodiment where the solid-state light-emitting device 11 included in the light source 10B includes the single chip 11A, $P_2$ is equal to the size of the light-emitting spot 11B of that chip 11A, and in one embodiment where the solid-state light-emitting device 11 included in the light source 10C includes the single chip 11A, $P_3$ is equal to the size of the light-emitting spot 11B of that chip 11A. Also, in one embodiment where the solid-state light-emitting device 11 included in the light source 10A includes the plurality of chips 11A, $P_1$ is equal to the size of an enclosure when the light-emitting spots 11B of all the chips 11A are enclosed with minimum area. Likewise, in one embodiment where the solid-state light-emitting device 11 included in the light source 10B includes the plurality of chips 11A, $P_2$ is equal to the size of an enclosure when the light-emitting spots 11B of all the chips 11A are enclosed with minimum area, and in one embodiment where the solid-state light-emitting device 11 included in the light source 10C includes the plurality of chips 11A, $P_3$ is equal to the size of an enclosure when the light-emitting spots 11B of all of the chips 11A are enclosed with minimum area. Further, in one embodiment where the coupling lens 20A includes a plurality of lenses, $f_{CL1}$ is a unified focal distance of each of the lenses. Likewise, in one embodiment where the coupling lens 20B includes a plurality of lenses, $f_{CL2}$ is a unified focal distance of each of the lens, and in one embodiment where the coupling lens 20C includes a plurality of lenses, $f_{CL3}$ is a unified focal distance of each of the lenses.

The following expressions (4) to (6) are those that are roughly equivalent to the expressions (1) to (3) described above. These expressions (4) to (6) are useful especially when a size of the light emission region of the solid-state light-emitting device 11 is about the same as the size of the solid-state light-emitting device 11.

$$h_1 = W_1 \times (f_{FEL}/f_{CL1}) \leq h_{FEL2} \quad (4)$$

$$h_2 = W_2 \times (f_{FEL}/f_{CL2}) \leq h_{FEL2} \quad (5)$$

$$h_3 = W_3 \times (f_{FEL}/f_{CL3}) \leq h_{FEL2} \quad (6)$$

where
$W_1$: a size of the solid-state light-emitting device 11 included in the light source 10A.
$W_2$: a size of the solid-state light-emitting device 11 included in the light source 10B.
$W_3$: a size of the solid-state light-emitting device 11 included in the light source 10C.

In one embodiment where the solid-state light-emitting device 11 includes the single chip 11A, W is equal to the size of that chip 11A. In one embodiment where the solid-state light-emitting device 11 includes the plurality of chips 11A, W is, when all of the chips 11A are regarded as the single chip, equal to the size of that chip.

In the first embodiment, when each of the cells 41 and 42 in the fly-eye lenses 40A and 40B has the lateral-vertical length ratio (an aspect ratio) other than 1 (one) as illustrated in FIGS. 13A and 13B, it is preferable that the focal distances of the coupling lenses 20A, 20B, and 20C as well as the focal distances of the fly-eye lenses 40A and 40B satisfy the following six relational expressions (7) to (12). It is further preferable that ratios of vertical and horizontal focal distances (an anamorphic ratio) in the coupling lenses 20A, 20B, and 20C ($f_{CL1H}/f_{CL1V}$, $f_{CL2H}/f_{CL2V}$, and $f_{CL3H}/f_{CL3V}$) be each equal to the reciprocal of the aspect ratio of the size of each of the cells 42 in the fly-eye lens 40B ($h_{FEL2V}/h_{FEL2H}$), and that the illumination optical system 1A be an anamorphic optical system. In one embodiment where each of the cells 42 in the fly-eye lens 40B has a shape elongated in the first direction (for example, the horizontal direction), those of which the focal distances $f_{CL1V}$, $f_{CL2V}$, and $f_{CL3V}$ are longer than the focal distances $f_{CL1H}$, $f_{CL2H}$, and $f_{CL3H}$ are used as the coupling lenses 20A, 20B, and 20C. The following expressions (7) to (12) may be schematically depicted as illustrated in FIG. 18.

$$h_{1V} = P_{1H} \times (f_{FELH}/f_{CL1H}) \leq h_{FEL2H} \quad (7)$$

$$h_{2H} = P_{2H} \times (f_{FELH}/f_{CL2H}) \leq h_{FEL2H} \quad (8)$$

$$h_{3H} = P_{3H} \times (f_{FELH}/f_{CL3H}) \leq h_{FEL2H} \quad (9)$$

$$h_{1V} = P_{1V} \times (f_{FELV}/f_{CL1V}) \leq h_{FEL2V} \quad (10)$$

$$h_{2V} = P_{2V} \times (f_{FELV}/f_{CL2V}) \leq h_{FEL2V} \quad (11)$$

$$h_{3V} = P_{3V} \times (f_{FELV}/f_{CL3V}) \leq h_{FEL2V} \quad (12)$$

where
$h_{1H}$: a size in the first direction (for example, the horizontal direction) of the light source image S (a light source image $S_1$) formed by the light of the light source 10A.
$h_{2H}$: a size in the first direction (for example, the horizontal direction) of the light source image S (a light source image $S_2$) formed by the light of the light source 10B.
$h_{3H}$: a size in the first direction (for example, the horizontal direction) of the light source image S (a light source image $S_3$) formed by the light of the light source 10C.
$h_{1V}$: a size in the second direction (for example, the vertical direction) orthogonal to the first direction of the light source image S (the light source image $S_1$) formed by the light of the light source 10A.
$h_{2V}$: a size in the second direction (for example, the vertical direction) orthogonal to the first direction of the light source image S (the light source image $S_2$) formed by the light of the light source 10B.
$h_{3V}$: a size in the second direction (for example, the vertical direction) orthogonal to the first direction of the light source image S (the light source image $S_3$) formed by the light of the light source 10C.
$P_{1H}$: a size in the first direction or in a direction corresponding to the first direction of the light emission region of the solid-state light-emitting device 11 included in the light source 10A.
$P_{2H}$: a size in the first direction or in a direction corresponding to the first direction of the light emission region of the solid-state light-emitting device 11 included in the light source 10B.
$P_{3H}$: a size in the first direction or in a direction corresponding to the first direction of the light emission region of the solid-state light-emitting device 11 included in the light source 10C.
$P_{1V}$: a size in the second direction or in a direction corresponding to the second direction of the light emission region of the solid-state light-emitting device 11 included in the light source 10A.
$P_{2V}$: a size in the second direction or in a direction corresponding to the second direction of the light emission region of the solid-state light-emitting device 11 included in the light source 10B.
$P_{3V}$: a size in the second direction or in a direction corresponding to the second direction of the light emission region of the solid-state light-emitting device 11 included in the light source 10C.
$f_{FELH}$: a focal distance in the first direction of the fly-eye lenses 40A and 40B.
$f_{FELV}$: a focal distance in the second direction of the fly-eye lenses 40A and 40B.
$f_{CL1H}$: a focal distance in the first direction or in a direction corresponding to the first direction of the coupling lens 20A.
$f_{CL2H}$: a focal distance in the first direction or in a direction corresponding to the first direction of the coupling lens 20B.
$f_{CL3H}$: a focal distance in the first direction or in a direction corresponding to the first direction of the coupling lens 20C.
$f_{CL1V}$: a focal distance in the second direction or in a direction corresponding to the second direction of the coupling lens 20A.
$f_{CL2V}$: a focal distance in the second direction or in a direction corresponding to the second direction of the coupling lens 20B.
$f_{CL3V}$: a focal distance in the second direction or in a direction corresponding to the second direction of the coupling lens 20C.
$h_{FEL2H}$: a size in the first direction of the single cell 42 of the fly-eye lens 40B.

$h_{FEL2V}$: a size in the second direction of the single cell 42 of the fly-eye lens 40B.

As used herein, the wording "in the first direction or in a direction corresponding to the first direction" refers to the first direction when the light sources 10A, 10B, and 10C and the coupling lenses 20A, 20B, and 20C are arranged on the optical axis of the integrator 40. Also, the wording "in the first direction or in a direction corresponding to the first direction" refers to a direction corresponding to the first direction in relation to a layout of optical devices arranged on the optical path from the light sources 10A, 10B, and 10C up to the integrator 40 when the light sources 10A, 10B, and 10C and the coupling lenses 20A, 20B, and 20C are arranged on an optical path deviated from the optical axis of the integrator 40.

Further, as used herein, the wording "in the second direction or in a direction corresponding to the second direction" refers to the second direction when the light sources 10A, 10B, and 10C and the coupling lenses 20A, 20B, and 20C are arranged on the optical axis of the integrator 40. Also, the wording "in the second direction or in a direction corresponding to the second direction" refers to a direction corresponding to the second direction in relation to a layout of optical devices arranged on the optical path from the light sources 10A, 10B, and 10C up to the integrator 40 when the light sources 10A, 10B, and 10C and the coupling lenses 20A, 20B, and 20C are arranged on the optical path deviated from the optical axis of the integrator 40.

In one embodiment where the solid-state light-emitting device 11 included in the light source 10A includes the single chip 11A, $P_{1H}$ is equal to the size of the light-emitting spot 11B of that chip 11A in the first direction or in the direction corresponding to the first direction. Likewise, in one embodiment where the solid-state light-emitting device 11 included in the light source 10B includes the single chip 11A, $P_{2H}$ is equal to the size of the light-emitting spot 11B of that chip 11A in the first direction or in the direction corresponding to the first direction, and in one embodiment where the solid-state light-emitting device 11 included in the light source 10C includes the single chip 11A, $P_{3H}$ is equal to the size of the light-emitting spot 11B of that chip 11A in the first direction or in the direction corresponding to the first direction. Also, in one embodiment where the solid-state light-emitting device 11 included in the light source 10A includes the plurality of chips 11A, $P_{1H}$ is equal to the size of an enclosure in the first direction or in the direction corresponding to the first direction when the light-emitting spots 11B of all of the chips 11A are enclosed with minimum area. Likewise, in one embodiment where the solid-state light-emitting device 11 included in the light source 10B includes the plurality of chips 11A, $P_{2H}$ is equal to the size of an enclosure in the first direction or in the direction corresponding to the first direction when the light-emitting spots 11B of all of the chips 11A are enclosed with minimum area, and in one embodiment where the solid-state light-emitting device 11 included in the light source 10C includes the plurality of chips 11A, $P_{3H}$ is equal to the size of an enclosure in the first direction or in the direction corresponding to the first direction when the light-emitting spots 11B of all of the chips 11A are enclosed with minimum area. On the other hand, in one embodiment where the solid-state light-emitting device 11 included in the light source 10A includes the single chip 11A, $P_{1V}$ is equal to the size of the light-emitting spot 11B of that chip 11A in the second direction or in the direction corresponding to the second direction. Likewise, in one embodiment where the solid-state light-emitting device 11 included in the light source 10B includes the single chip 11A, $P_{2V}$ is equal to the size of the light-emitting spot 11B of that chip 11A in the second direction or in the direction corresponding to the second direction, and in one embodiment where the solid-state light-emitting device 11 included in the light source 10C includes the single chip 11A, $P_{3V}$ is equal to the size of the light-emitting spot 11B of that chip 11A in the second direction or in the direction corresponding to the second direction. Also, in one embodiment where the solid-state light-emitting device 11 included in the light source 10A includes the plurality of chips 11A, $P_{1V}$ is equal to the size of an enclosure in the second direction or in the direction corresponding to the second direction when the light-emitting spots 11B of all of the chips 11A are enclosed with minimum area. Likewise, in one embodiment where the solid-state light-emitting device 11 included in the light source 10B includes the plurality of chips 11A, $P_{2V}$ is equal to the size of an enclosure in the second direction or in the direction corresponding to the second direction when the light-emitting spots 11B of all of the chips 11A are enclosed with minimum area, and in one embodiment where the solid-state light-emitting device 11 included in the light source 10C includes the plurality of chips 11A, $P_{3V}$ is equal to the size of an enclosure in the second direction or in the direction corresponding to the second direction when the light-emitting spots 11B of all of the chips 11A are enclosed with minimum area.

Figure 19:
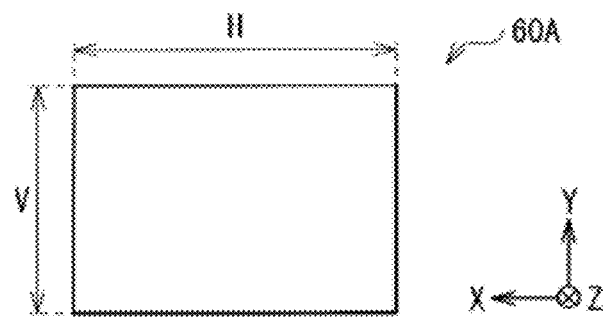
FIG. 19 is a schematic illustration for describing a size of an illumination region in FIGS. 1A and 1B.

Also, in the first embodiment, when each of the cells 41 and 42 in the fly-eye lenses 40A and 40B has the aspect ratio other than 1 (one), it is preferable that the aspect ratio of the size of each of the cells 41 of the fly-eye lens 40A and the aspect ratio of the illumination region 60A satisfy the following relational expression (13). Here, an aspect ratio H/V of the illumination region 60A (see FIG. 19) has a correlation with resolution of the spatial modulation device 60. For example, when the resolution of the spatial modulation device 60 is based on VGA (640×480), the aspect ratio is 640/480, and when the resolution of the spatial modulation device 60 is based on WVGA (800×480), the aspect ratio is 800/480.

$$h_{FEL1H}/h_{FEL1V}=H/V \tag{13}$$

where $h_{FEL1H}$: a size in the first direction of the single cell of the fly-eye lens 40A.

$h_{FEL1V}$: a size in the second direction of the single cell of the fly-eye lens 40A.

H: a size in the first direction of the illumination region 60A.

V: a size in the second direction of the illumination region 60A.

[Fourth Part]

In addition, in the first embodiment, it is preferable that the focal distances and numerical apertures of the coupling lenses 20A, 20B, and 20C be so set as to allow the light beams incident on the coupling lenses 20A, 20B, and 20C to have sizes (beam sizes) not exceeding the sizes of the coupling lenses 20A, 20B, and 20C, which may be expressed by the following expressions (14) to (16).

$$\phi_{CL1}=2\times f_{CL1}\times NA_1 \leq h_{CL1} \tag{14}$$

$$\phi_{CL2}=2\times f_{CL2}\times NA_2 \leq h_{CL2} \tag{15}$$

$$\phi_{CL3}=2\times f_{CL3}\times NA_3 \leq h_{CL3} \tag{16}$$

where $\phi_{CL1}$: a beam size of the light incident on the coupling lens 20A.

$\phi_{CL2}$: a beam size of the light incident on the coupling lens 20B.

$\phi_{CL3}$: a beam size of the light incident on the coupling lens 20C.

$NA_1$: a numerical aperture of the coupling lens 20A.
$NA_2$: a numerical aperture of the coupling lens 20B.
$NA_3$: a numerical aperture of the coupling lens 20C.
$h_{CL1}$: a size of the coupling lens 20A.
$h_{CL2}$: a size of the coupling lens 20B.
$h_{CL3}$: a size of the coupling lens 20C.

In the first embodiment, when each of the coupling lenses 20A, 20B, and 20C has the lateral-vertical length ratio (an aspect ratio) other than 1 (one), it is preferable that the focal distances and the numerical apertures of the coupling lenses 20A, 20B, and 20C satisfy the following relational expressions (17) to (22).

$$\phi_{CL1H} = 2 \times f_{CL1H} \times NA_{1H} \leq h_{CL1} \quad (17)$$

$$\phi_{CL2H} = 2 \times f_{CL2H} \times NA_{2H} \leq h_{CL2H} \quad (18)$$

$$\phi_{CL3H} = 2 \times f_{CL3H} \times NA_{3H} \leq h_{CL3H} \quad (19)$$

$$\phi_{CL1V} = 2 \times f_{CL1V} \times NA_{1V} \leq h_{CL1V} \quad (20)$$

$$\phi_{CL2V} = 2 \times f_{CL2V} \times NA_{2V} \leq h_{CL2V} \quad (21)$$

$$\phi_{CL3V} = 2 \times f_{CL3V} \times NA_{3V} \leq h_{CL3V} \quad (22)$$

where $\phi_{CL1H}$: a beam size in the first direction (for example, the horizontal direction) or a direction corresponding to the first direction of the light incident on the coupling lens 20A.

$\phi_{CL2H}$: a beam size in the first direction (for example, the horizontal direction) or a direction corresponding to the first direction of the light incident on the coupling lens 20B.

$\phi_{CL3H}$: a beam size in the first direction (for example, the horizontal direction) or a direction corresponding to the first direction of the light incident on the coupling lens 20C.

$\phi_{CL1V}$: a beam size in the second direction (for example, the vertical direction) or a direction corresponding to the second direction of the light incident on the coupling lens 20A.

$\phi_{CL2V}$: a beam size in the second direction (for example, the vertical direction) or a direction corresponding to the second direction of the light incident on the coupling lens 20B.

$\phi_{CL3V}$: a beam size in the second direction (for example, the vertical direction) or a direction corresponding to the second direction of the light incident on the coupling lens 20C.

$NA_{1H}$: a numerical aperture of the coupling lens 20A in the first direction or a direction corresponding to the first direction.

$NA_{2H}$: a numerical aperture of the coupling lens 20B in the first direction or a direction corresponding to the first direction.

$NA_{3H}$: a numerical aperture of the coupling lens 20C in the first direction or a direction corresponding to the first direction.

$NA_{1V}$: a numerical aperture of the coupling lens 20A in the second direction or a direction corresponding to the second direction.

$NA_{2V}$: a numerical aperture of the coupling lens 20B in the second direction or a direction corresponding to the second direction.

$NA_{3V}$: a numerical aperture of the coupling lens 20C in the second direction or a direction corresponding to the second direction.

$h_{CL1H}$: a size of the coupling lens 20A in the first direction or a direction corresponding to the first direction.

$h_{CL2H}$: a size of the coupling lens 20B in the first direction or a direction corresponding to the first direction.

$h_{CL3H}$: a size of the coupling lens 20C in the first direction or a direction corresponding to the first direction.

$h_{CL1V}$: a size of the coupling lens 20A in the second direction or a direction corresponding to the second direction.

$h_{CL2V}$: a size of the coupling lens 20B in the second direction or a direction corresponding to the second direction.

$h_{CL3V}$: a size of the coupling lens 20C in the second direction or a direction corresponding to the second direction.

[Function and Effect of Projector 1]

Functions and effects of the projector 1 according to the first embodiment will now be described.

In the first embodiment, at least one of the chips 11A in the light sources 10A, 10B, and 10C as a whole is configured by the laser diode (LD). Hence, as illustrated in FIG. 14, the laser beam emitted from the light-emitting spots 11B of the chip 11A configured such as by the LD shows the luminance distribution shape (for example, oval in one embodiment) in which the FFP is sharp (for example, anisotropic), for example.

Figure 16:
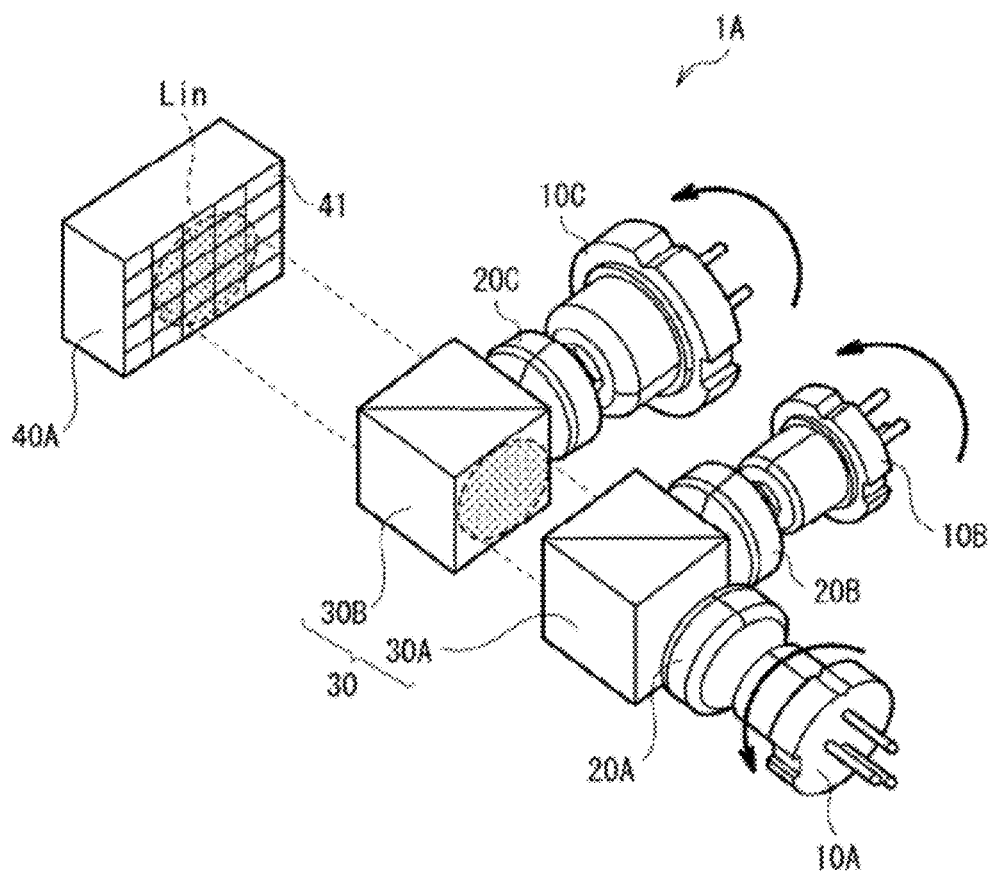
FIG. 16 is a perspective view illustrating a detailed configuration example of major parts of an illumination optical system in FIGS. 1A and 1B.

Also, in the first embodiment, the major axis direction of the shape of the luminance distribution "Lind" of the incidence light, in the light incidence face of the fly-eye lens 40A, differs from the array direction of the respective cells 41 in the fly-eye lens 40A, as illustrated in FIGS. 15A and 15B, for example. More specifically, the major axis direction and the minor axis direction of the luminance distribution "Lind" in the incidence light differ from both the array directions (for example, the horizontal direction (the x-axis direction) and the vertical direction (the y-axis direction)) of the respective cells 41. In this embodiment, the inclined arrangement (the rotated arrangement) between the major axis direction of the luminance distribution "Lind" and the array directions of the respective cells 41 described above is achieved by the inclined arrangement (the rotated arrangement) of such as the light sources 10A, 10B, and 10C as illustrated in FIG. 16, for example. More specifically, the chip 11A configured by the LD is so arranged to be inclined or rotated (i.e., the inclined arrangement or the rotated arrangement) as to allow the major axis direction (and the minor axis direction) of the FFP in the laser beam emitted from the light-emitting spot 11B of the chip 11A configured by the LD to be different from both the horizontal and the vertical directions of the fly-eye lens 40A.

Figure 20:
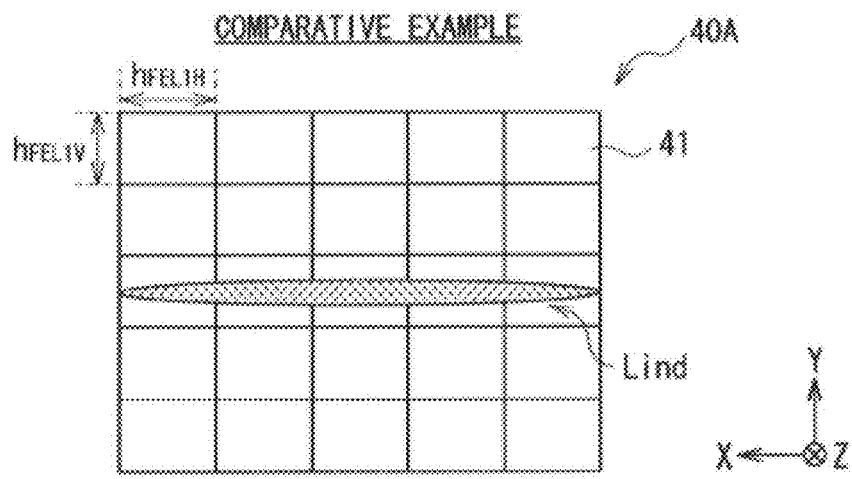
FIG. 20 schematically illustrates a luminance distribution of incident light that enters an upstream fly-eye lens in a projector according to a comparative example.

In contrast, in a projector according to a comparative example, a major axis direction of a shape of a luminance distribution "Lind" of incidence light in an incidence face of a fly-eye lens 40A coincides with an array direction (in this example, the horizontal direction (x-axis direction)) of respective cells 41 in the fly-eye lens 40A, as illustrated in FIG. 20, for example. In other words, unlike the first embodiment illustrated in FIGS. 15A and 15B, the major axis direction in the luminance distribution "Lind" and the array directions of the respective cells 41 (here, the x-axis direction of the array directions) do not form a predetermined angle θ relative to each other (i.e., establish a relation of θ=0 degrees). As used herein, the wording such as "the shape of the luminance distribution "Lind" (the luminance distribution shape) of the incidence light" described above with reference to FIGS. 15A and 15B and FIG. 20 etc. refers to a shape of a contour line (an isoluminance line) that shows a predetermined intensity value (a luminance value). More specifically, the shape of the luminance distribution "Lind" (the luminance distribution shape) is equivalent to a shape of the isoluminance line having the luminance value denoted by P30 in FIG. 21A, when the laser beam emitted from the light-emitting spot 11B of the chip 11A configured by the LD shows a sharp luminance distribution such as that illustrated in FIGS. 21A and 21B.

Figure 22:
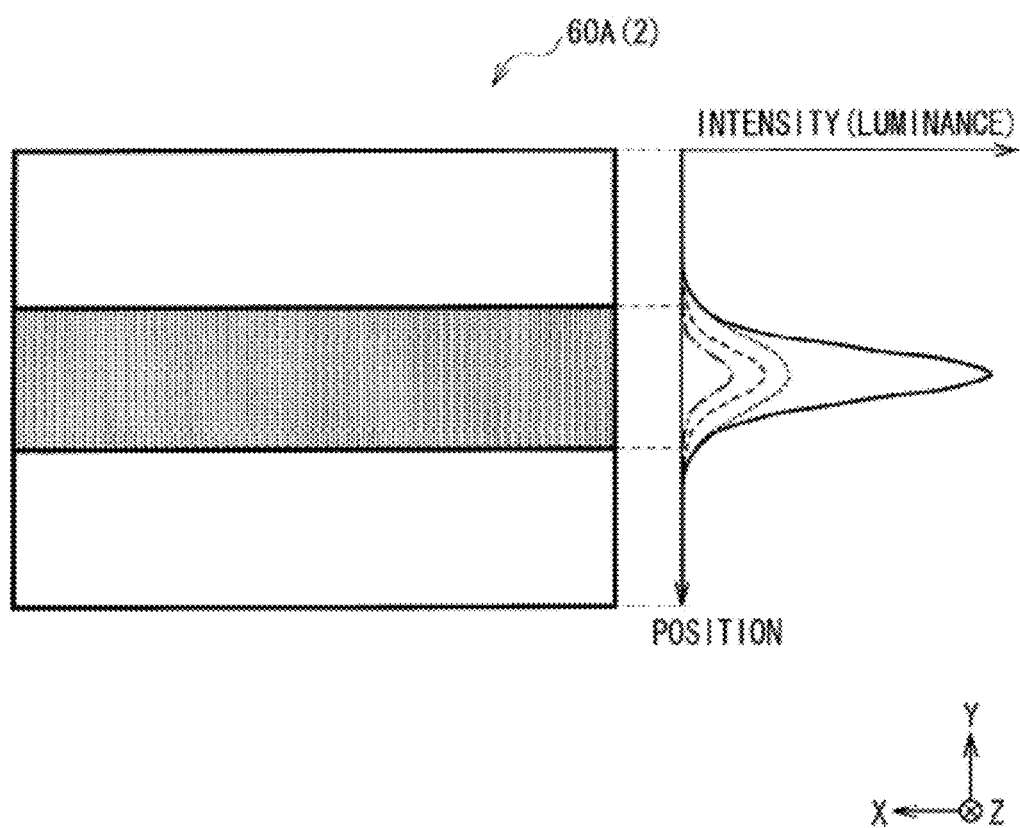
FIG. 22 illustrates an example of a luminance non-uniformity generated in the illumination optical system in the first embodiment.

The projector according to the comparative example described above may be disadvantageous as follows, due to the sharp luminance distribution shown by the laser beam emitted from the light-emitting spot 11B of the chip 11A configured by the LD (for example, due to the shape of the FFP not being a circle (isotropic) such as a shape of oval). For example, luminance non-uniformity of illumination light (for example, incidence light) may not be reduced enough (i.e., a luminance distribution fails to become uniform) even with a function of the integrator 40, when the laser beam shows overly sharp luminance distribution shape (for example, when the luminance distribution shape is sharper than the sizes of the respective cells 41 and 42 of the fly-eye lenses 40A and 40B). In this case, the luminance non-uniformity in the illumination light and picture light (display light) occurs on the illumination region 60A and on the screen 2 as illustrated in FIG. 22, thus leading to degradation of displaying quality.

In contrast, according to the first embodiment, the major axis direction of the shape of the luminance distribution "Lind" of the incidence light, in the light incidence face of the fly-eye lens 40A, differs from the array direction of the respective cells 41 in the fly-eye lens 40A as described above. This thereby makes it easier to reduce the luminance non-uniformity of the incidence light in the integrator 40, even when the laser beam emitted from the light-emitting spot 11B of the chip 11A configured such as by the LD shows the sharp luminance distribution (for example, even when the shape of the FFP is not a circle (isotropic) such as a shape of oval). More specifically, as a result of the effect by which the light beams in the plurality of cells 41 each including the shape of the luminance distribution "Lind" of the incidence light are overlapped (or superimposed) in the fly-eye lens 40A as illustrated in Part (A) of FIG. 23, the luminance non-uniformity in the illumination light and the display light is effectively reduced as illustrated in Part (B) of FIG. 23, for example. In other words, the luminance non-uniformity in the illumination light and the display light is reduced (for example, the generation of the luminance non-uniformity is avoided) as compared with the comparative example described above. Hence, the first embodiment makes it possible to improve the displaying quality.

In particular, the luminance non-uniformity in the illumination light and the display light is reduced further effectively when the angle θ between the major axis direction in the luminance distribution "Lind" of the incidence light and the array directions of the respective cells 41 (here, the x-axis direction of the array directions, for example) satisfies the relational expression: $\theta = \tan^{-1}[h_{FEL1V}/(h_{FEL1H} \times n_H)]$. One reason is that a repetition of an identical pattern of a luminance distribution is generated and thus the effect of reducing the luminance non-uniformity may not be shown to the utmost level, when the luminance distribution "Lind" of the incidence light strides the plurality of cells 41 along the vertical direction in the length (the pitch) in the horizontal direction as a whole of the fly-eye lens 40A.

Figures 23, 24:
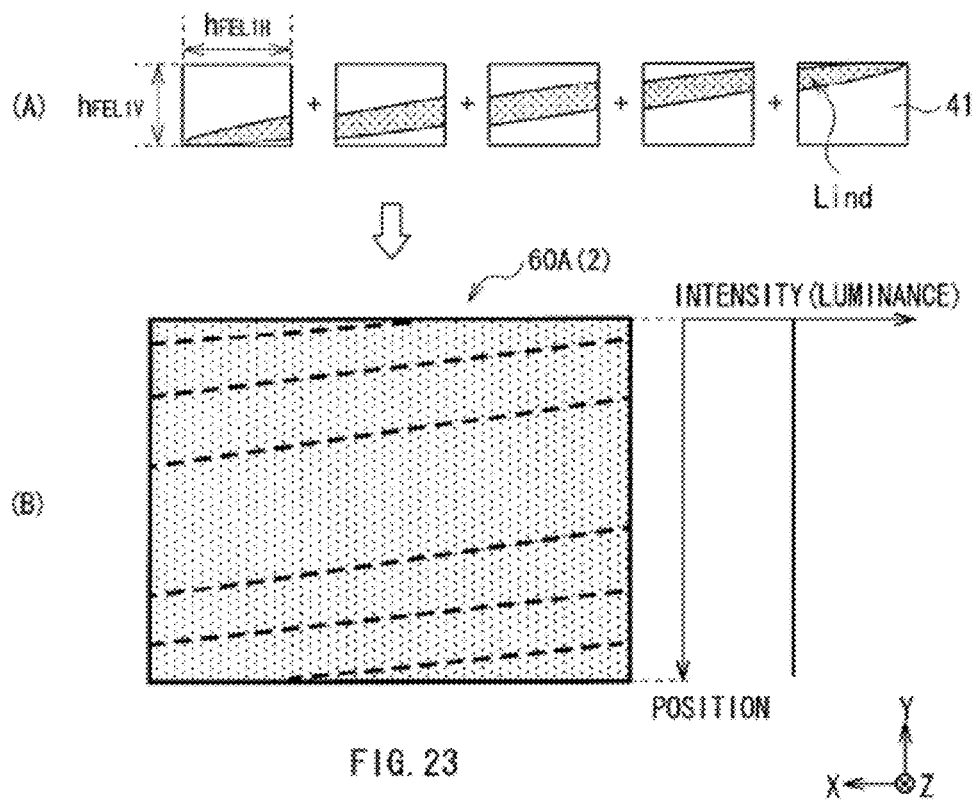
FIG. 23 describes a reduction effect of the luminance non-uniformity in the illumination optical system in the first embodiment.
FIG. 24 illustrates an example of characteristics in an Example according to the first embodiment.

FIG. 24 illustrates an example of various characteristics in Example according to the first embodiment, in which a relationship between the aspect ratio in the illumination region 60A and various parameters including $n_H$, $h_{FEL1H}$, $h_{FEL1V}$, and θ are represented. It can be seen from the Example that the effect of reducing the luminance non-uniformity in the integrator 40 is shown at the utmost level when the angle θ is about 2.7 degrees to about 7.1 degrees.

Also, in the first embodiment, functions and effects described below are achieved when the following configuration is employed in one embodiment where the plurality of light-emitting spots 11B are provided in the chip 11A configured by the LD in at least one (a first light source) of the light sources 10A, 10B, and 10C as illustrated in FIGS. 17A and 17B. That is, when each of the minor axis directions of the FFPs in the light beams emitted from the respective light-emitting spots 11B coincides substantially (or preferably coincides) with the minor axis direction in the plane which intersects (or orthogonal to) the optical axis of the integrator 40, each of the minor axis directions of the FFPs coincides substantially (or preferably coincides) with the minor axis direction of an outer shape of the projector 1, thus making it possible to reduce a size of the projector 1 as a whole. Also, when each of the major axis directions of the FFPs in light beams emitted from the respective light-emitting spots 11B is allowed to coincide substantially (or preferably coincide) with one another between the two or more wavelength bands in one embodiment where the first light source described above is the light source that emits the light beams having two or more wavelength bands different from one another, a loss of light is reduced such as when a lens cut into a shape of letter "I" (I-cut-shaped lens) is used. More specifically, although an optical effective range may be sacrificed in a portion subjected to "I-cut", the use of the I-cut-shaped lens makes it possible to reduce the loss of light by allowing a major axis direction of an emission angle of the LD to match with a direction to which the "I-cut" is performed (in a direction in which an effective diameter is wide).

Further, in the first embodiment, functions and effects described below are achieved when the focal distances $f_{CL1}$, $f_{CL2}$, and $f_{CL3}$ of the coupling lenses 20A, 20B, and 20C as well as the focal distances $f_{FEL}$ of the fly-eye lenses 40A and 40B are so set as to allow each of the light source images S, formed on the fly-eye lens 40B by the respective cells 41 of the fly-eye lens 40A, to have the size not exceeding the size of the single cell 42 in the fly-eye lens 40B. Namely, in this embodiment, the solid-state light-emitting device 11 emits the light from the light emission region that includes the single or the plurality of light-emitting spots in a shape of a dot or in a non-dot shape, and is configured by one or more light-emitting diodes (LED), one or more organic EL light-emitting devices (OLED), one or more laser diodes (LD), or one or more other suitable light emitting devices. Thus, even when the fly-eye lens 40B is arranged in the focal position of the fly-eye lens 40A, each of the light source images S formed on the fly-eye lens 40B by the respective cells of the fly-eye lens 40A is not in a shape of a dot but has a size to a certain degree (see FIG. 18). However, in the first embodiment, it is unlikely that the single light source image S is formed across the plurality of cells, thus allowing the light incident on the fly-eye lens 40B to reach the illumination region efficiently. Hence, it is possible to improve a light-use efficiency in the illumination optical system 1A.

Moreover, in the first embodiment, the light-use efficiency in the illumination optical system 1A further improves when, in one embodiment where each of the cells in the fly-eye lenses 40A and 40B has the aspect ratio other than 1 (one), the focal distances $f_{CL1H}$, $f_{CL2H}$, $f_{CL3H}$, $f_{CL1V}$, $f_{CL2V}$, and $f_{CL3V}$ of the coupling lenses 20A, 20B, and 20C and the focal distances $f_{FELH}$ and $f_{FELV}$ of the fly-eye lenses 40A and 40B are set in view of that aspect ratio. Also, in the first embodiment, the light-use efficiency in the illumination optical system 1A further improves when, in one embodiment where each of the coupling lenses 20A, 20B, and 20C has the aspect ratio other than 1 (one), the focal distances $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$, and $NA_{3V}$ of the coupling lenses 20A, 20B, and 20C are set in view of that aspect ratio. Further, in the first embodiment, the light-use efficiency in the illumination optical system 1A further improves when, in one embodiment where the traveling-direction-angles of the light sources 10A, 10B, and 10C are different from one another, the focal distances $f_{CL1H}$, $f_{CL2H}$, $f_{CL3H}$, $f_{CL1V}$, $f_{CL2V}$, and $f_{CL3V}$ and the numerical apertures $NA_{1H}$, $NA_{2H}$, $NA_{3H}$, $NA_{1V}$, $NA_{2V}$, and $NA_{3V}$ of the coupling lenses 20A, 20B, and 20C are set in view of those respective traveling-direction-angles.

Hereinafter, other embodiments (second to fifth embodiments) of the technology will be described. Note that the same or equivalent elements as those of the first embodiment described above are denoted with the same reference numerals, and will not be described in detail.

Second Embodiment

Figure 25:
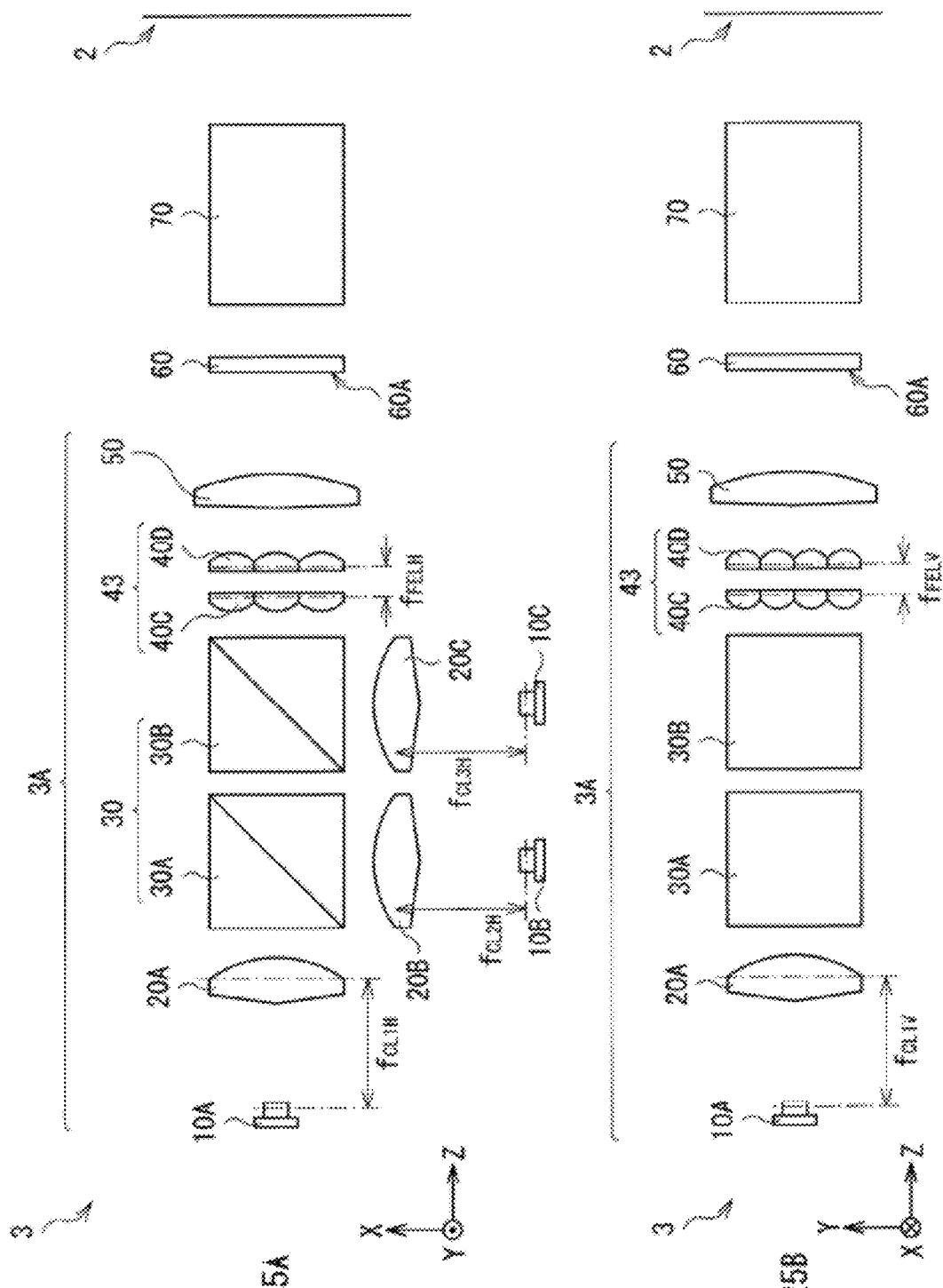
FIGS. 25A and 25B each illustrate a schematic configuration of a projector according to a second embodiment of the technology.

FIGS. 25A and 25B each illustrate a schematic configuration of a projector (a projector 3) according to the second embodiment of the technology. It is to be noted that the projector 3 corresponds to a concrete (but not limitative) example of the "projection display unit" in one embodiment of the technology. FIG. 25A illustrates a configuration example in which the projector 3 is viewed from above (in the y-axis direction), and FIG. 25B illustrates a configuration example in which the projector 3 is viewed from a lateral side (in the x-axis direction).

The projector 3 according to the second embodiment differs from the projector 1 provided with the illumination optical system 1A, in that a configuration of the projector 3 includes an illumination optical system 3A. In the following, description is given mainly on a difference between the projector 3 and the projector 1, and elements common to the projector 1 will not be described in detail. It is to be noted that the illumination optical system 3A corresponds to a concrete (but not limitative) example of the "illumination unit" in one embodiment of the technology.

[Configuration of Illumination Optical System 3A]

The illumination optical system 3A has a configuration in which an integrator 43 having a pair of fly-eye lenses 40C and 40D is provided in the illumination optical system 1A, instead of the pair of fly-eye lenses 40A and 40B. In other words, the illumination optical system 3A is provided with the fly-eye lenses 40C and 40D described below, in place of the fly-eye lenses 40A and 40B in the illumination optical system 1A. Note that the fly-eye lenses 40C and 40D have arrangements and configurations of the cells 41 and 42 that correspond to each other, respectively, so that description will be given here on the fly-eye lens 40C on behalf of those fly-eye lenses.

Figure 26:
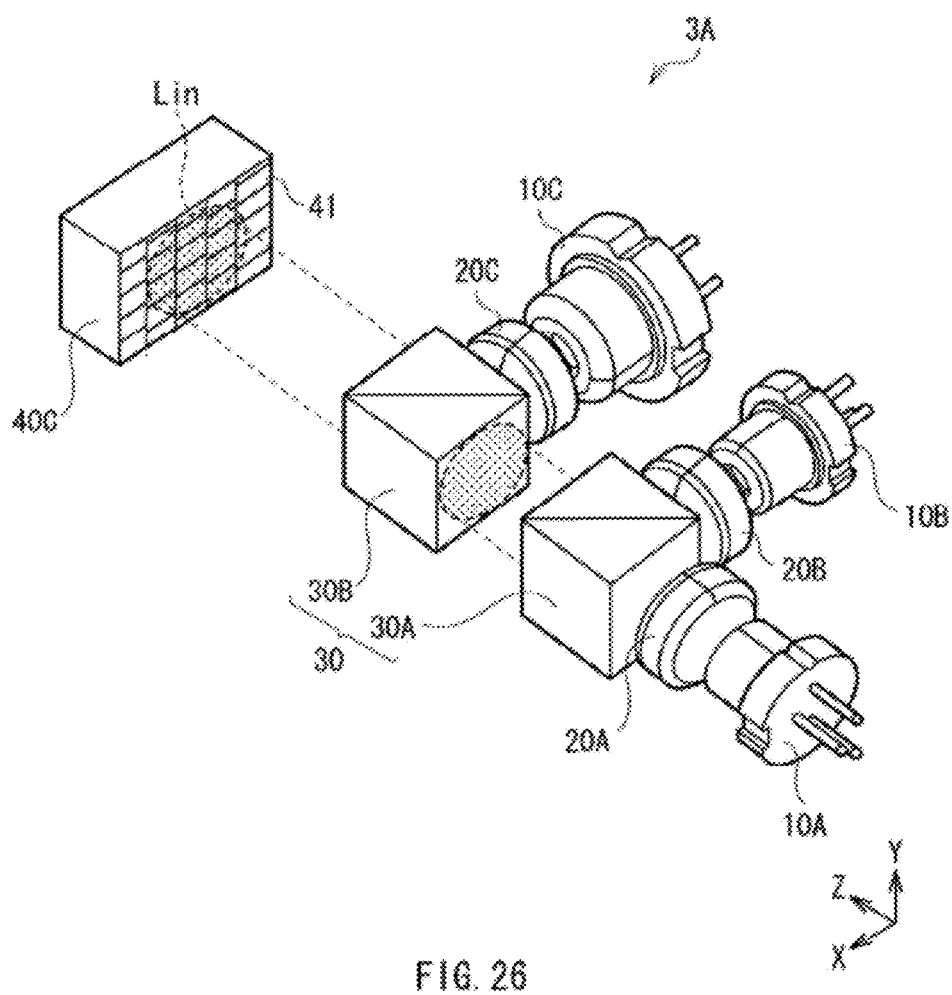
FIG. 26 is a perspective view illustrating a detailed configuration example of major parts of an illumination optical system in FIGS. 25A and 25B.

Also, unlike the illumination optical system 1A illustrated in FIG. 16, none of the light sources 10A, 10B, and 10C as well as other optical members in the illumination optical system 3A has the inclined arrangement (the rotated arrangement), as illustrated in FIG. 26, for example. Hence, in the illumination optical system 3A, the major axis direction of the luminance distribution "Lind" in the incidence light and the array directions of the respective cells 41 are not inclined nor are rotated with respect to each other so as to fail to achieve the inclined arrangement (the rotated arrangement) in the fly-eye lens 40C, unlike the illumination optical system 1A as illustrated in FIGS. 15A and 15B (i.e., as in the comparative example illustrated in FIG. 20).

It is to be noted, however, that positions of the respective cells 41 arranged along the vertical direction (for example, the y-axis direction or the "second direction") are different from one another at least partially among a plurality of cell rows arranged along the horizontal direction (for example, the x-axis direction or the "first direction"). In other words, the fly-eye lens 40C according to the second embodiment has a configuration (a misalignment structure) in which the positions of the cells 41 are shifted among the cell rows along the minor axis direction (for example, the vertical direction) intersecting (or orthogonal to) the major axis direction (for example, the horizontal direction) of the luminance distribution "Lind" in the incidence light. More specifically, in one embodiment illustrated in FIG. 27, the respective positions of the cells 41 along the horizontal direction are shifted respectively (a shift amount: d) in the same direction between the adjacent cell rows among the plurality of cell rows along the vertical direction. It is preferable here that a relational expression as follows be satisfied for the shift amount "d" between the adjacent cell rows.

$$d=(h_{FEL1V}/n_H)$$

where
$h_{FEL1V}$: a size in the second direction of the single cell 41 of the fly-eye lens 40C.
$n_H$: the number of cells 41 along the first direction in the fly-eye lens 40C (Cell Pcs.).

[Function and Effect of Projector 3]

Figure 28:
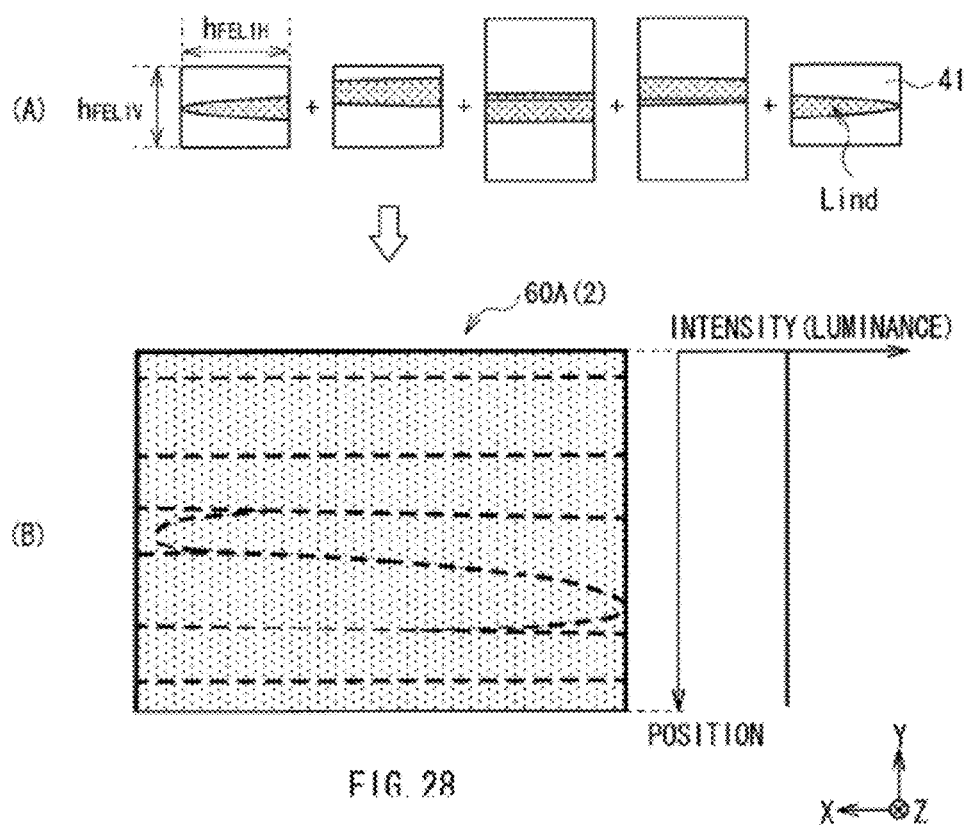
FIG. 28 describes a reduction effect of the luminance non-uniformity in the illumination optical system in the second embodiment.

The second embodiment having the configuration discussed above makes it easier to reduce the luminance non-uniformity of the incidence light in the integrator 43 even when the laser beam emitted from the light source including the chip 11A configured such as by the LD shows the sharp luminance distribution shape as in the first embodiment described above. More specifically, as a result of the effect by which the light beams in the plurality of cells 41 each including the shape of the luminance distribution "Lind" of the incidence light are overlapped (or superimposed) in the fly-eye lens 40C as illustrated in Part (A) of FIG. 28, the luminance non-uniformity in the illumination light and the display light is effectively reduced as illustrated in Part (B) of FIG. 28, for example. In other words, the luminance non-uniformity in the illumination light and the display light is also reduced in the second embodiment (for example, the generation of the luminance non-uniformity is avoided), making it possible to improve the displaying quality.

In particular, satisfying the relational expression: $d=(h_{FEL1V}/n_H)$ for the shift amount "d" between the adjacent cell rows described above makes it possible to reduce the luminance non-uniformity in the illumination light and the display light further effectively. One reason is that, as has been discussed in the first embodiment, a repetition of an identical pattern of a luminance distribution is generated and thus the effect of reducing the luminance non-uniformity may not be shown to the utmost level, when the luminance distribution "Lind" of the incidence light strides the plurality of cells 41 along the vertical direction in the length (the pitch) in the horizontal direction as a whole of the fly-eye lens 40C.

Figure 27:
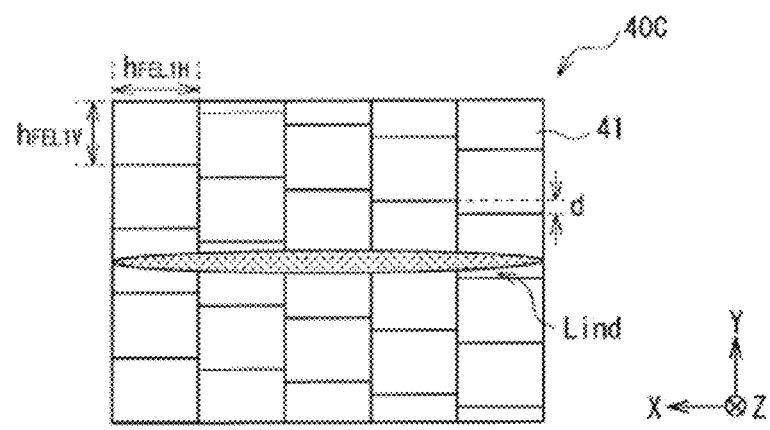
FIG. 27 schematically illustrates a detailed configuration example of an upstream fly-eye lens illustrated in FIG. 26.
Figures 29A, 29B, 29C, 29D:
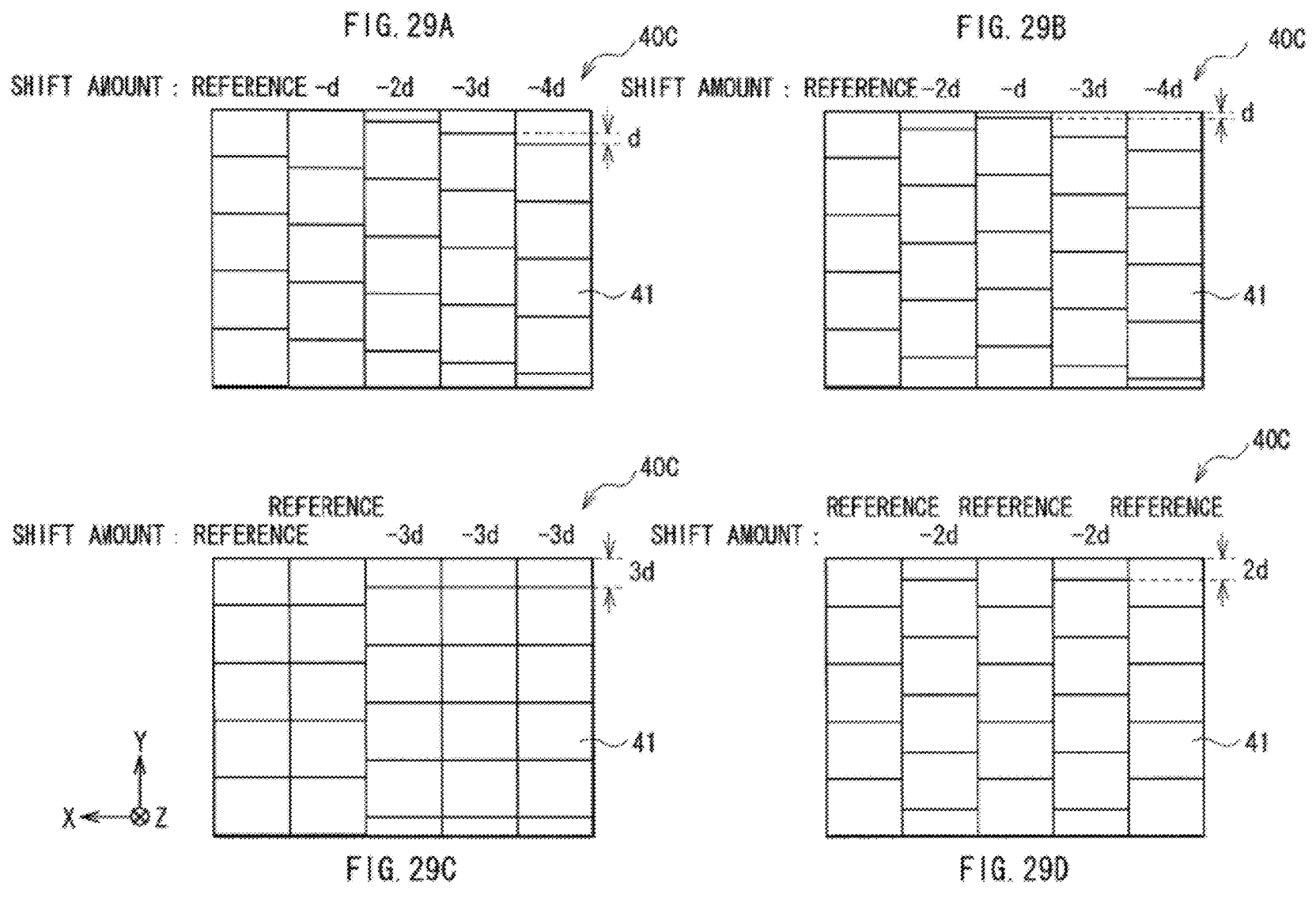

It is to be noted that the fly-eye lens 40C according to the second embodiment is not limited to the example where the respective positions of the cells 41 along the horizontal direction are shifted respectively in the same direction between the adjacent cell rows among the plurality of cell rows along the vertical direction, as illustrated in FIGS. 27 and 29A. The fly-eye lens 40C according to the present embodiment may employ other misalignment structures. In other words, any other misalignment structure may be employed as long as the positions of the respective cells 41 along the vertical direction are different from one another at least partially among the cell rows arranged along the horizontal direction. In one embodiment, the shift amount may be included in different directions (for example, in upward and downward directions) between the cell rows adjacent to each other in the horizontal direction as illustrated in FIG. 29B, for example. In an alternative embodiment, a region may be present in which the misalignment is not provided between the cell rows adjacent to each other in the horizontal direction as illustrated in FIG. 29C, for example. In a yet alternative embodiment, the positions of the cells 41 may be so staggered between the cell rows adjacent to each other in the horizontal direction as to establish a staggered misalignment structure (a zigzag misalignment structure), as illustrated in FIG. 29D, for example.

Third Embodiment

FIGS. 30A and 30B each illustrate a schematic configuration of a projector (a projector 4) according to the third embodiment of the technology. It is to be noted that the projector 4 corresponds to a concrete (but not limitative) example of the "projection display unit" in one embodiment of the technology. FIG. 30A illustrates a configuration example in which the projector 4 is viewed from above (in the y-axis direction), and FIG. 30B illustrates a configuration example in which the projector 4 is viewed from a lateral side (in the x-axis direction).

The projector 4 according to the third embodiment differs from the projector 1 provided with the illumination optical system 1A, in that a configuration of the projector 4 includes an illumination optical system 4A. In the following, description is given mainly on a difference between the projector 4 and the projector 1, and elements common to the projector 1 will not be described in detail. It is to be noted that the illumination optical system 4A corresponds to a concrete (but not limitative) example of the "illumination unit" in one embodiment of the technology.

[Configuration of Illumination Optical System 4A]

The illumination optical system 4A has a configuration in which, in the illumination optical system 1A, an anamorphic lens 91 described below is provided on an optical path between the optical path unifying device 30 and the integrator 40.

Figure 31:
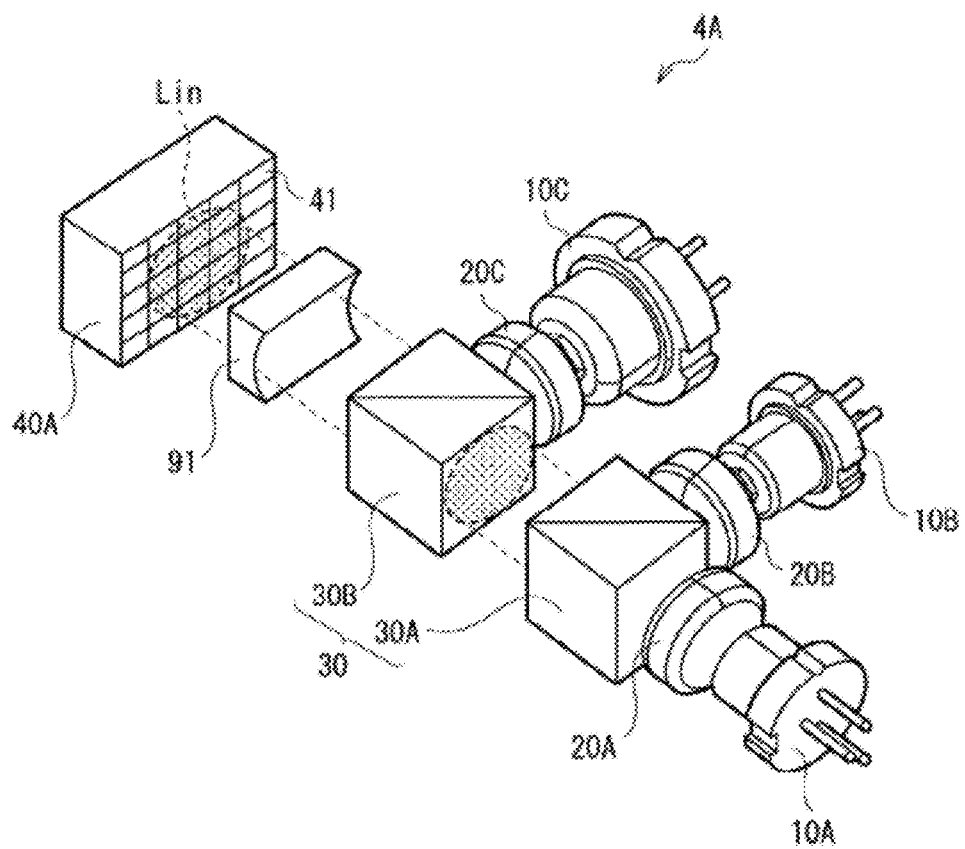
FIG. 31 is a perspective view illustrating a detailed configuration example of major parts of an illumination optical system in FIGS. 30A and 30B.

Also, unlike the illumination optical system 1A illustrated in FIG. 16, none of the light sources 10A, 10B, and 10C as well as other optical members in the illumination optical system 4A has the inclined arrangement (the rotated arrangement), as illustrated in FIG. 31, for example. Hence, in the illumination optical system 4A, the major axis direction of the luminance distribution "Lind" in the incidence light and the array directions of the respective cells 41 are not inclined nor are rotated with respect to each other so as to fail to achieve the inclined arrangement (the rotated arrangement) in the fly-eye lens 40A, unlike the illumination optical system 1A as illustrated in FIGS. 15A and 15B (i.e., as in the comparative example illustrated in FIG. 20).

Figure 32:
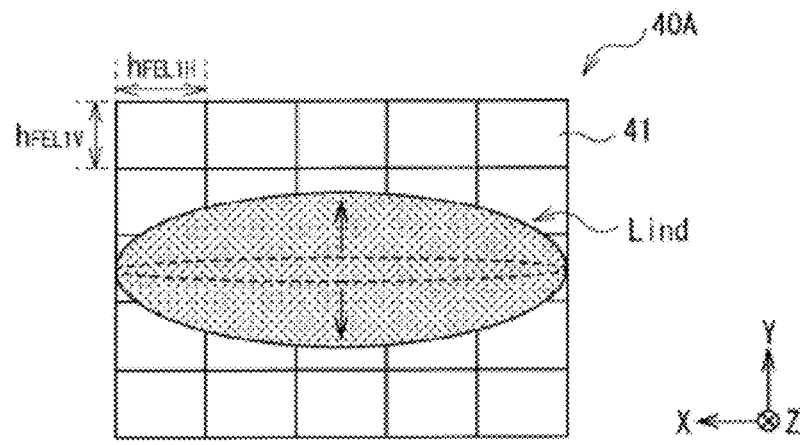
FIG. 32 is a schematic illustration for describing a function of an anamorphic lens illustrated in FIG. 31.

The anamorphic lens 91 is an optical device that expands the shape of the luminance distribution "Lind", in the incidence light entering the fly-eye lens 40A, along the minor axis direction thereof (in this embodiment, in the vertical direction (in the y-axis direction or in the "second direction"), for example), as illustrated by arrows in FIG. 32, for example. The anamorphic lens 91 can be such as a cylindrical lens (for example, a lenticular lens), and has optical properties (such as focal distances) asymmetric for the vertical direction and the horizontal direction (for example, the x-axis direction or the "first direction"). In this embodiment, a focal distance in the horizontal direction is longer relatively than a focal distance in the vertical direction (a focal distance in the vertical direction<a focal distance in the horizontal direction), for example.

[Function and Effect of Projector 4]

Figure 33:
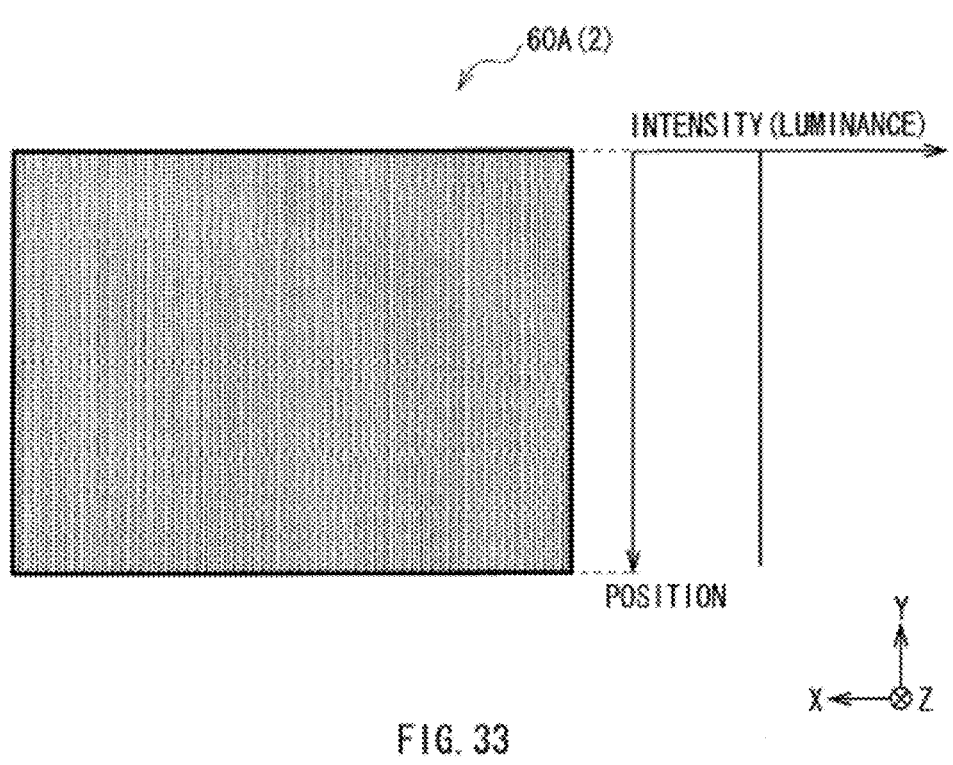
FIG. 33 describes a reduction effect of the luminance non-uniformity in the illumination optical system in the third embodiment.

In the third embodiment, the shape of the luminance distribution "Lind" in the incident light entering the fly-eye lens 40A is expanded along the minor axis direction thereof in the anamorphic lens 91 as illustrated in FIG. 32, for example. Hence, the third embodiment achieves functions and effects similar to those according to such as the first embodiment. Namely, the third embodiment makes it easier to reduce the luminance non-uniformity of the incidence light in the integrator 40, even when the laser beam emitted from the light source including the chip 11A configured such as by the LD shows the sharp luminance distribution shape. Thereby, the luminance non-uniformity in the illumination light and the display light is also reduced in the third embodiment (for example, the generation of the luminance non-uniformity is avoided) as illustrated in FIG. 33, for example, making it possible to improve the displaying quality.

In the foregoing, the third embodiment has been described with reference to an example where the anamorphic lens 91 is provided as a separate member, although it is not limited thereto. For example, the anamorphic lens 91 may be provided integral such as with the coupling lenses 20A, 20B, and 20C.

Fourth Embodiment

FIGS. 34A and 34B each illustrate a schematic configuration of a projector (a projector 5) according to the fourth embodiment of the technology. It is to be noted that the projector 5 corresponds to a concrete (but not limitative) example of the "projection display unit" in one embodiment of the technology. FIG. 34A illustrates a configuration example in which the projector 5 is viewed from above (in the y-axis direction), and FIG. 34B illustrates a configuration example in which the projector 5 is viewed from a lateral side (in the x-axis direction).

The projector 5 according to the fourth embodiment differs from the projector 1 provided with the illumination optical system 1A, in that a configuration of the projector 5 includes an illumination optical system 5A. In the following, description is given mainly on a difference between the projector 5 and the projector 1, and elements common to the projector 1 will not be described in detail. It is to be noted that the illumination optical system 5A corresponds to a concrete (but not limitative) example of the "illumination unit" in one embodiment of the technology.

[Configuration of Illumination Optical System 5A]

The illumination optical system 5A has a configuration in which, in the illumination optical system 1A, an optical path branching device 92 described below is provided on an optical path between the optical path unifying device 30 and the integrator 40.

Also, unlike the illumination optical system 1A illustrated in FIG. 16, none of the light sources 10A, 10B, and 10C as well as other optical members in the illumination optical system 5A has the inclined arrangement (the rotated arrangement), as illustrated in FIG. 35, for example. Hence, in the illumination optical system 5A, the major axis direction of the luminance distribution "Lind" in the incidence light and the array directions of the respective cells 41 are not inclined nor are rotated with respect to each other so as to fail to achieve the inclined arrangement (the rotated arrangement) in the fly-eye lens 40A, unlike the illumination optical system 1A as illustrated in FIGS. 15A and 15B (i.e., as in the comparative example illustrated in FIG. 20 as well as the illumination optical systems 3A and 4A of the second and the third embodiments).

The optical path branching device 92 is an optical device that branches the optical path of the incidence light entering the fly-eye lens 40A into a plurality of optical paths along the minor axis direction of the shape of the luminance distribution "Lind" thereof (here, in the vertical direction (for example, in the y-axis direction or in the "second direction"), for example). The optical path branching device 92 can be such as a diffractive device 92A that allows diffractive light beams of a plurality of diffraction orders to exit therefrom as illustrated in FIG. 36A, and a half mirror (or a prism) 92B as illustrated in FIG. 36B, for example.

[Function and Effect of Projector 5]

Figure 37A:
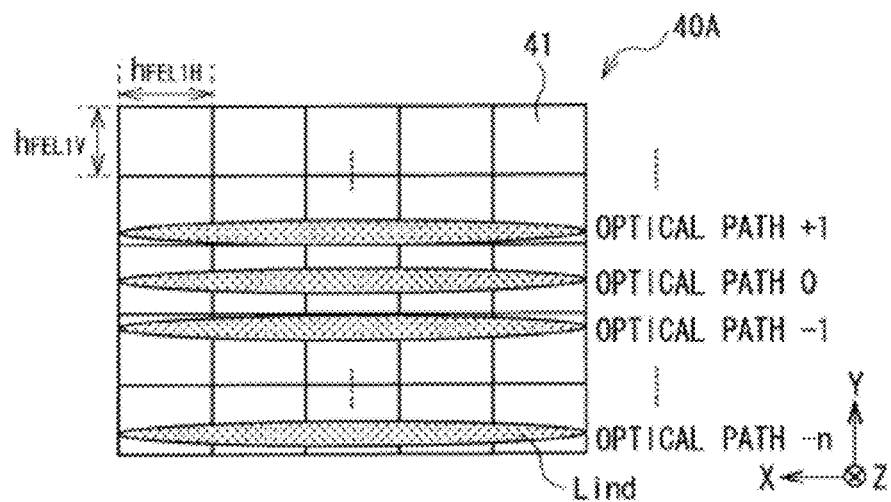
FIGS. 37A and 37B each describe a reduction effect of the luminance non-uniformity in the illumination optical system in the fourth embodiment.
Figure 37B:
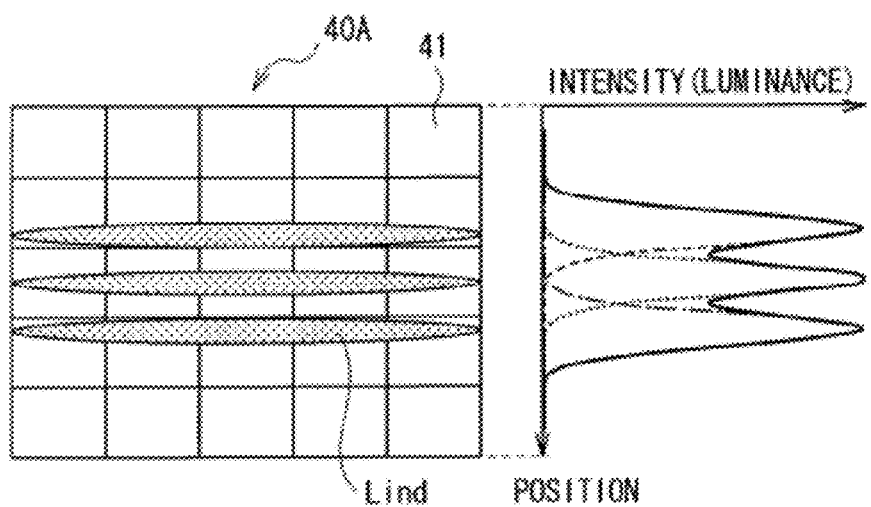

In the fourth embodiment, the optical path of the incidence light entering the fly-eye lens 40A is branched into the plurality of optical paths along the major axis direction of the shape of the luminance distribution "Lind" thereof in the optical path branching device 92 as illustrated in FIGS. 37A and 37B, for example. Hence, the fourth embodiment achieves functions and effects similar to those according to such as the first embodiment. Namely, the fourth embodiment makes it easier to reduce the luminance non-uniformity of the incidence light in the integrator 40, even when the laser beam emitted from the light source including the chip 11A configured such as by the LD shows the sharp luminance distribution shape. Thereby, the luminance non-uniformity in the illumination light and the display light is also reduced in the fourth embodiment (for example, the generation of the luminance non-uniformity is avoided), making it possible to improve the displaying quality.

In the foregoing, the fourth embodiment has been described with reference to an example where the diffractive device 92A or the half mirror (or the prism) 92B serves as the optical path branching device 92, although it is not limited thereto. The optical path branching device 92 may be configured by other optical devices.

Fifth Embodiment

FIGS. 38A and 38B each illustrate a schematic configuration of a projector (a projector 6) according to the fifth embodiment of the technology. It is to be noted that the projector 6 corresponds to a concrete (but not limitative) example of the "projection display unit" in one embodiment of the technology. FIG. 38A illustrates a configuration example in which the projector 6 is viewed from above (in the y-axis direction), and FIG. 38B illustrates a configuration example in which the projector 6 is viewed from a lateral side (in the x-axis direction).

The projector 6 according to the fifth embodiment differs from the projector 1 provided with the illumination optical system 1A, in that a configuration of the projector 6 includes an illumination optical system 6A. In the following, description is given mainly on a difference between the projector 6 and the projector 1, and elements common to the projector 1 will not be described in detail. It is to be noted that the illumination optical system 6A corresponds to a concrete (but not limitative) example of the "illumination unit" in one embodiment of the technology.

[Configuration of Illumination Optical System 6A]

The illumination optical system 6A has a configuration in which, in the illumination optical system 1A, the optical path branching device 92 according to the fourth embodiment and the anamorphic lens 91 according to the third embodiment are provided, in this order from the optical path unifying device 30, on the optical path between the optical path unifying device 30 and the integrator 40. Other parts of the configuration are similar to those of the illumination optical systems 4A and 5A according to the third and the fourth embodiments.

[Function and Effect of Projector 6]

The fifth embodiment having the configuration described above achieves effects similar to those according to the third and the fourth embodiments described above by virtue of functions similar thereto. Namely, the fifth embodiment makes it possible to reduce the luminance non-uniformity in the illumination light and the display light (for example, the generation of the luminance non-uniformity is avoided), and to improve the displaying quality. Also, in the fifth embodiment, both the optical path branching device 92 and the anamorphic lens 91 are provided, making it possible to reduce the luminance non-uniformity further effectively, and to achieve further improvement in the displaying quality.

In the foregoing, the fifth embodiment has been described with reference to an example where the optical path branching device 92 and the anamorphic lens 91 are provided, in this order from the optical path unifying device 30, on the optical path between the optical path unifying device 30 and the integrator 40, although it is not limited thereto. For example, the optical path branching device 92 and the anamorphic lens 91 may be provided in an opposite order. More specifically, the anamorphic lens 91 and the optical path branching device 92 may be provided, in this order from the optical path unifying device 30, on the optical path between the optical path unifying device 30 and the integrator 40.

[Modifications]

Hereinafter, modifications common to each of the first to the fifth embodiments will be described. Note that the same or equivalent elements as those of the first to the fifth embodiments described above are denoted with the same reference numerals, and will not be described in detail. Also, the following modifications are based on the projector 1 (the illumination optical system 1A) according to the first embodiment. However, the following modifications are applicable to the projectors 3 to 6 (the illumination optical systems 3A, 4A, 5A, and 6A) according to other embodiments (the second to the fifth embodiments).

[First Modification]

FIGS. 39A and 39B each illustrate a schematic configuration of a projector (a projector 7) according to the first modification. It is to be noted that the projector 7 corresponds to a concrete (but not limitative) example of the "projection display unit" in one embodiment of the technology. FIG. 39A illustrates a configuration example in which the projector 7 is viewed from above (in the y-axis direction), and FIG. 39B illustrates a configuration example in which the projector 7 is viewed from a lateral side (in the x-axis direction).

The projector 7 according to the first modification differs from the projector 1 provided with the illumination optical system 1A, in that a configuration of the projector 7 includes an illumination optical system 7A and that a reflection-type device is used for the spatial modulation device 60. In the following, description is given mainly on a difference between the projector 7 and the projector 1, and elements common to the projector 1 will not be described in detail. It is to be noted that the illumination optical system 7A corresponds to a concrete (but not limitative) example of the "illumination unit" in one embodiment of the technology.

The illumination optical system 7A has a configuration in which, in the illumination optical system 1A, a condenser lens 50A is provided in place of the condenser lens 50. The condenser lens 50A is configured to turn the light fluxes, derived from multiple light sources (such as the light sources 10A, 10B, and 10C) and formed by the integrator 40, into parallel light fluxes, to illuminate a condenser lens 50B through a polarization beam splitter 51.

Also, in the first modification, the spatial modulation device 60 is configured by the reflection-type device as described above, which can be such as a reflection-type liquid crystal panel, for example. Hence, in comparison to the projector 1, the projector 7 is further provided with the condenser lens 50B and the polarization beam splitter 51. The polarization beam splitter 51 is an optical member that allows a specific polarized light (for example, p-polarized light) to transmit therethrough selectively, and allows other polarized light (for example, s-polarized light) to be reflected therefrom selectively. The spatial modulation device 60 modulates the light while so reflecting the light therefrom as to allow the polarized light at the time of incidence thereon and the polarized light at the time of exit therefrom (for example, the s-polarized light or the p-polarized light) to be different from each other. Thereby, the light (for example, the s-polarized light) incident from the illumination optical system 7A is selectively reflected from the polarization beam splitter 51 to enter the spatial modulation device 60, and the image light (for example, the p-polarized light) exited from the spatial modulation device 60 is allowed to pass through the polarization beam splitter 51 selectively to enter the projection optical system 70. The condenser lens 50B condenses the light fluxes formed by the integrator 40 and entered from the multiple light sources (such as the light sources 10A, 10B, and 10C) through the condenser lens 50A and the polarization beam splitter 51, to illuminate in a superimposed fashion the illumination region 60A.

The projector 7 according to the first modification having the configuration described above also achieves effects similar to those of such as the projector 1 according to such as the first embodiment described above by virtue of functions similar thereto.

Also, especially in the first modification, the length in the x-axis direction is particularly increased in the plane (xy plane) orthogonal to the optical axis of the integrator 40. Hence, there is a great advantage, especially in the first modification, of allowing a minor axis direction (for example, the y-axis direction) of an outer shape of the projector 7 to coincide substantially (or preferably coincide) with each of the minor axis directions of the FFPs in the light beams emitted from the respective light-emitting spots 11B to thereby achieve reduction in size of the projector 7 as a whole.

[Second Modification]

FIGS. 40A and 40B each illustrate a schematic configuration of a projector (a projector 8) according to the second modification. It is to be noted that the projector 8 corresponds to a concrete (but not limitative) example of the "projection display unit" in one embodiment of the technology. FIG. 40A illustrates a configuration example in which the projector 8 is viewed from above (in the y-axis direction), and FIG. 40B illustrates a configuration example in which the projector 8 is viewed from a lateral side (in the x-axis direction). Also, FIGS. 41A and 41B each illustrate an example of an optical path in the projector 8 illustrated in FIGS. 40A and 40B. FIG. 41A illustrates an example of the optical path in which the projector 8 is viewed from above (in the y-axis direction), and FIG. 41B illustrates an example of the optical path in which the projector 8 is viewed from the lateral side (in the x-axis direction).

The projector 8 according to the second modification differs from the projector 1 provided with the illumination optical system 1A, in that a configuration of the projector 8 includes an illumination optical system 8A. In the following, description is given mainly on a difference between the projector 8 and the projector 1, and elements common to the projector 1 will not be described in detail. It is to be noted that the illumination optical system 8A corresponds to a concrete (but not limitative) example of the "illumination unit" in one embodiment of the technology.

The illumination optical system 8A is provided with a light source 10D, in place of the light sources 10A, 10B, and 10C as well as the dichroic mirrors 30A and 30B of the illumination optical system 1A which are omitted. The light source 10D is arranged on an optical axis of a coupling lens 20D. The illumination optical system 8A thus has a configuration in which light emitted from the light source 10D is allowed to enter the coupling lens 20D directly.

The light source 10D may have the solid-state light-emitting device 11 and the package 12 (a substrate to mount the solid-state light-emitting device 11) by which the solid-state light-emitting device 11 is supported and covered, for example. In other words, the chip 11A in this case is the top surface light-emitting device. Alternatively, the light source 10D may have, for example, a can-type configuration in which the solid-state light-emitting device 11 including one or more end face light-emitting chips 11A are accommodated in inner space surrounded by the stem 13 and the cap 14. In other words, the chip 11A in this case is the end face light-emitting device.

The solid-state light-emitting device 11 included in the light source 10D may emit light from the light emission region that includes a single or a plurality of light-emitting spots in a shape of a dot or in a non-dot shape. The solid-state light-emitting device 11 included in the light source 10D may include the single chip 11A that emits a light beam having a predetermined wavelength band, or may include the plurality of the chips 11A that emit light beams having the same wavelength band or having the wavelength bands different from one another, for example. In one embodiment where the solid-state light-emitting device 11 includes the plurality of chips 11A, these chips 11A may be arranged such as in a line in the horizontal direction and in a form of a lattice in the horizontal direction and in the vertical direction, for example.

The chip 11A may include a light-emitting diode (LED), an organic EL light-emitting device (OLED), a laser diode (LD), or other suitable light emitting device. As in the embodiments described above, at least one of the chips 11A in the light source 10D is configured by the LD.

In one embodiment where the plurality of chips 11A are included in the light source 10D, all of the chips 11A included in the light source 10D may emit light beams having wavelength bands equal to one another, or may emit light beams having wavelength bands different from one another. All of the chips 11A may be configured by a chip which emits a light beam having a wavelength of about 400 nm to 500 nm (for example, blue light), a chip which emits a light beam having a wavelength of about 500 nm to 600 nm (for example, green light), or a chip which emits a light beam having a wavelength of about 600 nm to 700 nm (for example, red light), in one embodiment where the plurality of chips 11A are included in the light source 10D, for example. Also, in one embodiment where the plurality of chips 11A are included in the light source 10D, the plurality of chips 11A included in the light source 10D may be configured by a combination of the chip which emits a light beam having a wavelength of about 400 nm to 500 nm (for example, blue light), the chip which emits a light beam having a wavelength of about 500 nm to 600 nm (for example, green light), and the chip which emits a light beam having a wavelength of about 600 nm to 700 nm (for example, red light).

[Third Modification]

Figure 42:
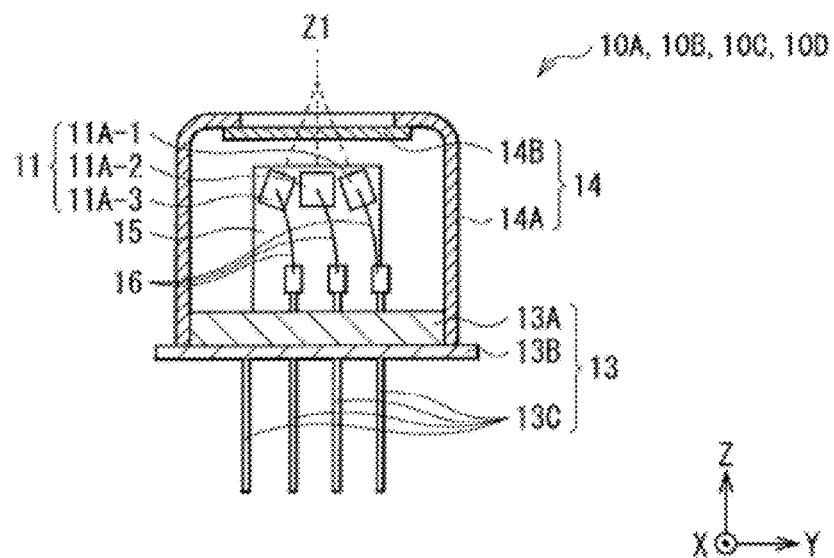
FIG. 42 illustrates an example of a cross-sectional configuration of a light source according to a third modification of any one of the first to the fifth embodiments of the technology.
Figure 43:
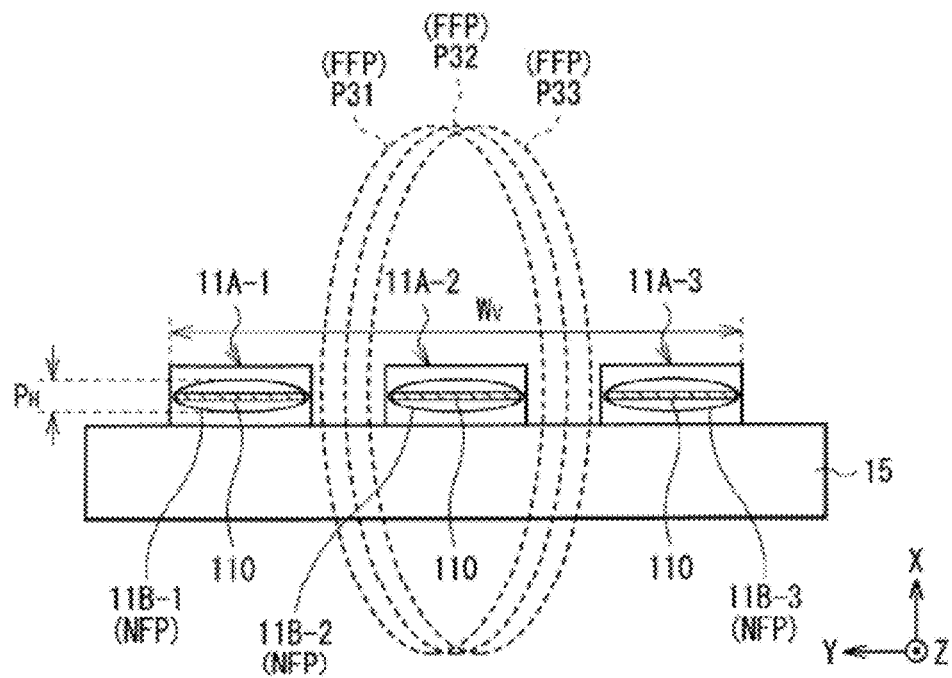
FIG. 43 illustrates an example of a relationship between an arrangement configuration of a light-emitting spot and the FFP in the light source of FIG. 42.

FIG. 42 illustrates an example of a cross-sectional configuration of the light sources (for example, the light sources 10A, 10B, 10C, and 10D) according to the third modification. The light sources in the third modification, unlike the light sources described in the foregoing, have a configuration in which at least one of the plurality of chips 11A which are configured by the LD in the first light source (for example, in at least one of the light sources 10A, 10B, 10C, and 10D) described above has the inclined arrangement relative to an optical axis Z1. In the third modification, two chips 11A-1 and 11A-3 among three chips 11A-1, 11A-2, and 11A-3 each have the inclined arrangement relative to the optical axis Z1 of a second light source, and the remaining chip 11A-2 is arranged to be parallel (the parallel arrangement) to the optical axis Z1 unlike those chips 11A-1 and 11A-3. Hence, an optical path of the laser light emitted from the chip 11A-2 is in parallel with the optical axis Z1, whereas the optical path of the laser light emitted from each of the chips 11A-1 and 11A-3 is in a direction inclined relative to the optical axis Z1. The third modification thus makes it possible to allow an intensity peak of each laser light following the light path conversion (the light path unification) to be aligned with the direction of the optical axis Z1.

Also, it is preferable, in the third modification as well, that the minor axis directions of the FFPs in the laser light beams emitted from light-emitting spots 11B-1, 11B-2, and 11B-3 in the chips 11A-1, 11A-2, and 11A-3 each coincide substantially (or preferably coincide) with the minor axis direction (here, in the y-axis direction, for example) in the plane orthogonal to the optical axis of the integrator 40. Also, in one embodiment where the first light source described above is the light source that emits the light beams having two or more wavelength bands different from one another, it is preferable likewise that each of the major axis directions (here, in the x-axis direction, for example) of the FFPs in the laser light beams emitted from the respective light-emitting spots 11B-1, 11B-2, and 11B-3 coincide substantially (or preferably coincide) with one another between those two or more wavelength bands.

[Other Modifications]

Although the technology has been described in the foregoing by way of example with reference to the embodiments and the modifications, the technology is not limited thereto but may be modified in a wide variety of ways.

For example, in the embodiments and the modifications described above, the configuration is employed in each of the illumination optical systems 1A, 3A, 4A, 5A, 6A, 7A, and 8A in which an infinite optical system that allows the parallel light to enter the fly-eye lenses 40A and 40C is included. Alternatively, a finite optical system may be included that allows convergent light (or divergent light) to enter the fly-eye lenses 40A and the 40C. In this case, a traveling-direction angle conversion device having a function of converging or diverging the light emitted from the light sources 10A to 10D may be disposed in the embodiments and the modifications, in place of the coupling lenses 20A to 20D. In this embodiment, an optical magnification of an optical system including the traveling-direction angle conversion device described above and the fly-eye lens 40A (or the fly-eye lens 40C) and the fly-eye lens 40B is preferably so set as to allow each of the light source images S, formed on the fly-eye lens 40B by the respective cells 41 of the fly-eye lenses 40A and 40C, to have a size not exceeding a size of the single cell 42 in the fly-eye lens 40B. More specifically, it is preferable that the optical magnification of the optical system including the traveling-direction angle conversion device and the fly-eye lens 40A (or the fly-eye lens 40C) and the fly-eye lens 40B satisfy the following relational expression. Also, when each of the cells 41 and 42 of the fly-eye lenses 40A, 40B, and 40C has the lateral-vertical length ratio (an aspect ratio) other than 1 (one), it is also preferable that the illumination optical systems 1A, 3A, 4A, 5A, 6A, 7A, and 8A be the anamorphic optical system.

$$h = P \times m \le h_{FEL2}$$

where m: an optical magnification of the optical system including the above-mentioned traveling-direction angle conversion device and the fly-eye lens 40A (or the fly-eye lens 40C) and the fly-eye lens 40B.

Also, the elements of the illumination optical systems and the projectors described in the embodiments and the modifications may be combined mutually in any combination. For example, the configuration of the illumination optical system 1A according to the first embodiment may be combined with that of one or more of the illumination optical systems 3A, 4A, 5A, and 6A according to the second to the fifth embodiments. Also, the configuration of the illumination optical system 3A according to the second embodiment may be combined with that of one or more of the illumination optical systems 4A, 5A, and 6A according to the third to the fifth embodiments, for example. Thus, combining the configurations or the elements of the plurality of embodiments and the modifications makes it possible to reduce the luminance non-uniformity synergistically, and to achieve further improvement in image quality.

Figure 44:
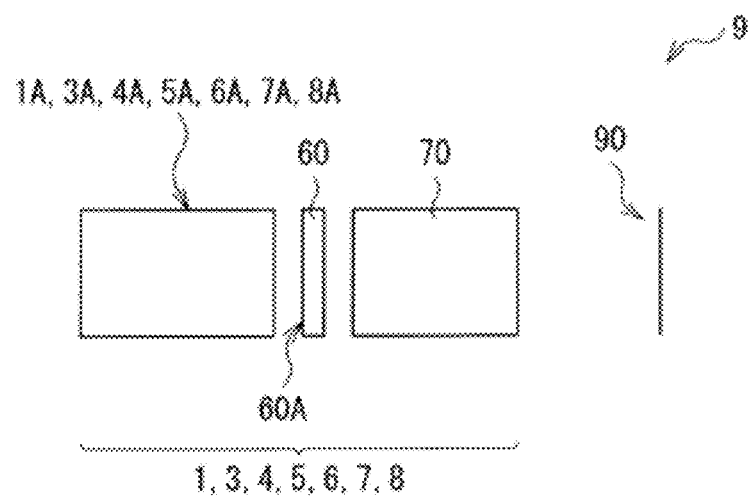
FIG. 44 illustrates a schematic configuration example of a rear projection display unit that uses the illumination optical system according to any one of the first to the fifth embodiments and the first to the third modifications.

Also, the embodiments and the modifications described above are each applied to the projection display unit, although it is not limited thereto. The embodiments and the modifications described above are applicable to other display units. For example, as illustrated in FIG. 44, any one or a combination of the embodiments and the modifications may be applied to a rear projection display unit 9. The rear projection display unit 9 includes: any one of the projectors 1, 3, 4, 5, 6, 7, and 8 having the illumination optical systems 1A, 3A, 4A, 5A, 6A, 7A, and 8A, respectively (or having any combination of those optical systems); and a transmissive screen 90 on which image light projected such as from any one of the projectors 1, 3, 4, 5, 6, 7, and 8 (a projection optical system 70) is displayed. Thus, using any one or any combination of the illumination optical systems 1A, 3A, 4A, 5A, 6A, 7A, and 8A for an illumination optical system of the rear projection display unit 9 makes it possible to reduce luminance non-uniformity in illumination light (such as image light and display light), and to improve displaying quality.

Also, in the embodiments and the modifications described above, the spatial modulation device 60 is configured by the transmission-type or the reflection-type device, although it is not limited thereto. In one embodiment, the spatial modulation device 60 may be configured by a digital micromirror device (DMD).

Further, although the embodiments and the modifications have been described above with reference to the elements (optical system) of the illumination optical system and the display unit, it is not necessary to include all of the elements. Also, other one or more elements may be further included therein.

In the above embodiments and the modifications, the illumination units are applied to the projection display units, although the application of the illumination units is not limited to projection display units. The embodiments and the modifications may be applied to exposure devices such as steppers.

As used herein, the terms such as "uniform", "parallel", "orthogonal", "vertical" and "the same direction" include approximately uniform, approximately parallel, approximately orthogonal, approximately vertical, and approximately the same direction, respectively, insofar as effects achieved by the embodiments and the modifications are not impaired.

Accordingly, it is possible to achieve at least the following configurations (1) to (16) from the above-described example embodiments and the modifications of the disclosure.

(1) An illumination unit, including:
one or more light sources each including a solid-state light-emitting device configured to emit light from a light emission region including a single or a plurality of light-emitting spots;
an optical member allowing the light incident from the solid-state light-emitting device to pass therethrough and exit therefrom; and
an optical device,
the solid-state light-emitting device including a single chip or a plurality of chips each emitting the light,
wherein
one or more of the chips in the one or more light sources as a whole is a laser diode,
the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

(2) The illumination unit according to (1), wherein
each of the first fly-eye lens and the second fly-eye lens includes a plurality of cells,
the cells in the first fly-eye lens are arranged along a first direction and a second direction that intersect each other, and
the optical device includes an anamorphic lens having a focal distance in the first direction that is longer than a focal distance in the second direction.

(3) The illumination unit according to (1) or (2), further including an optical path branching device provided on the optical path between the first fly-eye lens and the one or more light sources including the one or more chips configured by the laser diode, the optical path branching device branching an optical path of the incidence light into a plurality of optical paths along the minor axis direction of the shape of the luminance distribution of the incidence light.

(4) The illumination unit according to (3), wherein the optical path branching device includes a diffractive device, a half mirror, or a prism.

(5) The illumination unit according to any one of (1) to (4), wherein
the first fly-eye lens is disposed substantially in a focal position of the second fly-eye lens, and
the second fly-eye lens is disposed substantially in a focal position of the first fly-eye lens.

(6) The illumination unit according to any one of (1) to (5), wherein the optical member includes:
one or more traveling-direction angle conversion devices each converting a traveling-direction-angle of the light incident from the solid-state light-emitting device; and
the integrator uniformalizing the illuminance distribution of the light in the predetermined illumination region illuminated by the light having passed through the one or more traveling-direction angle conversion devices.

(7) The illumination unit according to any one of (1) to (6), wherein the one or more light sources is formed in a manner of a package incorporating the solid-state light-emitting device, or is formed in a manner of a package where the solid-state light-emitting device is mounted on a substrate.

(8) An illumination unit, including:
one or more light sources each including a solid-state light-emitting device configured to emit light from a light emission region including a single or a plurality of light-emitting spots;
an optical member allowing the light incident from the solid-state light-emitting device to pass therethrough and exit therefrom; and
an optical path branching device,
the solid-state light-emitting device including a single chip or a plurality of chips each emitting the light,
wherein
one or more of the chips in the one or more light sources as a whole is a laser diode,
the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

(9) The illumination unit according to (8), wherein the optical path branching device includes a diffractive device, a half mirror, or a prism.

(10) The illumination unit according to (8) or (9), wherein
the first fly-eye lens is disposed substantially in a focal position of the second fly-eye lens, and
the second fly-eye lens is disposed substantially in a focal position of the first fly-eye lens.

(11) The illumination unit according to any one of (8) to (10), wherein the optical member includes:
one or more traveling-direction angle conversion devices each converting a traveling-direction-angle of the light incident from the solid-state light-emitting device; and
the integrator uniformalizing the illuminance distribution of the light in the predetermined illumination region illuminated by the light having passed through the one or more traveling-direction angle conversion devices.

(12) The illumination unit according to any one of (8) to (11), wherein the one or more light sources is formed in a manner of a package incorporating the solid-state light-emitting device, or is formed in a manner of a package where the solid-state light-emitting device is mounted on a substrate.

(13) A projection display unit, including:
an illumination optical system;
a spatial modulation device modulates, based on a picture signal inputted, light from the illumination optical system to thereby generate image light; and
a projection optical system projecting the image light generated by the spatial modulation device,
the illumination optical system including
one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

(14) A projection display unit, including:

an illumination optical system;

a spatial modulation device modulates, based on a picture signal inputted, light from the illumination optical system to thereby generate image light; and a projection optical system projecting the image light generated by the spatial modulation device, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

(15) A direct view display unit, including:

an illumination optical system;

a spatial modulation device modulates, based on a picture signal inputted, light from the illumination optical system to thereby generate image light;

a projection optical system projecting the image light generated by the spatial modulation device; and a transmissive screen on which the image light projected from the projection optical system is displayed, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

(16) A direct view display unit, including:

an illumination optical system;

a spatial modulation device modulates, based on a picture signal inputted, light from the illumination optical system to thereby generate image light;

a projection optical system projecting the image light generated by the spatial modulation device; and a transmissive screen on which the image light projected from the projection optical system is displayed, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

The present disclosure contains subject matter related to that disclosed in Japanese Priority Patent Application JP 2011-071152 filed in the Japan Patent Office on Mar. 28, 2011, the entire content of which is hereby incorporated by reference.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. Moreover, no element or component in this disclosure is intended to be dedicated to the public regardless of whether the element or component is explicitly recited in the following claims.

What is claimed is:

1. An illumination unit, comprising:
   one or more light sources each including a solid-state light-emitting device configured to emit light from a light emission region including a single or a plurality of light-emitting spots;
   an optical member allowing the light incident from the solid-state light-emitting device to pass therethrough and exit therefrom; and
   an optical device,
   the solid-state light-emitting device including a single chip or a plurality of chips each emitting the light,
   wherein
   one or more of the chips in the one or more light sources as a whole is a laser diode,
   the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
   the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

2. The illumination unit according to claim 1, wherein
   each of the first fly-eye lens and the second fly-eye lens includes a plurality of cells,
   the cells in the first fly-eye lens are arranged along a first direction and a second direction that intersect each other, and
   the optical device includes an anamorphic lens having a focal distance in the first direction that is longer than a focal distance in the second direction.

3. The illumination unit according to claim 1, further comprising an optical path branching device provided on the optical path between the first fly-eye lens and the one or more light sources including the one or more chips configured by the laser diode, the optical path branching device branching an optical path of the incidence light into a plurality of optical paths along the minor axis direction of the shape of the luminance distribution of the incidence light.

4. The illumination unit according to claim 3, wherein the optical path branching device includes a diffractive device, a half mirror, or a prism.

5. The illumination unit according to claim 1, wherein
   the first fly-eye lens is disposed substantially in a focal position of the second fly-eye lens, and
   the second fly-eye lens is disposed substantially in a focal position of the first fly-eye lens.

6. The illumination unit according to claim 1, wherein the optical member includes:
   one or more traveling-direction angle conversion devices each converting a traveling-direction-angle of the light incident from the solid-state light-emitting device; and
   the integrator uniformalizing the illuminance distribution of the light in the predetermined illumination region illuminated by the light having passed through the one or more traveling-direction angle conversion devices.

7. The illumination unit according to claim 1, wherein the one or more light sources is formed in a manner of a package incorporating the solid-state light-emitting device, or is formed in a manner of a package where the solid-state light-emitting device is mounted on a substrate.

8. An illumination unit, comprising:
   one or more light sources each including a solid-state light-emitting device configured to emit light from a light emission region including a single or a plurality of light-emitting spots;
   an optical member allowing the light incident from the solid-state light-emitting device to pass therethrough and exit therefrom; and
   an optical path branching device,
   the solid-state light-emitting device including a single chip or a plurality of chips each emitting the light,
   wherein
   one or more of the chips in the one or more light sources as a whole is a laser diode,
   the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
   the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

9. The illumination unit according to claim 8, wherein the optical path branching device includes a diffractive device, a half mirror, or a prism.

10. The illumination unit according to claim 8, wherein
    the first fly-eye lens is disposed substantially in a focal position of the second fly-eye lens, and
    the second fly-eye lens is disposed substantially in a focal position of the first fly-eye lens.

11. The illumination unit according to claim 8, wherein the optical member includes:
   one or more traveling-direction angle conversion devices each converting a traveling-direction-angle of the light incident from the solid-state light-emitting device; and
   the integrator uniformalizing the illuminance distribution of the light in the predetermined illumination region illuminated by the light having passed through the one or more traveling-direction angle conversion devices.

12. The illumination unit according to claim 8, wherein the one or more light sources is formed in a manner of a package incorporating the solid-state light-emitting device, or is formed in a manner of a package where the solid-state light-emitting device is mounted on a substrate.

13. A projection display unit, comprising:
   an illumination optical system;
   a spatial modulation device modulates, based on a picture signal inputted, light from the illumination optical system to thereby generate image light; and
   a projection optical system projecting the image light generated by the spatial modulation device,
   the illumination optical system including
   one or more light sources each including a solid-state light-emitting device configured to emit the light from a light emission region including a single or a plurality of light-emitting spots,
   an optical member allowing the light incident from the solid-state light-emitting device to pass therethrough and exit therefrom, and
   an optical device,
   the solid-state light-emitting device including a single chip or a plurality of chips each emitting the light,
   wherein
   one or more of the chips in the one or more light sources as a whole is a laser diode,
   the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
   the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

14. A projection display unit, comprising:
   an illumination optical system;
   a spatial modulation device modulates, based on a picture signal inputted, light from the illumination optical system to thereby generate image light; and
   a projection optical system projecting the image light generated by the spatial modulation device,
   the illumination optical system including
   one or more light sources each including a solid-state light-emitting device configured to emit the light from a light emission region including a single or a plurality of light-emitting spots,
   an optical member allowing the light incident from the solid-state light-emitting device to pass therethrough and exit therefrom, and
   an optical path branching device,
   the solid-state light-emitting device including a single chip or a plurality of chips each emitting the light,
   wherein
   one or more of the chips in the one or more light sources as a whole is a laser diode,
   the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
   the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

15. A direct view display unit, comprising:
   an illumination optical system;
   a spatial modulation device modulates, based on a picture signal inputted, light from the illumination optical system to thereby generate image light;
   a projection optical system projecting the image light generated by the spatial modulation device; and
   a transmissive screen on which the image light projected from the projection optical system is displayed,
   the illumination optical system including
   one or more light sources each including a solid-state light-emitting device configured to emit the light from a light emission region including a single or a plurality of light-emitting spots,
   an optical member allowing the light incident from the solid-state light-emitting device to pass therethrough and exit therefrom, and
   an optical device,
   the solid-state light-emitting device including a single chip or a plurality of chips each emitting the light,
   wherein
   one or more of the chips in the one or more light sources as a whole is a laser diode,
   the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and
   the optical device is disposed on an optical path between the first fly-eye lens and the one or more light sources including the one or more chips configured by the laser diode, and allows a shape of a luminance distribution of incidence light on an incidence plane of the first fly-eye lens to be expanded along a minor axis direction of the shape of the luminance distribution.

16. A direct view display unit, comprising:
   an illumination optical system;
   a spatial modulation device modulates, based on a picture signal inputted, light from the illumination optical system to thereby generate image light;
   a projection optical system projecting the image light generated by the spatial modulation device; and a transmissive screen on which the image light projected from the projection optical system is displayed, the illumination optical system including one or more light sources each including a solid-state light-emitting device configured to emit the light from a light emission region including a single or a plurality of light-emitting spots, an optical member allowing the light incident from the solid-state light-emitting device to pass therethrough and exit therefrom, and an optical path branching device, the solid-state light-emitting device including a single chip or a plurality of chips each emitting the light, wherein one or more of the chips in the one or more light sources as a whole is a laser diode, the optical member includes an integrator having a first fly-eye lens on which the light from the solid-state light-emitting device is incident and a second fly-eye lens on which the light from the first fly-eye lens is incident, the integrator uniformalizing an illuminance distribution of light in a predetermined illumination region illuminated by the light incident from the solid-state light-emitting device, and the optical path branching device is provided on an optical path between the first fly-eye lens and the one or more light sources including the one or more chips configured by the laser diode, the optical path branching device branching an optical path of incidence light on an incidence plane of the first fly-eye lens into a plurality of optical paths along a minor axis direction of a shape of a luminance distribution of the incidence light.

* * * * *